United States Patent
Smith et al.

(10) Patent No.: US 7,627,861 B2
(45) Date of Patent: Dec. 1, 2009

(54) METHODS, SYSTEMS, AND COMPUTER PROGRAM PRODUCTS FOR IDENTIFYING COMPUTER PROGRAM SOURCE CODE CONSTRUCTS

(75) Inventors: Jason McColm Smith, Raleigh, NC (US); Paul David Stotts, Pittsboro, NC (US)

(73) Assignee: THe University of North Carolina, Chapel Hill, NC (US)

( * ) Notice: Subject to any disclaimer, the term of this patent is extended or adjusted under 35 U.S.C. 154(b) by 774 days.

(21) Appl. No.: 11/003,841

(22) Filed: Dec. 3, 2004

(65) Prior Publication Data

US 2005/0166193 A1   Jul. 28, 2005

Related U.S. Application Data

(60) Provisional application No. 60/527,418, filed on Dec. 5, 2003.

(51) Int. Cl.
G06F 9/45 (2006.01)

(52) U.S. Cl. .................... 717/144; 717/137; 717/143

(58) Field of Classification Search ................ 717/110, 717/140–145
See application file for complete search history.

(56) References Cited

U.S. PATENT DOCUMENTS

| | | | | |
|---|---|---|---|---|
| 6,516,461 B1 * | 2/2003 | Ichisugi | ............... | 717/144 |
| 6,804,682 B1 * | 10/2004 | Kemper et al. | .......... | 707/103 R |
| 6,873,935 B2 * | 3/2005 | Spinrad et al. | .............. | 702/186 |
| 7,003,760 B1 * | 2/2006 | Das | ........................... | 717/124 |
| 2004/0153994 A1 * | 8/2004 | Bates et al. | ................. | 717/110 |
| 2004/0176930 A1 * | 9/2004 | Spinrad et al. | .............. | 702/186 |

OTHER PUBLICATIONS

Smith et al., "18th IEEE International Conference on Automated Software Engineering," IEEE Computer Society, pp. 215-224 (Oct. 6-10, 2003).

Smith et al., "SPQR: Flexible Automated Design Pattern Extraction from Source Code," Technical Report TR03-016, pp. 1-11 (May 21, 2003).

Smith et al., "SPQR: Use of a First-Order Theorem Prover for Flexibly Finding Design Patters in Source Code," Technical Report TR03-007, pp. 1-19 (Mar. 21, 2003).

Smith et al., "Elemental Design Patterns: A Logical Inference System and Theorem Prover Support for Flexible Discovery of Design Patterns," Technical Report TR02-038, pp. 1-11 (Sep. 9, 2002).

Smith et al., "Elemental Design Patterns—A Link Between Architecture and Object Semantics," OOPSLA, pp. 1-17 (2002).

* cited by examiner

*Primary Examiner*—Tuan Q Dam
*Assistant Examiner*—Isaac T Tecklu
(74) *Attorney, Agent, or Firm*—Jenkins, Wilson, Taylor & Hunt, P.A.

(57) ABSTRACT

Methods, systems, and computer program products for identifying computer source code constructs are disclosed. According to one method, computer source code is converted to a format suitable for an automated inference engine. The automated inference engine receives as inputs the converted source code, a set of elemental design patterns defining patterns to be identified, and a set of rules defining relationships between patterns. The automated inference engine outputs proofs indicative of patterns present in the source code. The proofs may be converted to a source code pattern report.

46 Claims, 37 Drawing Sheets

```
class File {
   virtual void op1();
};

class MeasuredFile {
   File*    file;
   void op2() {    file.op1(); };
};

class FileFAT : File {
   void op1();
};

class FilePile : File {
   MeasuredFile*   mfile;
   void op1() {    foreach file in mfile:
                              file.op2(); };
};

class FilePileFixed : FilePile {
   void op1() {    FilePile::op1();
                   fixTheProblem(); };
};
```

FIG. 9

```
%%% Current environment
list(sos).
File declares op1.
FileFAT inh File.
fp : FilePile.
FilePile inh File.
(fp dot op1) relmd ((fp dot mfile) dot op2).
fp.mfile = mf.
mf : MeasuredFile.
(mf dot file) relf f.
f : File.
(mf dot op2) relf (mf dot file).
(mf dot op1) relmd (file dot op1).
(mf dot file) = f.
fpf : FilePileFixed.
FilePileFixed inh FilePile.
(fp dot op1) relms ((fp dot super) dot op1).
(fp dot op1) relf ((fp dot m) dot file).
end_of_list.
```

FIG. 10

```
all Redirecter FamilyHead r fh operation (
    (Redirecter inh FamilyHead) &
    (r : Redirecter) &
    (fh : FamilyHead) &
    ((r dot operation) relm (fh dot operation)) &
    (r relf fh) ->
        (RedirectInFamily(Redirecter, FamilyHead, operation))
).
```

FIG. 11

$$File \equiv [op1 : File \to []] \quad (44)$$
$$FileFAT <: File \quad (45)$$
$$fp : FilePile \quad (46)$$
$$FilePile <: File \quad (47)$$
$$fp.op1 <_{\mu-} fp.mfile.op2 \quad (48)$$
$$fp.mfile = mf \quad (49)$$
$$mf : MeasuredFile \quad (50)$$
$$mf.file <_{\phi} f \quad (51)$$
$$f : File \quad (52)$$
$$mf.op2 <_{\phi} mf.file \quad (53)$$
$$mf.op2 <_{\mu-} mf.file.op1 \quad (54)$$
$$mf.file = f \quad (55)$$
$$fpf : FilePileFixed \quad (56)$$
$$FilePileFixed <: FilePile \quad (57)$$
$$fp.op1 <_{\mu+} \textbf{super}.op1 \quad (58)$$
$$fp.op1 <_{\phi} fp.mfile \quad (59)$$

FIG. 18

```
method( obj )
{
        obj.method1();
        obj.method2();
} method( obj )
{
        obj.method2();
        obj.method1();
}
```

FIG. 20

METHODS, SYSTEMS, AND COMPUTER PROGRAM PRODUCTS FOR IDENTIFYING COMPUTER PROGRAM SOURCE CODE CONSTRUCTS

RELATED APPLICATIONS

This application claims the benefit of U.S. Provisional Patent Application Ser. No. 60/527,418, filed Dec. 5, 2003; the disclosure of which is incorporated herein by reference in its entirety.

GOVERNMENT INTEREST

This invention was made with U.S. Government support under Grant No. R82-795901-3 awarded by United States Environmental Protection Agency. The U.S. Government has certain rights in the invention.

TECHNICAL FIELD

The subject matter described herein relates to methods, systems, and computer program products for analyzing computer program source code. More particularly, the subject matter described herein relates to methods, systems, and computer program products for identifying computer program source code constructs.

BACKGROUND ART

1. Related Prior Research

The decomposition and analysis of computer source code patterns is an established idea, and the concept of creating a hierarchy of related patterns has been in the literature almost as long as patterns themselves [9, 17, 29, 37]. The few researchers who have attempted to provide a truly formal basis for patterns have most commonly done so from a desire to perform refactoring of existing code, while others have attempted the more pragmatic approach of identifying core components of existing patterns in use.

Refactoring Approaches

Refactoring [14] has been a frequent target of formalization techniques, with fairly good success to date [10, 22, 25]. The primary motivation of refactoring is to facilitate tool support for, and validation of, transformation of code from one form to another while preserving behavior. This is an important step in the maintenance and alteration of existing systems and patterns are seen as the logical next abstraction upon which they should operate. These approaches, however, have one missing aspect: they lack appropriate flexibility of implementation.

Fragments: As developed by Florijm, Meijers, and van Winsen [13], fragments provide a practical implementation of pattern analysis and coding support in the Smalltalk language and demonstrate the power of application of these concepts. Their fragments are abstractions of a design elements, such as classes, patterns, methods, or code, and contain roles, or slots, which are filled by other fragments. In this way fragments are bound to each other to produce an architecture in much the same way that objects, classes, and such are in a working system, but the single definition of a fragment allows them to work with all components of the system in a singular way. This approach, while successful in assisting an engineer in working with a system, does have some limitations. For example, detection of existing patterns in the system was deemed unlikely, due to the fact that "many conceptual roles did not exist as distinct program elements, but were cluttered onto a few, more complex ones." This indicates that there may be a lower level of conceptual roles to address, below fragments.

LePuS: Eden's work on LePuS [11] is an excellent example of formalizing a language for pattern description, based on the fragments theory. LePuS lacks a tie to the more traditional formal denotational semantics of language theory, however, severely limiting its usefulness as a unifying system for code analysis. Pattern analysis and metrics are but one portion of the spectrum of tasks associated with system maintenance and design. An exquisitely elegant architecture may in fact be a poor choice for a system where performance or some other criteria is of paramount importance. System architects must have available all the relevant information for their system to be able to appropriately design and maintain it. Legacy systems, in particular, benefit from more procedural-based analysis, including cohesion and coupling metrics, slice analysis, and other data-centric approaches. One goal of the methods and systems described herein is to enhance the tools for refactoring, not only of current object-oriented systems, but of older code that may just now be being converted to an object-oriented approach. It is therefore desirable to incorporate such analysis systems into any pattern analysis framework. To not do so is to further the chasm between the abstract concepts and the concrete code, instead of unifying them, as patterns are designed to do.

Minipatterns: Ó Cinnéide's work in transformation and refactoring of patterns in code [23] is an example of the application of minipatterns, portions of patterns that are used to compose larger bodies. Ó Cinnéide treats the minipatterns as stepping stones along a refactoring path, allowing each to be a discrete unit that can be refactored under a minitransformation, in much the same way that Fowler's refactorings [14] are used to incrementally transform code at and below the object level. These minipatterns are demonstrated to be highly useful for many applications, but cannot capture some of the more dynamic behavior of patterns, instead relying heavily on syntactical constructs for evidence of the minipatterns.

Structural Analyses

An analysis of the 'Gang of Four' (GoF) patterns [15] reveals many shared structural and behavioral elements, such as the similarities between Composite and Visitor [15]. Relationships between patterns, such as inclusion or similarity, have been investigated by various practitioners, and a number of meaningful examples of underlying structures have been described [5, 9, 29, 36, 37].

Objectifier: The Objectifier pattern [37] is one such example of a core piece of structure and behavior shared between many more complex patterns. Its intent is to:

objectify similar behavior in additional classes, so that clients can vary such behavior independently from other behavior, thus supporting variation-oriented design. Instances from those classes represent behavior or properties, but not concrete objects from the real world (similar to reification).

FIG. 1 is a class diagram illustrating the Objectifier class structure.

All of the class diagrams illustrated herein are drawn in Unified Modeling Language (UML) format. UML is a standard for graphic modeling of software. Since UML is known to those of skill in the art of computer software development, a detailed description thereof will not be presented herein. The UML standard is described in a number of commercially-available publications, including Fowler, Martin, UML Distilled: A Brief Guide to the Standard Object Modeling Language, Third Edition, Addison-Wesley 2004, the disclosure of which is incorporated herein by reference in its entirety.

Zimmer uses Objectifier as a 'basic pattern' in the construction of several other GoF patterns, such as Builder, Observer, Bridge, State, Command and Iterator. It is a simple yet elegantly powerful structural concept that is used repeatedly in other patterns.

Object Recursion: Woolf takes Objectifier one step further, adding a behavioral component, and naming it Object Recursion [36]. FIG. 2 is a class diagram illustrating the Object Recursion class structure. The class diagram in FIG. 2 is extremely similar to Objectifier, with an important difference, namely the behavior in the leaf subclasses of Handler. Exclusive of this method behavior, however, it seems to be an application of Objectifler in a more specific use. Note that Woolf compares Object Recursion to the relevant GoF patterns and deduces that: Iterator, Composite and Decorator can, in many instances, be seen as containing an instance of Object Recursion; Chain of Responsibility and Interpreter do contain Object Recursion as a primary component.

Relationships: Taken together, the above instances of analyzed pattern findings comprise two parts of a larger chain: Object Recursion contains an instance of Objectifler, and both in turn are used by larger patterns. This indicates that there are meaningful relationships between patterns, yet past work has shown that there are more primary forces at work. Buschmann's variants [7], Coplien and others' idioms [4,9, 20], and Pree's metapatterns [27] all support this viewpoint. Shull, Melo and Basili's BACKDOOR's [31] dependency on relationships is exemplary of the normal static treatment that arises. It will become evident that these relationships between concepts are a core piece which grant great flexibility to the practitioner implementing patterns in design, through constructs we term isotopes, which will be treated in Section 4 13. A related, but type-based approach that works instead on UML expressed class designs, is Egyed's UML/Analyzer system [12] which uses abstraction inferences to help guide engineers in code discovery. Reiss's PEKOE [28] uses a relational database language for queries and conceptual component definition.

Accordingly, in light of the difficulties associated with conventional source code analysis methods, there exists a need for improved methods and systems for identifying computer program source code constructs.

DISCLOSURE OF THE INVENTION

Accordingly to one aspect, the subject matter described herein includes a method for detecting constructs in computer program source code in a manner that is independent of underlying source code variations used to implement the source code constructs. The method includes converting a first computer source code file into a fact set in a mathematical notation suitable for inputting into an automated inference engine, such as an automated theorem prover or a deductive database. A catalog including elemental design patterns (EDPs) and constructs composed of element design patterns used for identifying source code constructs is accessed. The elemental design patterns and the constructs are independent from source code semantic tags. A set of rules in the mathematical notation usable by the automated inference engine is accessed to identify relationships between source code constructs. The fact set, the catalog, and the rules are input to the automated inference engine for identifying constructs present in the computer source code file.

As described in the preceding paragraph, the methods and systems described herein are capable of identifying source code constructs independently of the source code semantic tags. A source code semantic tag includes any semantic information contained in the naming of source code elements, such as a method named doHighlightingOfText, or a data field named highestAltitudeReached. The name explains what it does by description. By identifying source code constructs independently of the underlying source code naming conventions, the methods and systems described herein can identify common source code structure, regardless of the naming conventions used by individual programmers.

The methods and systems described herein can be implemented in hardware, software, firmware, or any combination thereof. In one exemplary implementation, the methods and systems for identifying computer source code constructs may be implemented as computer program products comprising computer-executable instructions embodied in computer-readable media. Exemplary computer-readable media suitable for implementing the methods and systems described herein include optical, electrical, and magnetic memory storage devices.

The sections below described methods and systems for identifying computer source code constructs and how they overcome the shortcomings of previous methods. In section 2, formal semantics that underlie the methods and systems described herein, including formalizations for elemental design patterns, pattern isotopes, and an extension of the object calculus, referred to herein as rho-calculus, are described. In section 4 exemplary tools to put this EDP-based approach into practice are described. A detailed example of how the tools find patterns in source code is then described. In section 5 extensions for both EDPs and the tools are described.

Accordingly, it is an object of the subject matter described herein to provide methods, systems, and computer program products for identifying computer source code constructs.

It is another object of the subject matter described herein to provide methods, systems, and computer program products for identifying computer source code constructs independently of the syntax of the underlying source code.

Some of the objects of the subject matter described herein having been stated hereinabove, and which are addressed in whole or in part by the subject matter described herein present invention, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings, of which:

FIG. 9 is pseudo-code listing illustrating exemplary source code for a Killer Widget application;

FIG. 10 is a feature-rule input file suitable for the OTTER automated inference engine created from the Killer Widget application of FIG. 9;

FIG. 11 is a feature-rule input file suitable for the OTTER automated theorem prover created from the RedirectInFamily EDP;

FIG. 18 is a rho calculus listing of the Killer Widget application of FIG. 9;

FIG. 20 is source code listing for two distinct methods;

DETAILED DESCRIPTION OF THE INVENTION

2. EDPs, Isotopes, and Automated Inference

Figure 1:
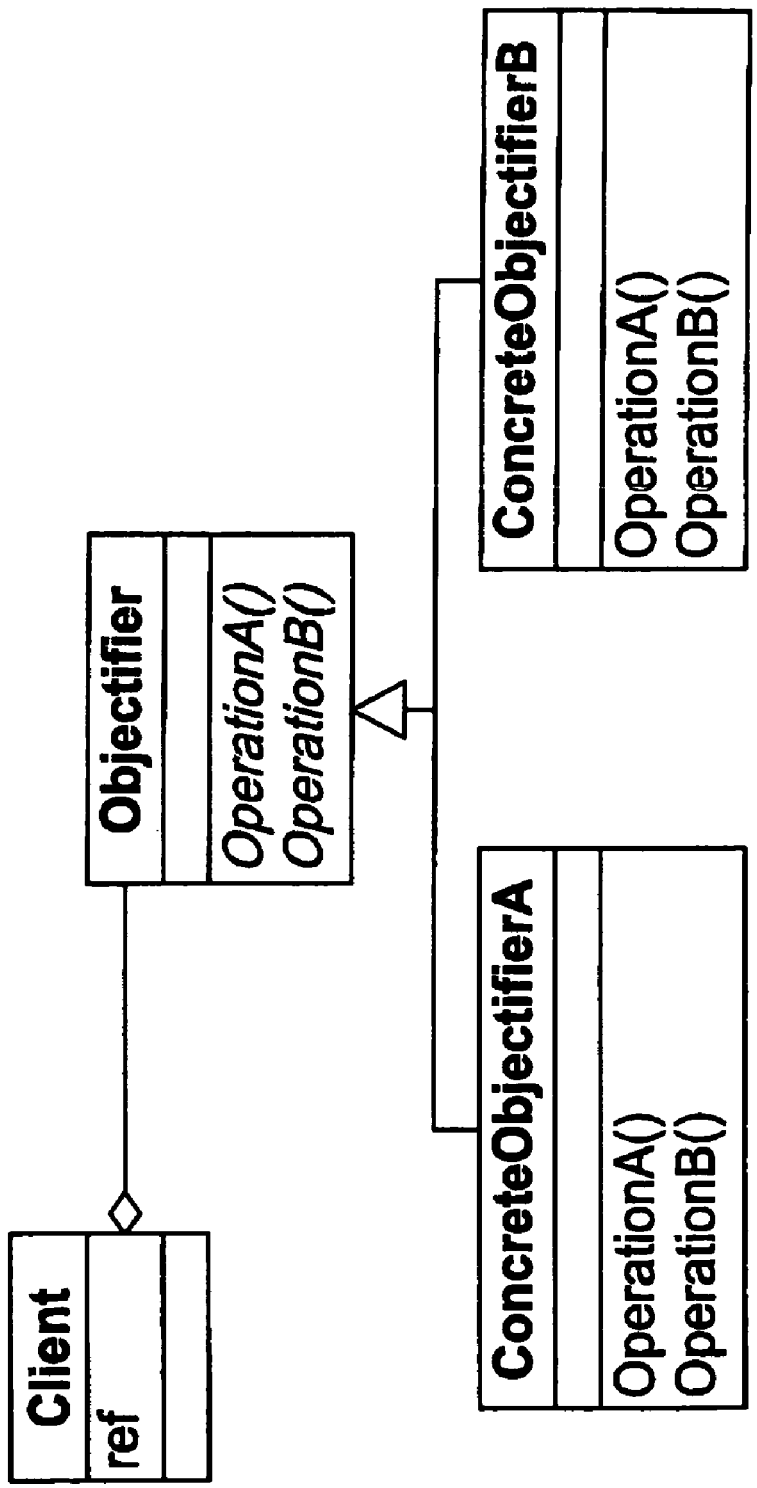
FIG. 1 is a class diagram illustrating an exemplary structure for the Objectifier class.

Elemental Design Patterns and the rho-calculus would be interesting academic exercises only, unless there were good reasons for performing this work. Three applications, including as an education tool, a set of concepts for programming language design, and a formal basis for source code analysis tools will be described in detail below.

2.1. Elemental Design Patterns

Elemental Design Patterns are design patterns that cannot be decomposed into smaller patterns—they sit one level above the primitives of object-oriented programming, such as objects, fields, and methods. As such, they occupy much of the same space as idioms, but are language independent, relying only on the core concepts of object-oriented theory. They perform the same conceptual task as the more common design patterns however, in that they provide solutions to common programming situations, and do so in orthogonal ways, differing only in scope. EDPs are the foundational nuts and bolts from which conceptual design frameworks are created. Also, relying only on the theoretical basis object-oriented, they have one distinct advantage over other approaches directly involving design patterns: they are formalizable. According to an aspect of the subject matter described herein the sigma-calculus, as described in [1], has been extended with a small set of relationship operators that provide a simple but solid basis, the rho calculus, from which to perform interesting analyses.

EDP and SPQR Summary

According to one aspect of the subject matter described herein, a system for pattern query and recognition (SPQR) is provided. The SPQR [34] improves on previous approaches for finding design patterns in source code. Other systems have been limited by the difficulty of describing something as abstract as design patterns. A single design pattern when reduced to concrete code can have myriad realizations, all of which have to be recognized as instances of that one pattern. Other systems have encountered difficulty in spanning these possible implementation variations, due to their reliance on static definitions of patterns and variants. SPQR overcomes this problem by using an inference engine based on core concepts and semantic relationships. The formal foundation of SPQR defines base patterns and rules for how variation can occur, and the inference engine is free to apply variation rules in an unbounded manner. A finite number of definitions in SPQR can match an unbounded number of implementation variations.

The concepts contained in patterns are those that the professional community has deemed important and noteworthy, and they are ultimately expressed as source code that is reducible to a mathematically formal notation. The core concepts themselves have evaded such formalization to date. The methods and systems described herein illustrate that such a formalization is possible, and in addition that it can meet certain essential criteria. Applications of the methods and systems described herein as tools for the developer with a need for extracting patterns from an existing system are also described.

Such a formal solution should be implementation language independent, much as design patterns are, if it is truly to capture universal concepts of programming methodology. A formal denotation for pattern concepts should be a larger part of the formal semantics literature. Patterns are built on the theory and concepts of object-oriented programming, as surely as object-oriented approaches are built on procedural theory.

The formal foundation of the methods and systems described herein is composed of two parts: the fundamental concepts of object-oriented programming and design (Elemental Design Patterns, or EDPs), and the rules for their variation and composition (rho calculus). The EDPs were deduced through careful analysis of the Gang of Four (GoF) design patterns [15] for use of core object-oriented language concepts (such as inheritance, delegation, recursion, etc); this analysis produced eleven EDPs from which the GoF patterns can be composed. It also produced a design space which was filled out to produce sixteen comprehensive EDPs. These additional EDPs may prove useful in defining design patterns from other sources.

2.2 Exemplary System Architecture and Overall Operation

Figure 3:
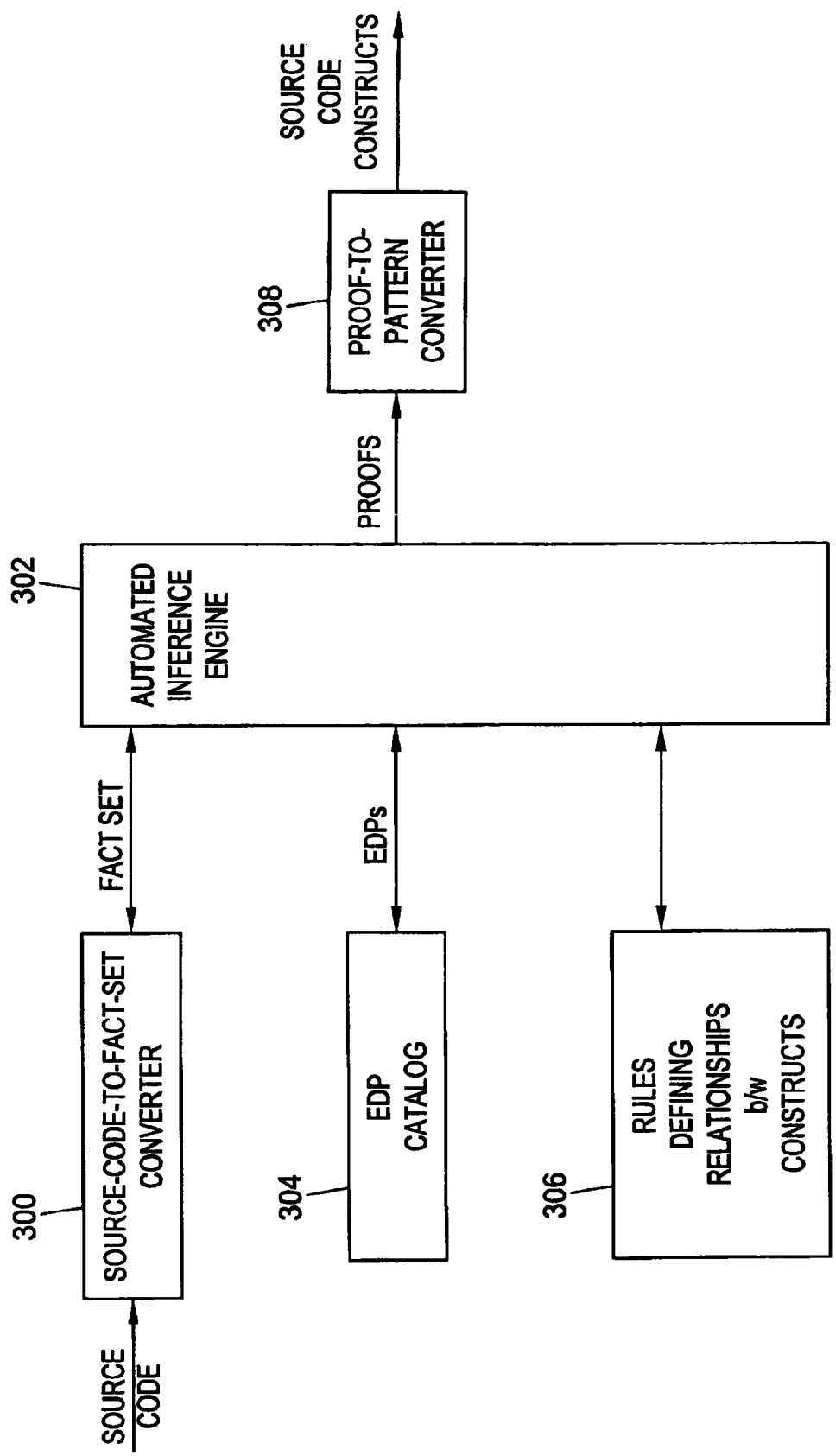
FIG. 3 is a block diagram of a system for identifying computer source code constructs according to an embodiment of the subject matter described herein.

FIG. 3 is a block diagram of a system for identifying computer source code constructs according to an embodiment of the subject matter described herein. Referring to FIG. 3, the system includes a source-code-to-fact-set converter 300 for converting computer source code into a fact set suitable for input to an automated inference engine 302. Automated inference engine 302 may be an automated theorem prover or a deductive database. An exemplary automated theorem prover suitable for use as inference engine 302 is the OTTER automated theorem prover available from Argonne National Laboratory. An EDP catalog 304 contains elemental design patterns suitable for identifying source code constructs. A rule set 306 includes rules that define relationships between source code constructs. Automated inference engine 302 receives the fact set, the EDPs, and the relationship rules as input and outputs proofs. A proof-to-pattern converter 308 outputs patterns or constructs found in the source code. The operation of each of the components illustrated in FIG. 3 along with examples of source code and the various conversions will be described in detail below.

Figure 4:
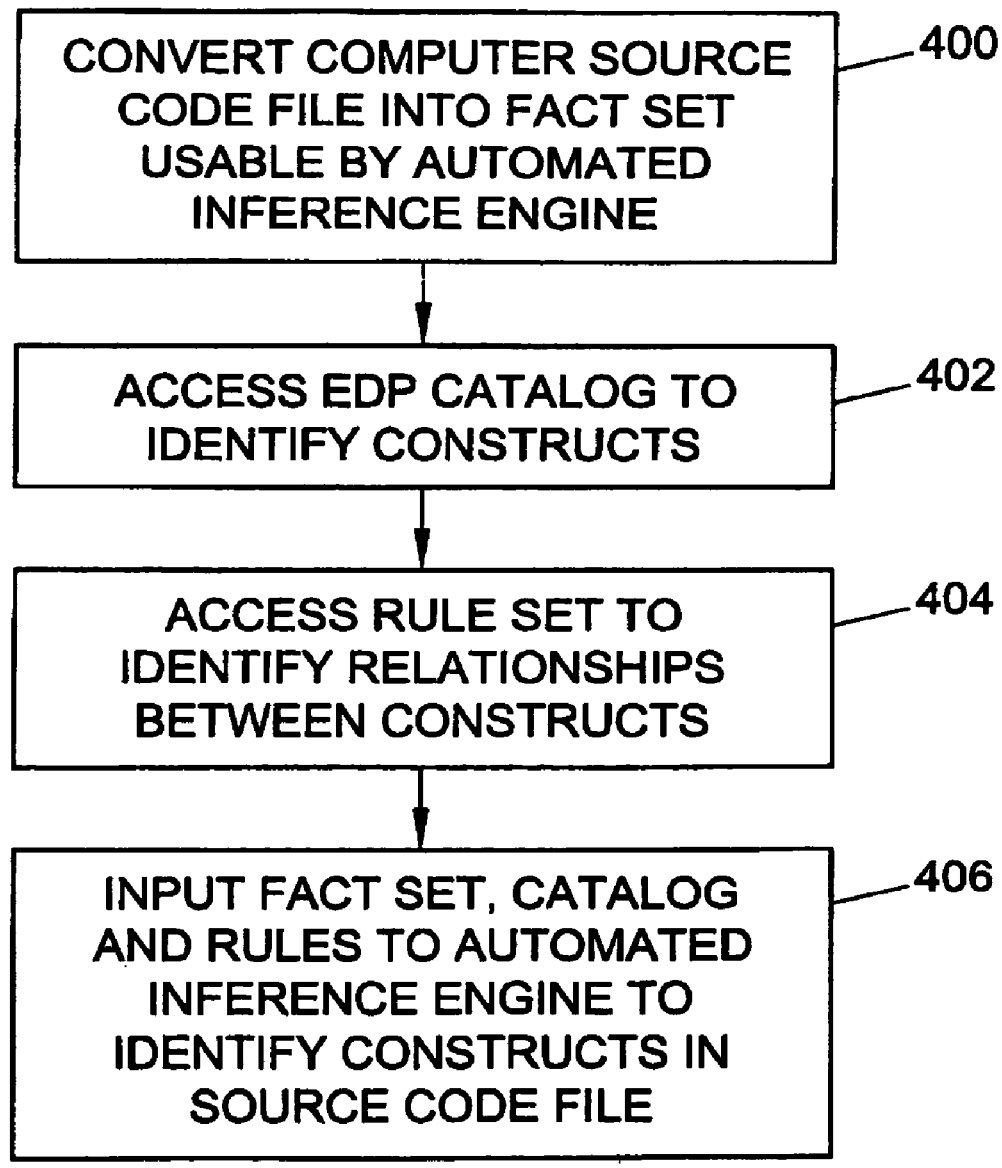
FIG. 4 is a flow chart illustrating exemplary steps for identifying computer source code constructs according to an embodiment of the subject matter described herein.

FIG. 4 is a flow chart illustrating an exemplary overall operation of the system illustrated in FIG. 3. Referring to FIG. 4, in step 400, computer source code is converted into a fact set usable by an automated inference engine. This step may be performed by source-code-to-fact-set converter 300 illustrated in FIG. 3. In step 402, EDP catalog 304 is accessed to identify source code constructs. In step 404, rule set 306 is accessed to identify relationships between the source code constructs. In step 406, the fact set, the catalog, and the rules are input to automated inference engine 302 to identify relationships between the source code constructs. The output of the automated inference engine is one or more proofs that may be converted into an appropriate report format. Details of each of the steps illustrated in FIG. 4 will be provided below.

3. Theory: EDPs, Isotopes, and Rho-Calculus

In this section more complete discussions of the generation of elemental design patterns and a formal presentation of the rho-calculus will be provided. The Elemental Design Patterns were deduced through analysis of the existing design pattern literature and then extended to comprehensively cover the most interesting ways in which objects can interact in object-oriented programming. The sixteen EDPs comprise the core of any design space.

3.1. Examination of Design Patterns

The first task undertaken was to examine the existing canon of design pattern literature, and a natural place to start is the ubiquitous Gang of Four text [15]. Instead of a purely structural inspection, common concepts used in the patterns were identified. A first cut of analysis resulted in eight identified probable core concepts:

AbstractInterface—An extremely simple concept—you wish to enforce polymorphic behavior by requiring all subclasses to implement a method. Equivalent to Woolf's Abstract Class pattern [35], but on the method level. The AbstractInterface EDP is used in most patterns in the GoF group, with the exception of Singleton, Facade, and Memento.

DelegatedImplementation—Another ubiquitous solution, moving the implementation of a method to another object, possibly polymorphic. The DelegatedImplementation EDP is used in most patterns and is a method analog to the C++ pimpl idiom [9].

ExtendMethod—A subclass overrides the superclass' implementation of a method, but then explicitly calls the superclass' implementation internally. It extends, not replaces, the parent's behavior. The ExtendMethod EDP is used in Decorator.

Retrieval—Retrieves an expected particular type of object from a method call. The Retrieval EDP is used in Singleton, Builder, and Factory Method.

Table 1 shown below illustrated exemplary method calling styles in Gang of Four patterns.

TABLE 1

Method Calling Styles in Gang of Four Patterns

| Ownership | Obj Type | Method Type | Abstract | Used In |
|---|---|---|---|---|
| N/A | self | diff | Y | Template Method, Factory Method |
| N/A | super | diff | | Adapter (class) |
| N/A | super | same | | Decorator |
| held | parent | same | Y | Decorator |
| held | parent | same | | Composite, Interpreter, Chain of Responsibility |
| ptr | sibling | same | | Proxy |
| ptr/held | none | none | Y | Builder, Abstract Factory, Strategy, Visitor |
| held | none | none | Y | State |
| held | none | none | | Bridge |
| ptr | none | none | | Adapter (object), Observer, Command, Memento |
| N/A | | | | Mediator, Flyweight |

Iteration—A runtime behavior indicating repeated stepping through a data structure. It may or may not be possible to create an appropriate pattern-expressed description, but it would be highly useful in such patterns as Iterator and Composite.

Invariance—Encapsulates the concept that parts of a hierarchy or behavior do not change. The Invariance EDP is used by Strategy and Template Method.

AggregateAlgorithm—Demonstrates how to build a more complex algorithm out of parts that do change polymorphically. The AggregateAlgorithm EDP is used in Template Method.

CreateObject—Encapsulates creation of an object, similar to Ó Cinnéide's Encapsulate Construction minipattern [23]. The CreateObject EDP is used in most Creational Patterns.

Of the EDPs listed above, AbstractInterface, DelegatedImplementation and Retrieval could be considered simplistic, while Iteration and Invariance are, on the face of things, extremely difficult.

On inspection, five of these possible patterns are centered around some form of method invocation. This led to the investigation of what the critical forms of method calling truly are and whether they could provide insights towards producing a comprehensive collection of EDPs. For the sake of this investigation, a dynamically bound language environment is assumed, but not required. No assumptions regarding features of implementation languages were made. Categorizing the various forms of method calls in the GoF patterns can be summarized as in Table 1, grouped according to four criteria.

Assume that an object a of type A has a method f that the program is currently executing. This method then internally calls another method, g, on some object, b, of type B. The columns in Table 1 represent, respectively, how a references b, the relationship between A and B, if any, the relationship between the types of f and g, whether or not g is an abstract method, and the patterns that this calling style is used in. Note that this is all typing information that is available at the time of method invocation, since only the types of the objects a and b and the methods f and g are being inspected. Polymorphic behavior may or may not occur, but a runtime analysis is not being performed. This is strictly an analysis based on the point of view of the calling code.

If the ownership attribute is eliminated, the table vastly simplifies, as well as reducing the information to strictly type information. In a dynamic language, the concept of ownership begins to break down, reducing the question of access by pointer or access by reference to a matter of implementation semantics in many cases. By reducing that conceptual baggage in this particular case, such traits can be later reintroduced. Similarly, other method invocation attributes could be assigned, but do not fit within the present typing framework for classification. For instance, the concept of constructing an object at some point in the pattern is used in the Creational Patterns: Prototype, Singleton, Factory Method, Abstract Factory, and Builder, as well as others, such as Iterator and Flyweight. This reflects the CreateObject component, but can be placed aside for now to concentrate on the typing variations of method calls.

TABLE 2

Final Method Calling Styles in Gang of Four Patterns

| | Obj Type | Method Type | Used In |
|---|---|---|---|
| 1 | self | diff | Template Method, Factory Method |
| 2 | super | diff | Adapter (class) |
| 3 | super | same | Decorator |
| | parent | same | Composite, Interpreter, Chain of Responsibility, Decorator |
| | sibling | same | |
| 4 | none | none | Proxy |
| 5 | | | Builder, Abstract Factory, Strategy, Visitor, State, Bridge |
| 6 | | | Adapter (object), Observer, Command, Memento |

Table 1 can be reorganized, removing the Mediator and Flyweight entry on the last line, as no typing attributable method invocations occur within those patterns. State and Bridge can be merged into the appropriate calling styles. After margining State and Bridge, four of the remaining list of EDPs are simply variations on whether the called method is abstract or not. By identifying this as an instance of the AbstractInterface component from above, this list can be further simplified to a final collection of the six primary method invocation styles in the GoF text, shown in Table 2. Reincorporation of AbstractInterface to rebuild the calling styles used in the original patterns will be described in detail below.

A glance at the first column of Table 2 reveals that it can be split into two larger groups, those which call a method on the same object instance (a=b) and those which call a method on another object (a≠b). The method calls involved in the GoF patterns now can be classified by three orthogonal properties:

The relationship of the target object instance to the calling object instance

The relationship of the target object's type to the calling object's type

The relationship between the method signatures of the caller and callee

This last item recurs often in analysis, and once it is realized that it is the application of Beck's Intention Revealing Message best practice pattern [4], it becomes apparent that this is an important concept, referred to herein as similarity.

3.2. Method Call EDPs

The first axis in the above list is simply a dichotomy between Self and Other. The second describes the relationship between A and B, if any, and the third compares the types (consisting of a function mapping type, F and G, where $F=X \rightarrow Y$ for a method taking an object of type X and returning an object of type Y) of f and g, simply as another dichotomy of equivalence.

It is illustrative at this point to attempt creation of a comprehensive listing of the various permutations of these axes, and see where the invocation styles identified herein fall into place. For the possible relationships between A and B, the list items may include 'Parent', where $A <: B$, 'Sibling' where $A <: C$ and $B <: C$: for some type C, and 'Unrelated' as a collective bin for all other type relations at this point. The notation <: is taken from Abadi and Cardelli's calculus [1]. $A <: B$ reads, "A is a subtype of B." To these items, 'Same' or $A=B$ can be added as a simple type relation between the objects.

3.2.1. Initial List

The invocation styles can be filled in from the final list from the GoF patterns, mapping them to the six categories in Table 2:

1. Self (a = b)
  (a) Self (A = B, or a = this)
    i. Same (F = G)
    ii. Different (F ≠ G)      Conglomeration[1]
  (b) Super (A <: B, or a = super)
    i. Same (F = G)      ExtendMethod[3]
    ii. Different (F ≠ G)      RevertMethod[2]
2. Other (a ≠ b)
  (a) Unrelated
    i. Same (F = G)      Redirect[6]
    ii. Different (F ≠ G)      Delegate[6]
  (b) Same (A = B)
    i. Same (F = G)
    ii. Different (F ≠ G)
  (c) Parent (A <: B)
    i. Same (F = G)      RedirectInFamily[4]
    ii. Different (F ≠ G)
  (d) Sibling (A <: C, B <: C, A is not a subtype of B)
    i. Same (F = G)      RedirectInLimitedFamily[5]
    ii. Different (F ≠ G)

Each of the categories listed above captures a concept as much as a syntax. Each expresses a direct and explicit way to solve a common problem, providing a structural guide as well as a conceptual abstraction. In this way they fulfill the requirements of a pattern, as generally defined, and more importantly, given a broad enough context and minimalist constraints, fulfill Alexander's original definition as well as any decomposable pattern language can [2]. These categories are described herein as meeting the definition of design patterns.

The EDP nomenclature used herein is a reflection of the intended uses of the various constructs, but requires some defining:

Conglomeration—aggregating behavior from methods of Self. Used to encapsulate complex behaviors into reusable portions within an object.

ExtendMethod—a subclass wishes to extend the behavior of a superclass' method instead of strictly replacing it.

RevertMethod—a subclass wants not to use its own version of a method for some reason, such as namespace clash in the case of Adapter (class).

Redirect—a method wishes to redirect some portion of its functionality to an extremely similar method in another object. The term 'redirect' is used due to the usual use of such a call, such as in the Adapter (object) pattern.

Delegate—a method simply delegates part of its behavior to another method in another object.

RedirectInFamily—redirection to a similar method but within one's own inheritance family, including the possibility of polymorphically messaging an object of one's own type.

RedirectInLimitedFamily—a special case of the above, but limiting to a subset of the family tree, excluding possibly messaging an object of one's own type.

3.2.2. Complete List

A complete list of method call EDPs is provided below.

| | | |
|---|---|---|
| 1. Self (a = b) | | |
| (a) Self (a = this) | | |
| i. Same (F = G) | Recursion | |
| ii. Different (F ≠ G) | Conglomeration | |
| (b) Super (a = super) | | |
| i. Same (F = G) | ExtendMethod | |
| ii. Different (F ≠ G) | RevertMethod | |
| 2. Other (a ≠ b) | | |
| (a) Unrelated | | |
| i. Same (F = G) | Redirect | |
| ii. Different (F ≠ G) | Delegate | |
| (b) Same (A = B) | | |
| i. Same (F = G) | RedirectedRecursion | |
| ii. Diff (F ≠ G) | DelegatedConglomeration | |
| (c) Parent (A <: B) | | |
| i. Same (F = G) | RedirectInFamily | |
| ii. Different (F ≠ G) | DelegateInFamily | |
| (d) Sibling (A <: C, B <: C, A is not a subtype of B) | | |
| i. Same (F = G) | RedirectInLimitedFamily | |
| ii. Different (F ≠ G) | DelegateInLimitedFamily | |

Recursion -- a concrete link between primitive language features and EDPs.
RedirectedRecursion -- a form of object level iteration.
DelegatedConglomeration -- gathers behaviors from external instances of the current class.
DelegateInFamily -- gathers related behaviors from the local class structure.
DelegateInLimitedFamily -- Limits the behaviors selected to a particular base definition.

3.3. Object Element EDPs

At this point a fairly comprehensive array of method/object invocation relations has been described. The original list of concepts culled from the GoF patterns can now be re-visited. Of the original eight, three are absorbed within the method invocations list: DelegatedImplementation, ExtendMethod, and AggregateAlgorithm. Of the remaining five, two are some of the more problematic EDPs to consider: Iteration, and Invariance. These can be considered sufficiently difficult concepts at this stage of the research and they will be more fully explored in the proposed project.

The remaining three EDPs, CreateObject, AbstractInterface, and Retrieve, deal with object creation, method implementation, and object referencing, respectively. These are core concepts of what objects and classes are and how they are defined. CreateObject creates instances of classes, AbstractInterface determines whether or not that instance contains an implementation of a method, and Retrieve is the mechanism by which external references to other objects are placed in data fields. These are the elemental creational patterns and they provide the construction of objects, methods, and fields. Since these are the three basic physical elements of object oriented programming [1], they provide a complete base core of EDPs for this classification. Classes, prototypes, traits, selectors, and other aspects of various object oriented languages are expressible using only the three constructs identified [1].

CreateObject—constructs an object of a particular type.

AbstractInterface—indicates that a method has not been implemented by a class.

Retrieve—fetches objects from outside the current object, initiating external references.

The method invocation EDPs from the previous section are descriptions of how these object elements interact, defining the relationships between them. One further relationship is missing, however: that between types. Subtyping is a core relationship in object-oriented languages, usually expressed though an inheritance relation between classes. Subclassing, however, is not equivalent to subtyping [1], and should be noted as a language construct extension to the core concepts of object-oriented theory. Because of this, a typing relation EDP, inheritance, that creates a structural subtyping relationship between two classes is introduced. Not all languages directly support inheritance. For example, some languages rely on dynamic subtyping analysis to determine appropriate typing relations. Examples of such language include prototype-based languages, such as Cecil [8] or Newton Script [3].

Inheritance—enforces a structural subtyping relationship.

3.4. Sigma Calculus

Desired traits of a formalization language include that it be mathematically sound, consist of simple reduction rules, have enough expressive power to encode directly object-oriented concepts, and have the ability to encode flexibly relationships between code constructs. The sigma calculus [1] is used herein as a formal basis, given the above requirements. It is a formal denotational semantics that deals with objects as primary components of abstraction and has been shown to have a highly powerful expressiveness for various language constructs.

A subset of sigma-calculus is described herein for the purposes of illustrating the operation of the methods and systems for identifying source code constructs described herein. Specifically, the concepts of type definition, object typing, and type subsumption (inheritance) are used. A type T is defined by $T \equiv [\ldots]$, where the contents of the brackets are method and field definitions. An object O is shown to be of type T by O:T. If type T' is a subtype of type T, such as it would be under inheritance, then T'<:T.

3.5 Rho Calculus

The EDPs are useful in many areas as they stand, but for formal analysis of source code, an approach that would provide a semantic basis for logical inferences was needed. Rho-calculus is the formal foundation of the EDP catalog. It allows facts about a codebase to be encoded into a simple yet powerful notation that can be directly input to automated theorem provers, such as the OTTER system used in SPQR. Without this, the EDPs would be conceptually useful but impractical to use in an automated tool system.

This section defines the rho fragment ($\Delta_\rho$) of the rho-calculus which results when this fragment is added to the sigma-calculus. By defining this as a calculus fragment, researchers can add it to the proper mix of other fragments defined in [1] to create the particular formal language they need to achieve their goals.

3.6. Definitions

Let O be defined as the set of all objects instantiated within a given system. Then $\mathcal{O} \in O$ is some object in the system. Similarly, let M be the set of all method signatures within the system. Then $\mu \in M$ is some method signature in the system. $\mathcal{O}.\mu$ is then the selection of some method signature imposed on some object. We make no claim here that this is a well-formed selection, and in fact we have no need to—the underlying sigma-calculus imposes that construct for us. $\tau$ is some type in the set of all types T defined in the system such that if $\mathcal{O}$ is of type $\tau$, then $\mathcal{O}: \tau$ $\mathcal{O} \in O, \mu \in M, \tau \in T$ Let A be either an object $\mathcal{O}$ or a method selection $\mathcal{O}.\mu$. Let A' be another such set for distinct object and method selections. (By convention, the base forms of the symbols will appear on the left side of the reliance operator (relop), and the prime forms will appear on the right hand side to indicate distinct items.) $\chi$ is a signifier that a particular reliance operator may be one of our five variants: $\{\mu, \phi, \sigma, \kappa, \gamma\}$. $\mu$ is a method selection reliance, $\phi$ is a field reliance, $\sigma$ is a state change reliance, $\kappa$ is a data cohesion reliance, and $\gamma$ is a 'generalized' reliance where a reliance is known, but the exact details are not. (It is analogous to more traditional forms of coupling theory.) $\overset{\star}{o}$ an operator trait indicator, allowing for the three types of reliance specialization (+, −, o) to be abstracted in the following rules. The appearance of this symbol indicates that any of the three may exist there.

A={$\mathcal{O}, \mathcal{O}.\mu$}

A'={$\mathcal{O}', \mathcal{O}'.\mu'$}

$\chi$={$\mu, \phi, \sigma, \kappa, \gamma$}

$\overset{\star}{o}$={+, −, o}

The basic reliance operator symbol, <, was selected to be an analogue to the inheritance/subsumption of types indicator in sigma calculus, <:, which can be interpreted to mean a reliance of type. Since the typing symbol is :, this leaves < as a natural for the concept of 'reliance on'. This, combined with our three symbols from $\chi$ above, gives rise to five reliance operators: $<_\mu, <_\phi, <_\sigma, <_\kappa, <_\gamma$.

3.7. Creation

Three rules create instances of reliance operators. The first rule is the Method Invocation Relop rule which states that given a method $\mu$ invoked on object $\mathcal{O}$, if that method contains a method invocation call to method $\mu'$ of another object $\mathcal{O}'$, a method reliance exists between the two, indicated by the $\mu$ form reliance operator ($<_\mu$):

$$\frac{\mathcal{O} \cdot \mu \equiv [\mu = \varsigma()\mathcal{O}' \cdot \mu']}{\mathcal{O} \cdot \mu <_\mu \mathcal{O}' \cdot \mu'} \quad (1)$$

The notation used in the equations illustrated herein is sigma calculus notation as defined in [1]. As an example of sigma calculus notation, in Equation 1, the top portion indicates that method $\mu$ of object $\mathcal{O}$ includes a method $\mu'$ of object $\mathcal{O}'$. The bottom portion of Equation 1 is shorthand notation for the top portion.

A similar rule can be used for deriving an instance of a field reliance operator. This one states that if an object's method $\mathcal{O}.\mu$ contains a reference to another object $\mathcal{O}'$, then there is a reliance between the two based on reference access of the field, indicated by the $\phi$ form reliance operator ($<_\phi$). This is the Method Field Relop rule:

$$\frac{\mathcal{O} \cdot \mu \equiv [\mu = \varsigma()\mathcal{O}']}{\mathcal{O} \cdot \mu <_\phi \mathcal{O}'} \quad (2)$$

Similarly, if an object $\mathcal{O}'$ is referenced as an instance variable data field of an object $\mathcal{O}$, then the Object Field Relop rule can be used:

$$\frac{\mathcal{O} : \tau, \tau = [\mathcal{O}' : \tau']}{\mathcal{O}' <_\phi \mathcal{O}'} \quad (3)$$

Possible state changes in an object can actually now be detected. Assume that the only way to perform imperative side-effects on an object's state is through calling a method of that object.

Assume an object $\mathcal{O}$ with methods f and g, and state instance object $\mathcal{O}'$ which has it's own method h: $\mathcal{O}: \tau, \tau=[f: \tau', g: \tau'', \mathcal{O}: \tau'''], \tau'''=[h: \tau'''']$. The only way a state change of $\mathcal{O}$ can happen is if h is called on $\mathcal{O}'$, since that's the only way $\mathcal{O}$ is going to change state. Since $\mathcal{O}'$ is hidden, only $\mathcal{O}$ can call $\mathcal{O}.\mathcal{O}'$ h, and only $\mathcal{O}.$f or $\mathcal{O}.$g call do so. The only time we would care is if $\mathcal{O}.$f or $\mathcal{O}.$g relied on $\mathcal{O}'$ for some reason.

So, if for some $\mu$ in the method dictionary of $\mathcal{O}$, and some $\mu''$ in the method dictionary of $\mathcal{O}'$, $\mathcal{O}.\mu$ calls $\mathcal{O}. \mathcal{O}'\mu''$, and for some $\mu'$ in the method dictionary of $\mathcal{O}$, $\mathcal{O}. \mu'$ relies on $\mathcal{O}. \mathcal{O}'$ for any reason, then $\mathcal{O}. \mu'$ relies on a *possible* state change by $\mathcal{O}$. $\mu$ in the State Change Relop:

$$\frac{\mathcal{O} \cdot \mu <_\mu \mathcal{O} \cdot \mathcal{O}' \mu'', \mathcal{O} \cdot \mu' <_\phi \mathcal{O} \cdot \mathcal{O}'}{\mathcal{O} \cdot \mu' <_\sigma \mathcal{O} \cdot \mu} \quad (4)$$

3.8. Similarity Specializations

Further details of the relationships between the operands of the reliance operators can be determined by inspecting the method signatures or the object instances for the relops, reflecting the similarity trait found in the EDP Catalog.

Similarity is a formalization of the concept behind Kent Beck's Intention Revealing Message best practice pattern [4], in which Beck states "Name methods after what they accomplish." Following this pattern means that if we see two methods with the same name, then we can deduce that for most cases, they are intended to perform similar, if not exactly, the same task. This concept can be extended to a more generalized form: "Similarly named methods, fields, and classes are likely to have similar intent, behaviour, or function." We call these entities similar.

On each side of a reliance operator, there is a construct of the form lhs.rhs. These two sides of the dot operator are referred to respectively as leftdot and dotright, to distinguish them from the left hand side and right hand side of the reliance operator itself. We can take each of these construct halves and perform a similarity analysis, which in this case is done by a simple lexicographic equality. Other, more sophisticated analyses such as semantic analysis or retrieving known semantic information from a database are other possible approaches.

After establishing that two entities are similar, we can note this in the formalization by (+). If we can prove that two entities are definitively not similar, we refer to them as dissimilar, noted as (−). If similarity or dissimilarity has not been established, then the similarity is said to be indeterminant, shown by (○).

Once a similarity relationship is established between either the leftdot or rightdot entities, it can be added to the reliance operator as so: $<_\chi \overset{\circ}{\cdot} \overset{\circ}{\circ}$. The similarity trait is patterned after the construct found in leftdot and dotright. The similarity trait on the left side of the dot indicates any relationship between the leftdot entities, while the right side of the similarity trait and the dotright entities have an equivalent correspondence.

For example, assume that we have an object O with method m that calls method m' of object O'. This mu-form relop can be shown as:

$$O.m <_\mu O'.m' \qquad (5)$$

This is the most general form, indicating no known similarity relationships, either positive or negative. Now, if we can ascertain that O and O' are indeed the same object, we can add that relationship to the relop:

$$O.m <_\mu^{+,\circ} O'.m' \qquad (6)$$

Note that the ○ is used as a placeholder to make the notation more clear, but establishing that the dotright correlation is unknown. Likewise, if we can ascertain that m and m' have the same method signature (indicating a similar intent), then we can add that to the relop:

$$O.m <_\mu^{+,+} O'.m' \qquad (7)$$

This is the core of the formalization of the Recursion EDP, and demonstrates how the rho-calculus provides a solid basis for formal analysis of the EDPs. If, however, we are able to establish that the leftdot entities are in fact not the same, then we can indicate this as well, leading to the formal basis for the Redirect EDP:

$$O.m <_\mu^{-,+} O'.m' \qquad (8)$$

In this way we can establish similarity or dissimilarity relationships and convey them in a straightforward and clear manner in the formal notation. This approach works for all five relop forms, and provides a strong semantic clue as to the conceptual relationship between the entities on either side of the relop.

3.9. Transitivity

Transitivity is the process by which large chains of reliance can be reduced to simple facts regarding the reliance of widely separated objects in the system. The five forms of relop all work in the same manner in these rules. The specialization trait of the relop (±) is not taken into consideration, and in fact can be discarded during the application of these rules—appropriate traits can be re-derived as needed.

Given two relop facts, such that the same object or method invocation appears on the dotright of the first and the leftdot of the second, then the leftdot of the first and dotright of the second are involved in a reliance relationship as well. If the two relops are of the same form, then the resultant relop will be the same as well.

$$\frac{A <_\chi A', A' <_{\chi'} A''}{A <_\chi A''} \text{ if } f \, \chi = \chi' \qquad (9)$$

If, however, the two relops are of different forms, then the resultant relop is our most general form, γ. This indicates that while a relationship exists, we can make no hard connection according to our definitions of the other four forms. Note that this is the only point at which γ form relops are created.

$$\frac{A <_\chi A', A' <_{\chi'} A''}{A <_\gamma A''} \text{ if } f \, \chi \neq \chi' \qquad (10)$$

This is the key element of our isotopes, which allow design patterns to be inferred in a flexible manner. We do not require each and every variation of a pattern to be statically encoded, instead the transitivity in the rho-calculus allows us to simply encode the relationships between elements of the pattern, and an automated theorem power can infer as many possible situations as the facts of the system provide. In this way a massive search space can be created automatically from a small number of design pattern definitions.

3.10. Generalizations

These are generalizations of relops, the opposite of the specialization rules earlier. Each of them generalizes out some piece of information from the system that may be unnecessary for clear definition of certain rules and situations. Information is not lost to the system, however, as the original statements remain.

The first two generalize the right hand side and left hand sides of the relop, respectively, removing the method selection but retaining the object under consideration. They are RHS Generalization and LHS Generalization.

$$\frac{A <_{\chi^\circ}^{\pm} \mathcal{O}' \cdot \mu'}{A <_{\chi^\circ}^{\pm} \mathcal{O}'} \qquad (11)$$

$$\frac{\mathcal{O} \cdot \mu <_{\chi^\circ}^{\pm} A'}{\mathcal{O} <_{\chi^\circ}^{\pm} A'} \qquad (12)$$

This is a Relop Generalization. It indicates that the most general form of reliance (γ) can always be derived from a more specialized form (μ, φσ, κ).

$$\frac{A <_\chi A'}{A <_\gamma A'} \qquad (13)$$

Similarly, the Similarity Generalization states that any specialized similarity trait form of a relop implies that the more general form is also valid.

$$(\chi = \mu, \phi) \frac{A <_{\chi^\pm} A'}{A <_\chi A'} \quad (14)$$

3.11. Objects vs. Types

It would seem natural to use types instead of actual objects in the reliance operators, but there is a fundamental incompatibility between $\Delta\rho$ and subsumption of types which makes this approach difficult for most practical applications of our analysis technique. Instead, since we are directly analyzing source code, we have the opportunity to use more information regarding object instances than would be evident in class diagramming notations such as UML.

FamilyHead≡[operation: A] (15)

Redirector<: FamilyHead (16)

Redirector≡[target: Family Head, operation: A=ζ($\chi_i$) {target.operation}] (17)

r: Redirecter (18)

fh: FamilyHead (19)

r.target=fh (20)

3.12. Example: RedirectInFamily

Figure 5:
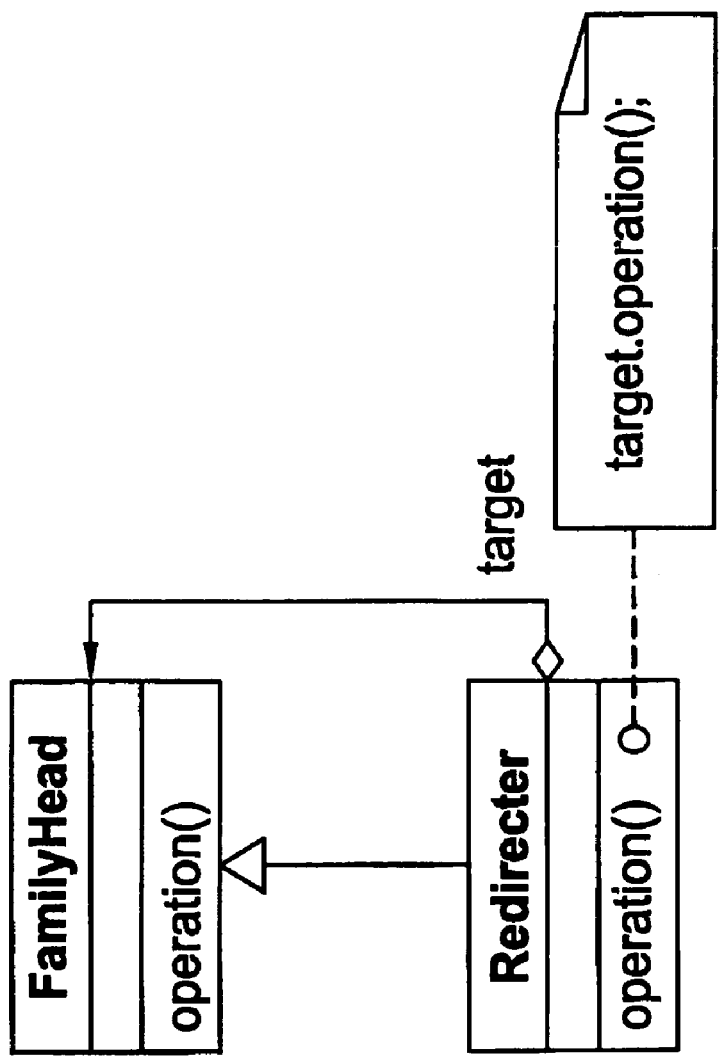
FIG. 5 is a class diagram illustrating an exemplary structure for the RedirectInFamily EDP according to an embodiment of the subject matter described herein.

Consider the class diagram for the structure of the EDP RedirectInFamily [33], in FIG. 5. Taken literally, it specifies that a class wishes to invoke a 'similar' method (where similarity is evaluated based on the signature types of the methods, as hinted at by Beck's Intention Revealing Message best practice pattern [4]: equivalent signatures are 'similar', non-equivalent signatures are 'dissimilar') to the one currently being executed, and it wishes to do so on an object of its parent-class' type. This sort of open-ended structural recursion is a part of many patterns.

If we take the Participants specification of RedirectInFamily, we find that:

FamilyHead defines the interface, contains a method to be possibly overridden.

Redirecter uses interface of FamilyHead through inheritance, redirects internal behavior back to an instance of FamilyHead to gain polymorphic behavior over an amorphous object structure.

We can express each of these requirements in sigma-calculus, as in Equations 15 through 20.

This is a concrete implementation of the RedirectInFamily structure, but it fails to capture the reliance of the method Redirecter.operation on the behavior of the called method FamilyHead.operation. It also has an overly restrictive requirement concerning r's ownership of target when compared to many coded uses of this pattern. So, we introduce our reliance operators to produce a rho-calculus definition:

r.operation$<_{\mu+}$r.target.operation (21)

r$<_\phi$r.target (22)

We can reduce two areas of indirection . . .

$$\frac{r.target = fh, \; r.operation <_{\mu+} r.target.operation}{r.operation <_{\mu+} fh.operation} \quad (23)$$

$$\frac{r <_\phi r.target, \; r.target = fh}{r <_\phi fh} \quad (24)$$

. . . and now we can produce a set of clauses to represent RedirectInFamily:

$$\frac{\begin{array}{c} Redirector <: FamilyHead, \\ r: Redirecter, \\ fh: FamilyHead, \\ r.operation <_{\mu+} fh.operation \\ r <_\phi fh \end{array}}{RedirectInFamily \, (Redirecter, \\ FamilyHead, operation)} \quad (25)$$

3.13. Isotopes

Conventional wisdom holds that formalization of patterns in a mathematical notation will inevitably destroy the flexibility and elegance of patterns. An interesting side effect of expressing our EDPs in the rho-calculus, however, is an increased flexibility in expression of code while conforming to the core concept of a pattern. We term variations of code expression that conform to the concepts and roles of an EDP isotopes.

Figure 6:
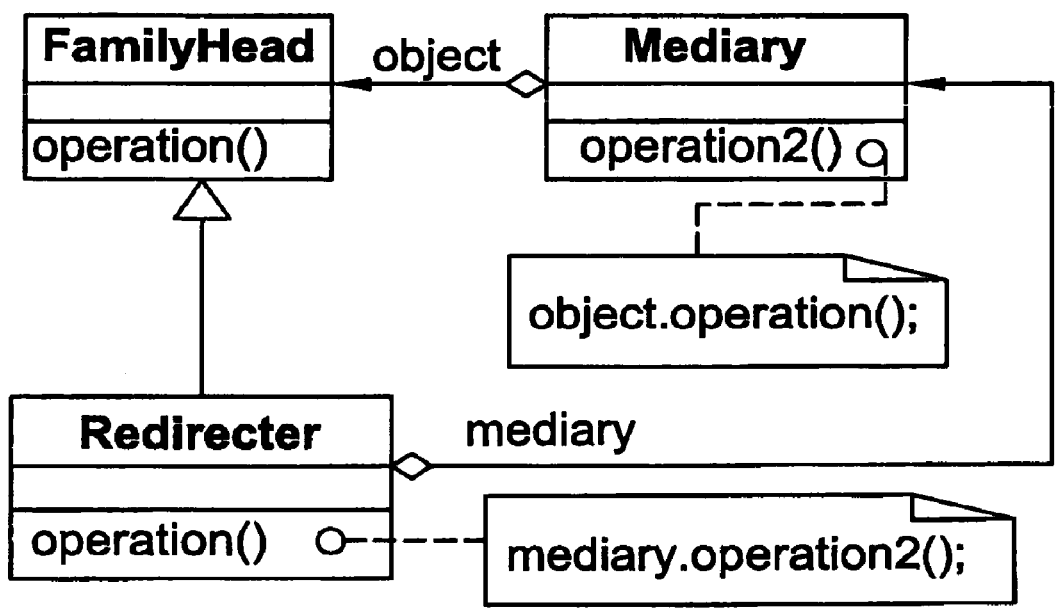
FIG. 6 is a class diagram and a rule listing for the RedirectInFamily EDP.

Consider now FIG. 6, which illustrates the RedirectInFamily isotope. At first glance, FIG. 6 does not look much like the original class diagram for the RediretinFamily EDP illustrated in FIG. 5. A new class has been introduced to the system, and the static criteria that the subclass' method invoke the superclass' instance has been replaced by a new calling chain. In fact, this construction looks quite similar to the transitional state while applying Martin Fowler's Move Method refactoring [14].

This is precisely an example of a variation of RedirectInFamily when viewed as a series of formal constructs, as in Equations 26 though 34.

Redirecter<:FamilyHead (26)

r:Redirecter (27)

fh: FamilyHead (28)

r.mediary=m (29)

m.object=fh (30)

r.operation$<_\mu^{--}$r.mediary.operation2 (31)

m.operation2$<_\mu^{--}$m.object.operation (32)

r.operation$<_\phi^{+,\circ}$r.mediary (33)

m.operation$<_\phi^{+,\circ}$m.object (34)

Equations 26-34 can be reduced. One reduction that can be performed includes an equality operation on Equations 29 and 31:

$$\frac{r.operation <_{\mu-} r.mediary.operation2,}{r.mediary = m} \quad (35)$$
$$r.operation <_{\mu-} m.operation2$$

A further reduction includes applying transitivity to Equations 35 and 32, converting two dissimilarity method reliances into a similarity form:

$$\frac{r.operation <_{\mu-} m.operation2,}{m.operation2 <_{\mu-} m.object.operation} \quad (36)$$
$$r.operation <_{\mu+} m.object.operation$$

$$\frac{r.operation <_{\mu+} m.object.operation, m.object = fh}{r.operation <_{\mu+} fh.operation} \quad (37)$$

Likewise, Equations 29, 30, 33 and 34 can be combined as follows:

$$\frac{\begin{array}{c} r.operation <_\phi r.mediary, \\ m.operation <_\phi m.object, \\ r.mediary = m, \\ m.object = fh \end{array}}{r <_\phi fh} \quad (38)$$

If we now take Equations 26, 27, 28, 37, and 38 we find that we have satisfied the clause requirements set in our original definition of RedirectInFamily, as per Equation 25. This alternate structure is an example of an isotope of the RedirectInFamily pattern and required no adaptation of our existing rule. Our single rule takes the place of an enumeration of static pattern definitions.

The concepts of object relationships and reliance are the key. It is worth noting that, while this may superficially seem to be equivalent to the common definition of variant, as defined by Buschmann [7], there is a key difference: encapsulation. Isotopes may differ from strict pattern structure in their implementation, but they provide fulfillment of the various roles required by the pattern and the relationships between those roles are kept intact. From the view of an external calling body, the pattern is precisely the same no matter which isotope is used. Variants are not interchangeable without retooling the surrounding code, but isotopes are. This is an essential requirement of isotopes, and precisely why we chose the term. This flexibility in internal representation grants the implementation of the system a great degree of latitude, while still conforming to the abstractions given by design patterns.

4. Exemplary SPQR Toolchain

The methods and systems described herein provide solutions to a ubiquitous problem in software engineering—how best to aid an engineer in comprehending a large or complex system. One such way is to provide automated tools to extract conceptual information and present it to the user in a meaningful way. The present System for Pattern Query and Recognition [34] (SPQR) performs this task, finding instances of known design patterns within source code and alerting the engineer to their presence. Such a system has many direct applications, such as system inspection during education, ensuring that intended patterns exist in the final code, and investigation of unintended pattern instances that may provide cues for refactoring.

Figure 7:
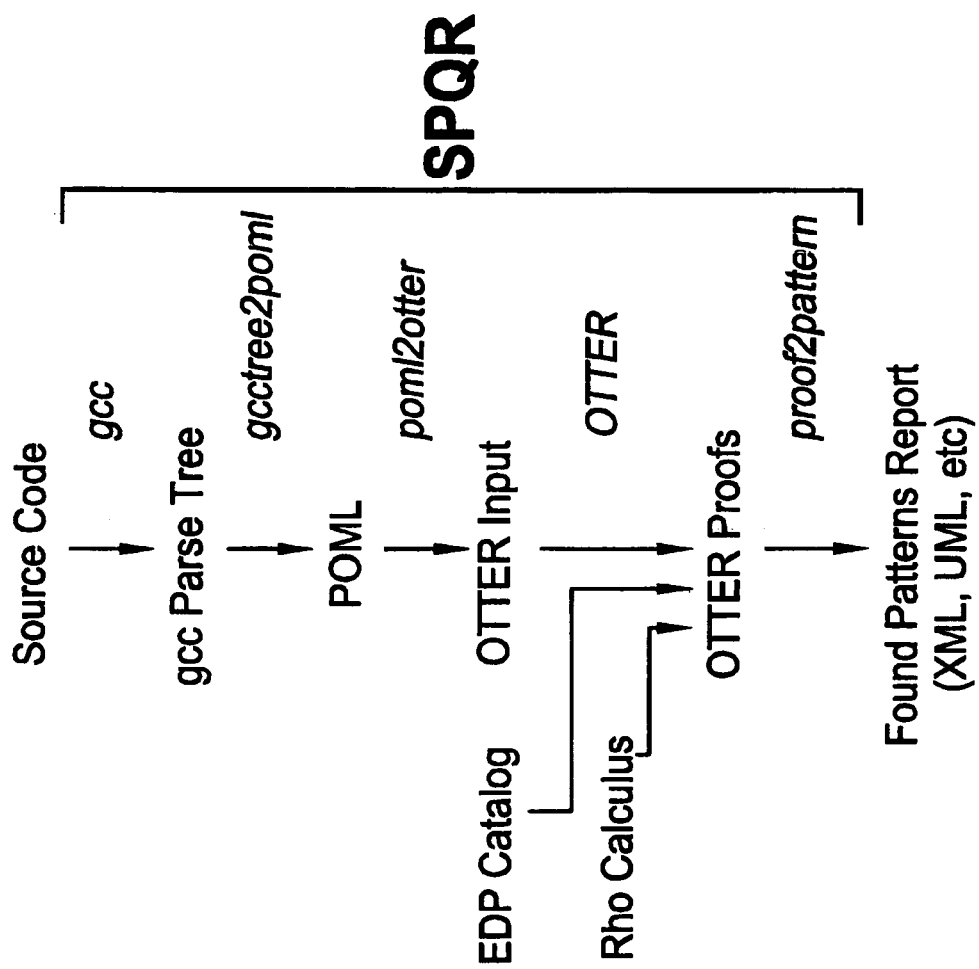
FIG. 7 is a flow diagram illustrating exemplary operation of an SPQR toolchain according to an embodiment of the subject matter described herein.

SPQR relies on the formal nature of EDPs and the rho-calculus to perform the bulk of the discovery, by using an automated inference engine to infer the existence of patterns in the source code under scrutiny. The SPQR toolchain may include several components, shown in FIG. 7. In FIG. 7, the components of the SPQR toolchain include the gcc compiler, a gcctree2poml converter, the OTTER automated theorem prover, a proof2pattern converter, an EDP catalog, and Rho Calculus. Each of these components represents specific examples of the functional components illustrated in FIG. 3. For example, the gcc compiler and the gcctree2poml converter in FIG. 7 are examples of source-code-to-fact-set converter 300 illustrated in FIG. 3. OTTER in FIG. 7 is an example of automated inference engine 302 illustrated in FIG. 3. The EDP catalog in FIG. 7 corresponds to EDP catalog 304 illustrated in FIG. 3. Rho Calculus in FIG. 7 corresponds to rules 306 illustrated in FIG. 3. The proof2pattern component illustrated in FIG. 7 corresponds to proof to pattern converter 308 illustrated in FIG. 3.

From the engineer's point of view, SPQR is a single fully automated tool that performs the analysis from source code and produces a final report. A simple script provides the workflow, by chaining several modular component tools, centered around tasks of source code feature detection, feature-rule description, rule inference, and query reporting. Compiler output of the syntax tree of a codebase (one current input source is gcc) is transformed into our formal notation encoded as input to the OTTER automated theorem prover [19]. This fact set, combined with the pre-defined encodings for the EDP Catalog and the relationships rules of rho-calculus are operated on by OTTER to find instances of design patterns which are then reported to the user. SPQR is language and domain independent, and would be impractical without the formal foundations of our EDPs and rho-calculus.

Figure 8:
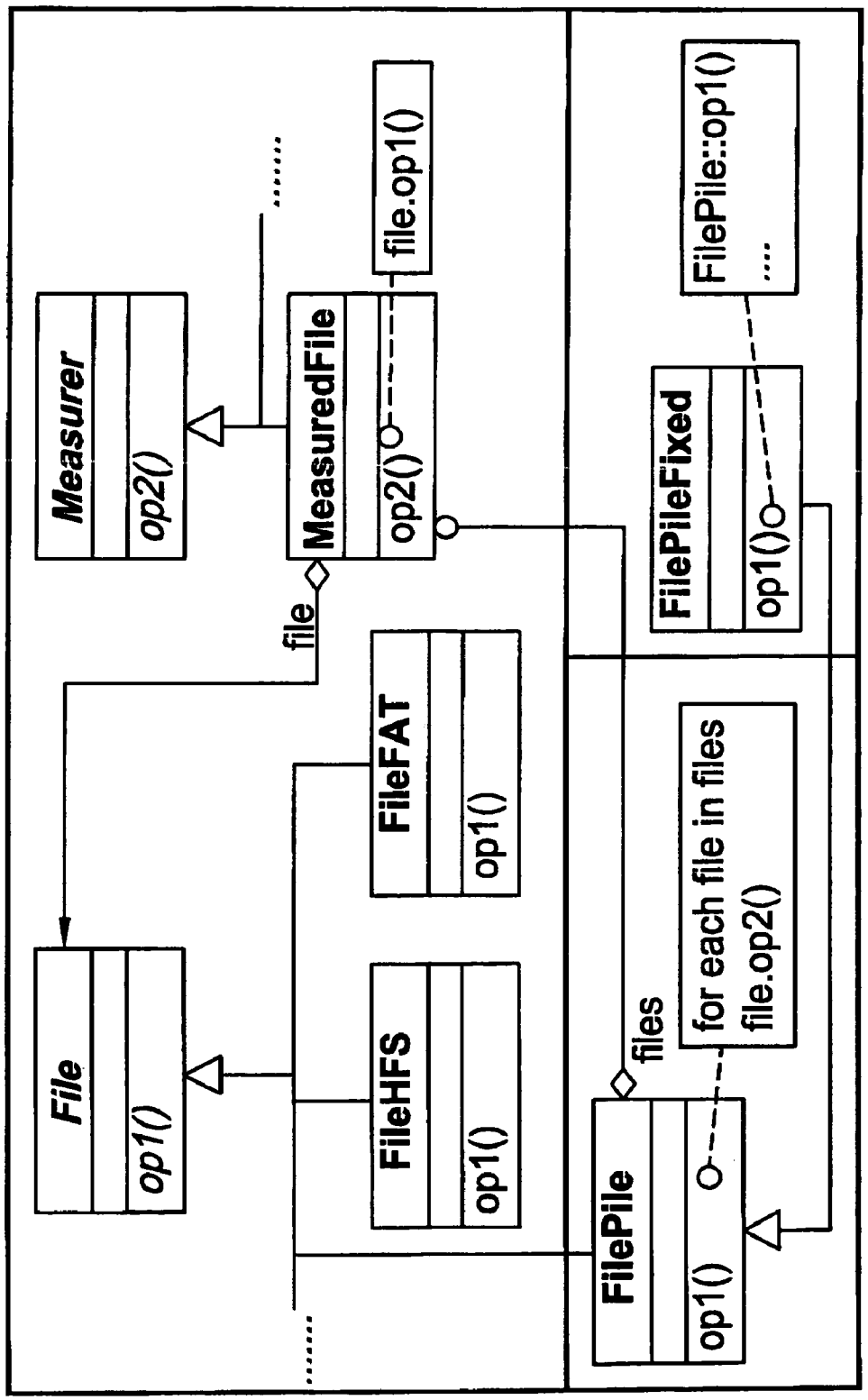
FIG. 8 is a class diagram illustrating exemplary components of a file system created at different times.

As an example, FIG. 8 is a class diagram of a file system that was designed as many are: through growth. In FIG. 8, three distinct libraries are interacting in well-formed ways, each under the control of a different engineering group. Source code is unavailable to the other groups, and design issues are partitioned as well. After analysis by SPQR, however, it becomes clear, as illustrated by the post-SPQR class diagram of FIG. 12, that there is a hidden instance of the Decorator design pattern that provides an intriguing clue to the engineers how to refactor the three libraries to work more effectively together. This example is illustrated in complete detail, and SPQR is discussed more thoroughly, in sections 5 and 6.

4.1. Using SPQR

An example of how SQPR operates to located patterns in source code will now be described. In the example, a fictitious company, Widgets, Inc., develops source code referred to herein as the Killer Widget application. At Widgets, Inc., there are many teams working on the Killer Widget application. Each is responsible for a well-defined and segmented section of the application, but they are encouraged to share code and classes where possible. As is often normal in such situations, teams have write access only for their own code—they are responsible for it, and all changes must be cleared through regular code reviews. All other teams may inspect the code, but may not change it. Suggestions can be made to the team in charge, to be considered at the next review, but no one likes their time wasted and internal changes take priority during such reviews.

Three main phases of development by three different teams have taken place on a core library used by the application, resulting in a conceptually unclear system, shown in FIG. 8. The first phase involved the File system having a Measured-File metric gathering suite wrapped around it. Secondly, multiple file handling was added by the FilePile abstraction, and lastly, a bug fix was added in the FilePileFixed class to work around an implementation error that become ubiquitously assumed. A review of the design is called for the next development cycle.

Hidden patterns exist within the architecture which encapsulate the intent of the larger system, would facilitate the comprehension of the novice developers, and help point the architects towards a useful refactoring of the system. The system illustrated in FIG. 8 will be used as the driving example to illustrate exemplary operation of the methods and systems for identifying computer source code constructs described herein.

The chain of tools will be described from the viewpoint of a practitioner using them on Killer Widget. As described above with regard to FIG. 7, from the engineer's point of view, SPQR is a single tool that performs the analysis from source code and produces a final report. A simple script provides the workflow, by chaining several modular component tools, centered around tasks of source code feature detection, feature-rule description, rule inference, and query reporting.

In SPQR, source code is first analyzed for particular syntactic constructs that correspond to the rho-calculus concepts we are interested in. It turns out that the ubiquitous gcc has the ability to emit an abstract syntax tree suitable for such analysis. Our first tool, gcctree2poml, reads this tree file and produces an XML description of the object structure features. We chose an intermediary step so that various back ends could be used to input source semantics to SPQR. A second tool, poml2otter then reads this POML file and produces a feature-rule input file to the automated inference engine, in the current package we are using Argonne National Laboratory's OTTER. OTTER finds instances of design patterns by inference based on the rules described herein. Finally, proof2pattern analyzes the OTTER proof output and produces a POML pattern description report that can be used for further analysis, such as the production of UML diagrams.

Each stage of SPQR is independent, and is designed to allow other languages, compilers, workflows, inference engines, and report compilation systems to be added. Additionally, as new design patterns are described by the community, perhaps local to a specific institution or workgroup, they can be added to the catalog used for query.

The Killer Widget example has been successfully analyzed and a salient Decorator pattern was found using SPQR. FIG. 9 shows the source code snippet for the Killer Widget Application that is input to source-code-to-fact-set converter 300. FIG. 10 shows the corresponding OTTER input generated by source-code-to-fact-set converter 300. Equations 44 through 59 in FIG. 18 represent the equivalent set of rules in the rho-calculus.

The inputs to OTTER include the set of facts of the system under consideration (shown in FIG. 10, as would be output by gcctree2poml and poml2otter from the code snippet in FIG. 9), the necessary elements of rho-calculus encoded as OTTER rules, and the design patterns of interest, including the EDPs, similarly encoded (both of which are provided as part of SPQR). For example, the RedirectInFamily pattern is shown in FIG. 11.

The work required of the developer is to simply request SPQR to perform the analysis, and the resultant found patterns are reported by proof2pattern as a POML XML snippet, such as:

```
<pattern name="Decorator">
    <role name="Component">        "File" </role>
    <role name="Decorator">        "FilePile" </role>
    <role name="ConcreteComponent">
        "FileFAT" </role>
    <role name="ConcreteDecorator">
        "FilePileFixed" </role>
    <role name="operation">        "op1" </role>
</pattern>
```

Figure 12:
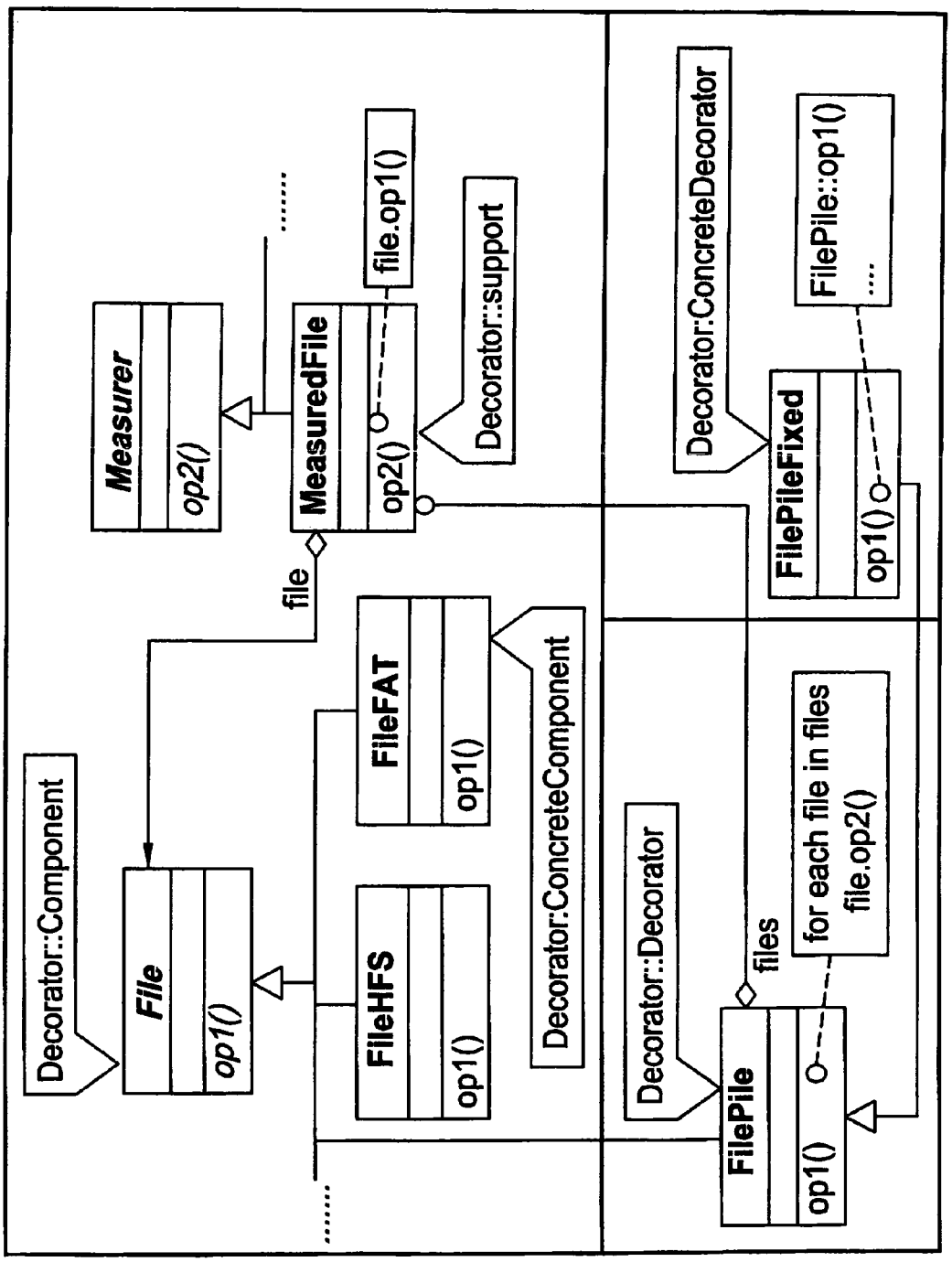
FIG. 12 is class diagram of the system of FIG. 8 illustrating initial patterns discovered by the SPQR toolchain illustrated in FIG. 7.

Such information can then be used to produce diagrams such as FIG. 12, which may be generated manually based on the object XML snippet or automatically by proof-to-pattern converter 308. The intermediate patterns have been omitted from FIG. 12 for clarity, as have finer granularity relationships. The annotations in FIG. 12 indicate which classes fulfill which roles in the pattern descriptions, such as Pattern::Role. Note that a single class can fulfill more than one role in more than one pattern.

Preliminary speed results indicate that scaling to larger systems in production code should be effective. One tolerance threshold that may be used is whether or not the SPQR analysis is roughly equivalent to compilation of the same source code, and to date this has held true in informal tests. The comprehensive coverage of the EDPs suggests that scaling will be dependent solely on the number of facts generated by the original source analysis, coupled with the scaling performance of the inference engine.and yet for Killer Widget, this has averaged only 0.71 seconds, as reported by the POSIX time utility over 20 runs, on a 400 MHz PowerPC G3 CPU.

While SPQR is highly straightforward in implementation and use, it encapsulates a highly formalized semantics system that allows for the use of an automated inference engine for rule inference. It is the formalization that, paradoxically, provides the flexibility of describing the complex programming abstractions of design patterns. The practitioner can avoid this level of detail, however, and SPQR can be adapted to work at multiple levels of formal analysis, depending on the particular need.

5. Reconstruction of Known Patterns Using EDPs

An example of using EDPs to express larger and well-known design patterns will now be provided. The example begins with AbstractInterface, a simple EDP and concludes with Decorator, visiting two other established patterns along the way.

AbstractInterface ensures that the method in a base class is truly abstract, forcing subclasses to override and provide their own implementations. The rho-calculus definition can be given by simply using the trait construct of sigma-calculus:

$$\frac{A \equiv [\text{new}: [I_i : A \to B_i^{i \in 1 \ldots n}], \text{operation}: A \to B]}{AbstractInterface(A, \text{operation})} \quad (39)$$

Figure 13:
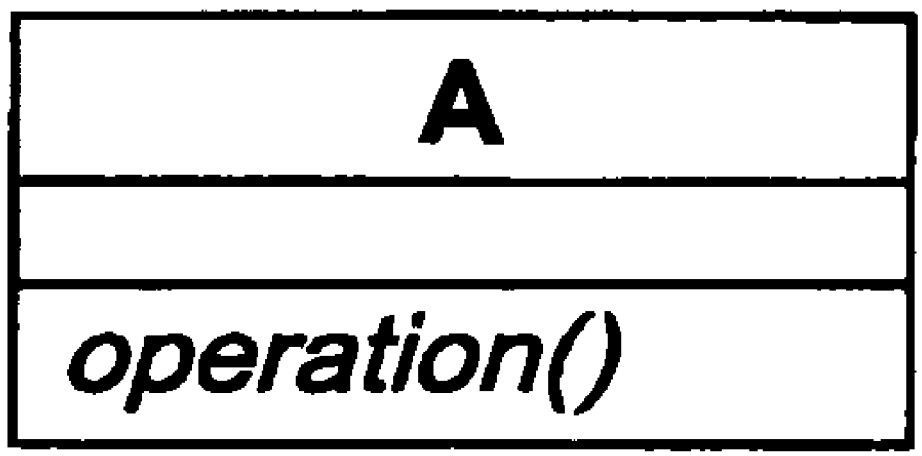
FIG. 13 is a class diagram illustrating an exemplary structure for the AbstractInterface EDP.

A class diagram for the AbstractInterface EDP is illustrated in FIG. 13.

Objectifier is simply a class structure applying the Inheritance EDP to an instance of AbstractInterface pattern, where the AbstractInterface applies to all methods in a class. This is equivalent to what Woolf calls an Abstract Class pattern. Referring back to FIG. 1 from our earlier discussion in Section 1, we can see that the core concept is to create a family of subclasses with a common abstract ancestor. We can express this in rho-calculus as:

$$\frac{\begin{array}{c} Objectifier : [I_i : B_i^{i \in 1 \ldots n}], \\ AbstractInterface(Objecifier, I_i^{i \in 1 \ldots n}), \\ ConcreteObjectifier_j <: Objectifier^{j \in 1 \ldots m}, \\ Client : [obj : Objectifier] \end{array}}{Objectifier(Objectifier \\ ConcreteObjectifier_j^{j \in 1 \ldots m}, Client)} \quad (40)$$

Figure 2:
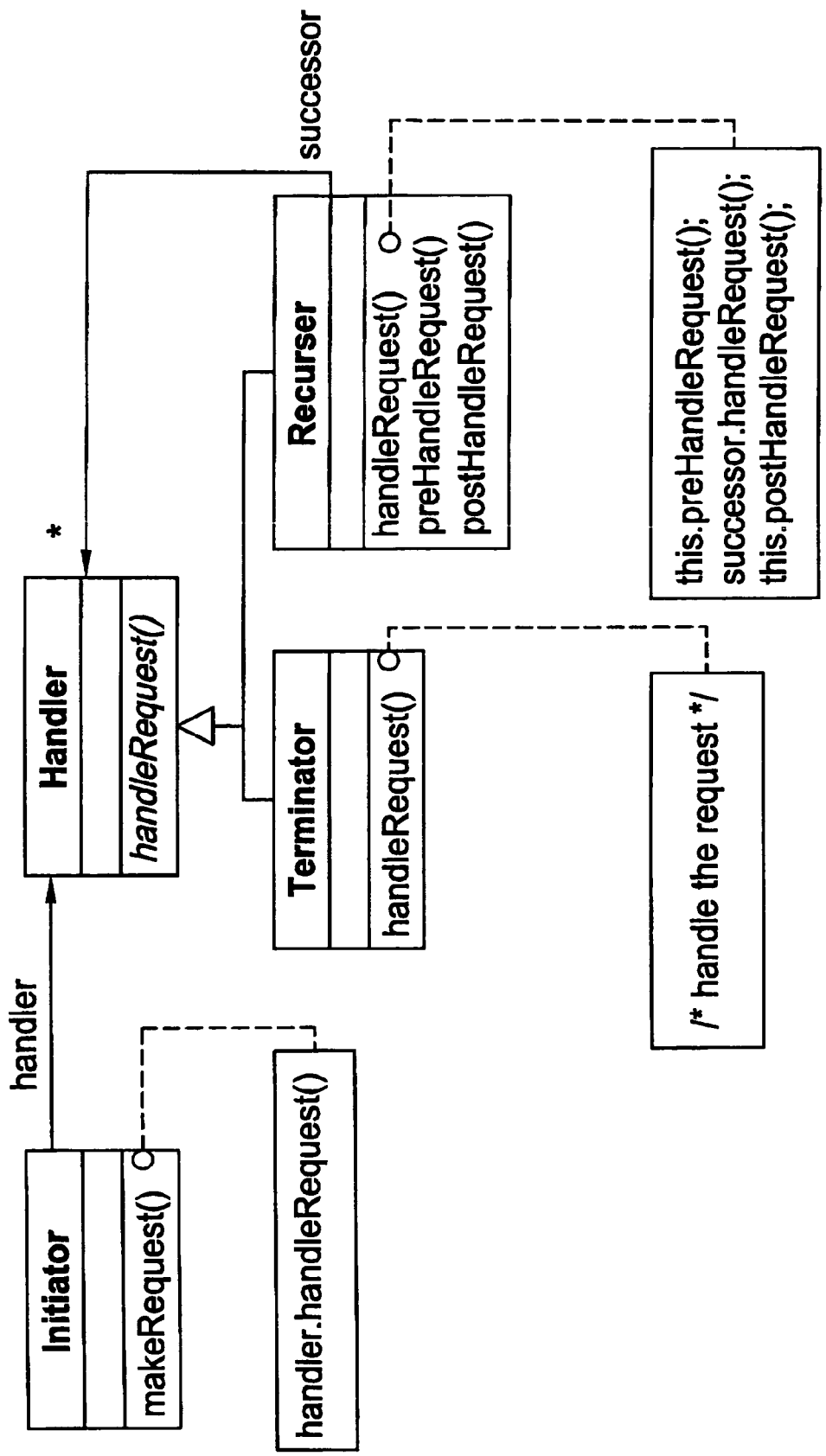
FIG. 2 is a class diagram illustrating an exemplary structure for the ObjectRecursion class.

We briefly described Object Recursion in section 1, and gave its class structure in FIG. 2. We now show that this is a melding of the Objectifier and RedirectInFamily patterns.indicate which roles of which patterns the various components of ObjectRecursion play. A formal EDP representation is given in Equation 41.

$$\frac{\begin{array}{c} Objectifier(Handler, Recurser_i^{i \in 1 \ldots m}, Initiator), \\ Objectifier(Handler, Terminator_j^{j \in 1 \ldots n}, Initiator), \\ init <_\mu obj.handleRequest, \\ init : Initiator, \\ obj : Handler, \\ RedirectInFamily(Recurser, Handler, handleRequest), \\ ! RedirectInFamily(Terminator, Handler, handleRequest) \end{array}}{\begin{array}{c} ObjectRecursion(Handler, Recurser_i^{i \in 1 \ldots m}, \\ Terminator_j^{j \in 1 \ldots n}, Initiator) \end{array}} \quad (41)$$

The ExtendMethod EDP is used to extend, not replace, the functionality of an existing method in a superclass. This pattern illustrates the use of super, formalized in Equation 42.

$$\frac{\begin{array}{c} OriginalBehavior : [I_i : B_i^{i \in 1 \ldots m}, operation : B_{m+1}], \\ ExtendedBahavior <: OriginalBehaviour, \\ eb : ExtendedBehavior, \\ eb.operation <_{\mu+} super.operation \end{array}}{ExtendedMethod(OriginalBehaviour, \\ ExtendedBehaviour, operation)} \quad (42)$$

Figure 15:
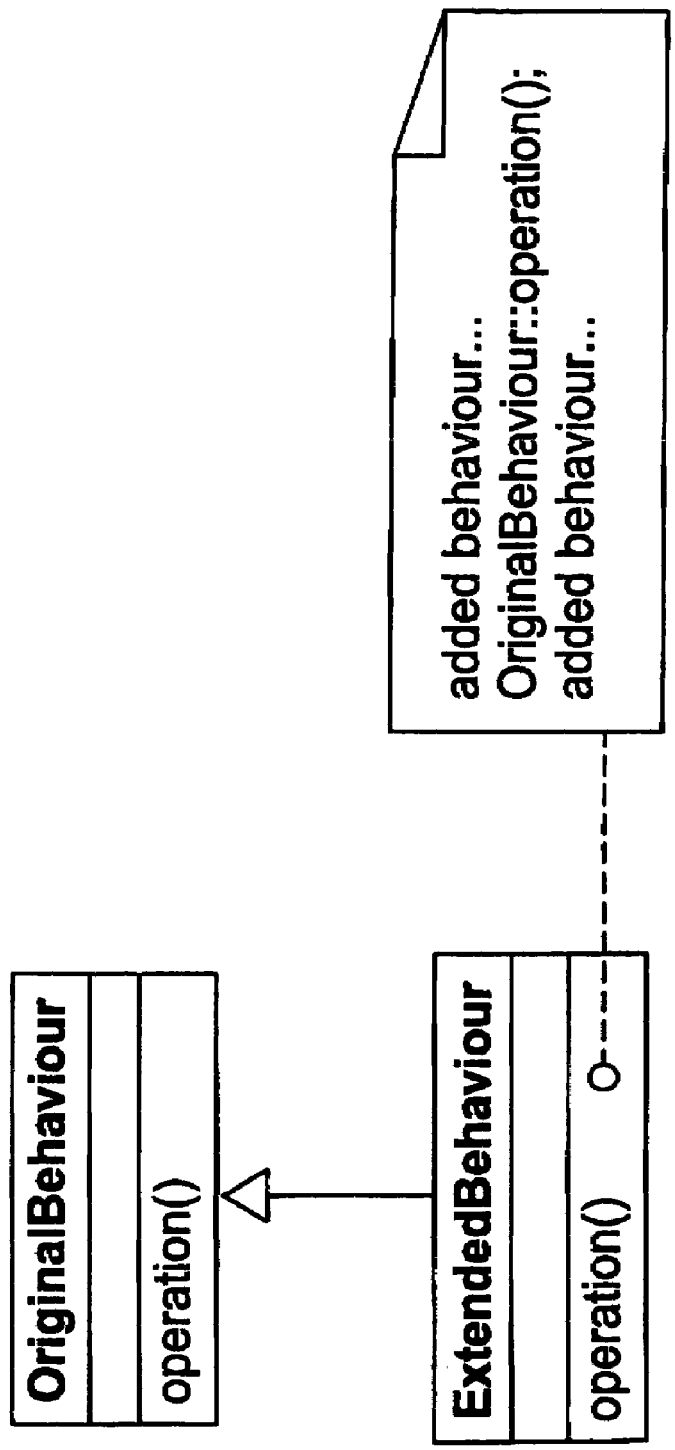
FIG. 15 is a class diagram illustrating an exemplary structure for the ExtendMethod EDP.

The structure for the ExtendMethod EDP is illustrated in FIG. 15.

Now we can produce a pattern directly from the GoF text, the Decorator pattern. class diagram for Decorator annotated to show how the EDP ExtendMethod and ObjectRecursion pattern interact. Again, we provide a formal definition in Equation 43, although only for the method extension version (the field extension version is similar but unnecessary for our purposes here). The keyword any indicates that any object of any class may take this role, as long as it conforms to the definition of ObjectRecursion.

$$\begin{array}{c} ObjectRecursion(Component, Decorator_i^{j \in 1 \ldots m}, \\ ConcreteComponent_j^{j \in 1 \ldots n}, any), \\ ExtendedMethod(Decorator, \\ ConcreteDecoratorB_k^{k \in 1 \ldots o}, operation_k^{k \in 1 \ldots o}), \, , \\ \hline Decorator(Domponent, Decorator_i^{j \in 1 \ldots m}, \\ ConcreteComponent_j^{j \in 1 \ldots m}, \\ ConcreteDecoratorB_k^{k \in 1 \ldots o}, \\ ConcreteDecoratorA_l^{l \in 1 \ldots p}, \\ operation_k^{k \in 1 \ldots o+p}) \end{array} \quad (43)$$

Figure 14:
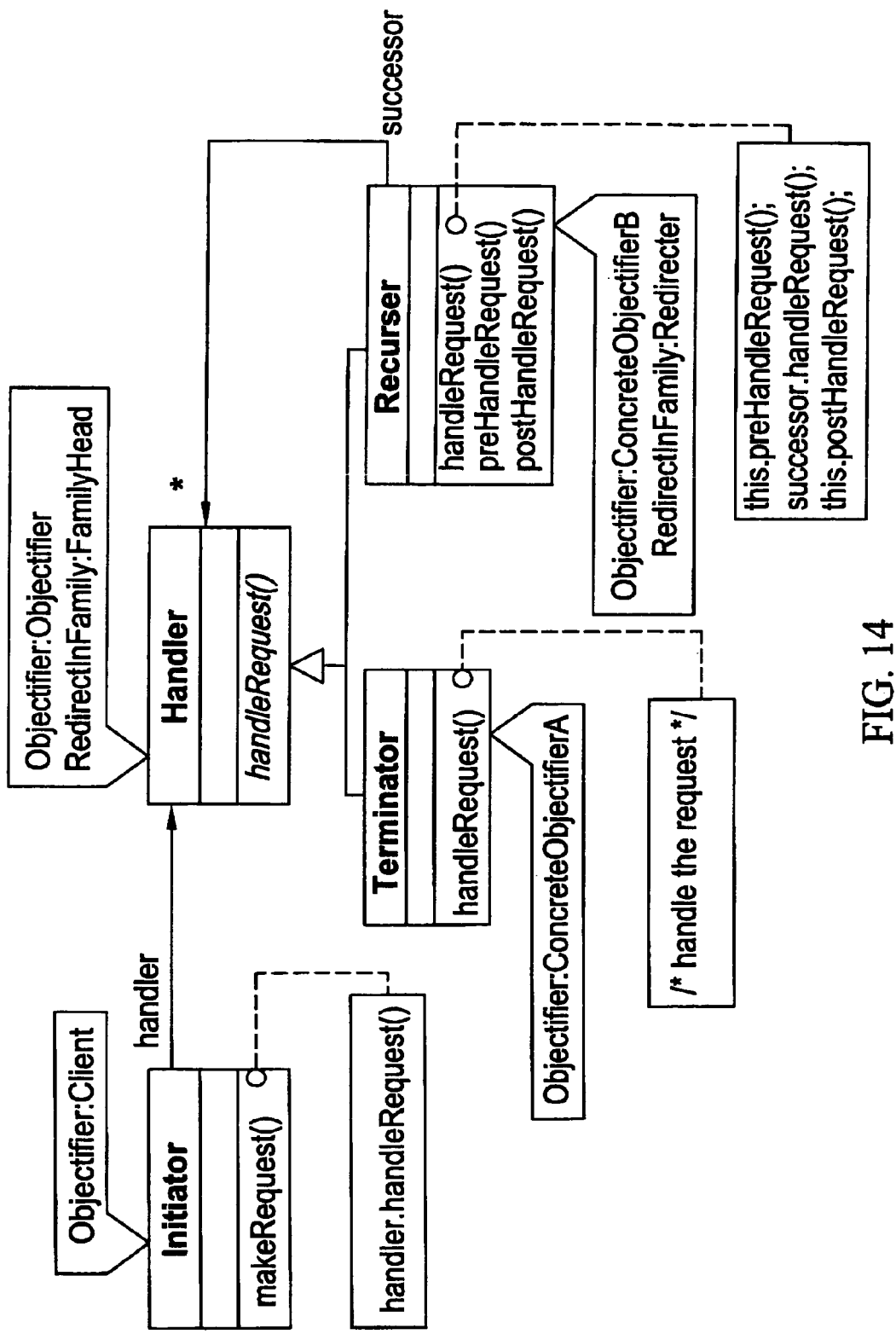
FIG. 14 is a class diagram illustrating an exemplary structure for the ObjectRecursion pattern with annotation to illustrate roles of each component.
Figure 16:
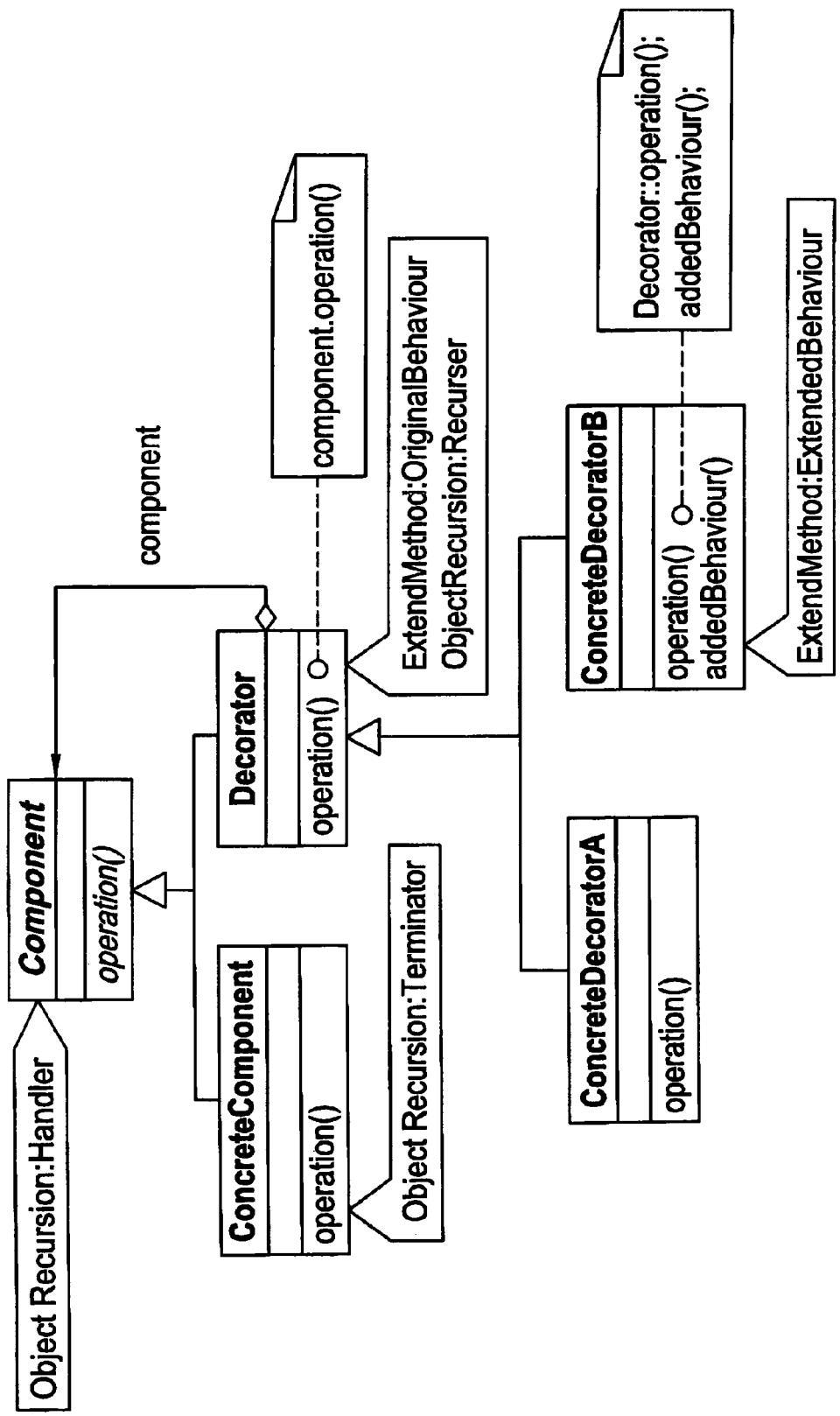
FIG. 16 is a class diagram illustrating an exemplary structure for the Decorator pattern with annotation to show EDP roles.

The class structure for the ObjectRecursion pattern is illustrated in FIG. 14. The annotation in FIG. 14 illustrates the roles of each component. The structure for Decorator, described in terms of AbstractInterface, ObjectRecursion, and ExtendMethod EDPs is illustrated in FIG. 16. The annotation in FIG. 16 illustrates the roles of each EDP.

We have created a formally sound definition of a description of how to solve a problem of software architecture design. This definition is now subject to formal analysis, discovery, and metrics. Following our example of pattern composition, this definition can be used as a building block for larger, even more intricate patterns that are incrementally comprehensible. At the same time, we believe that we have retained the flexibility of implementation that patterns demand. Also, we believe that we have retained the conceptual semantics of the pattern by intelligently and diligently making precise choices at each stage of the composition.

6. Killer Widget Analysis in Detail

Figure 17:
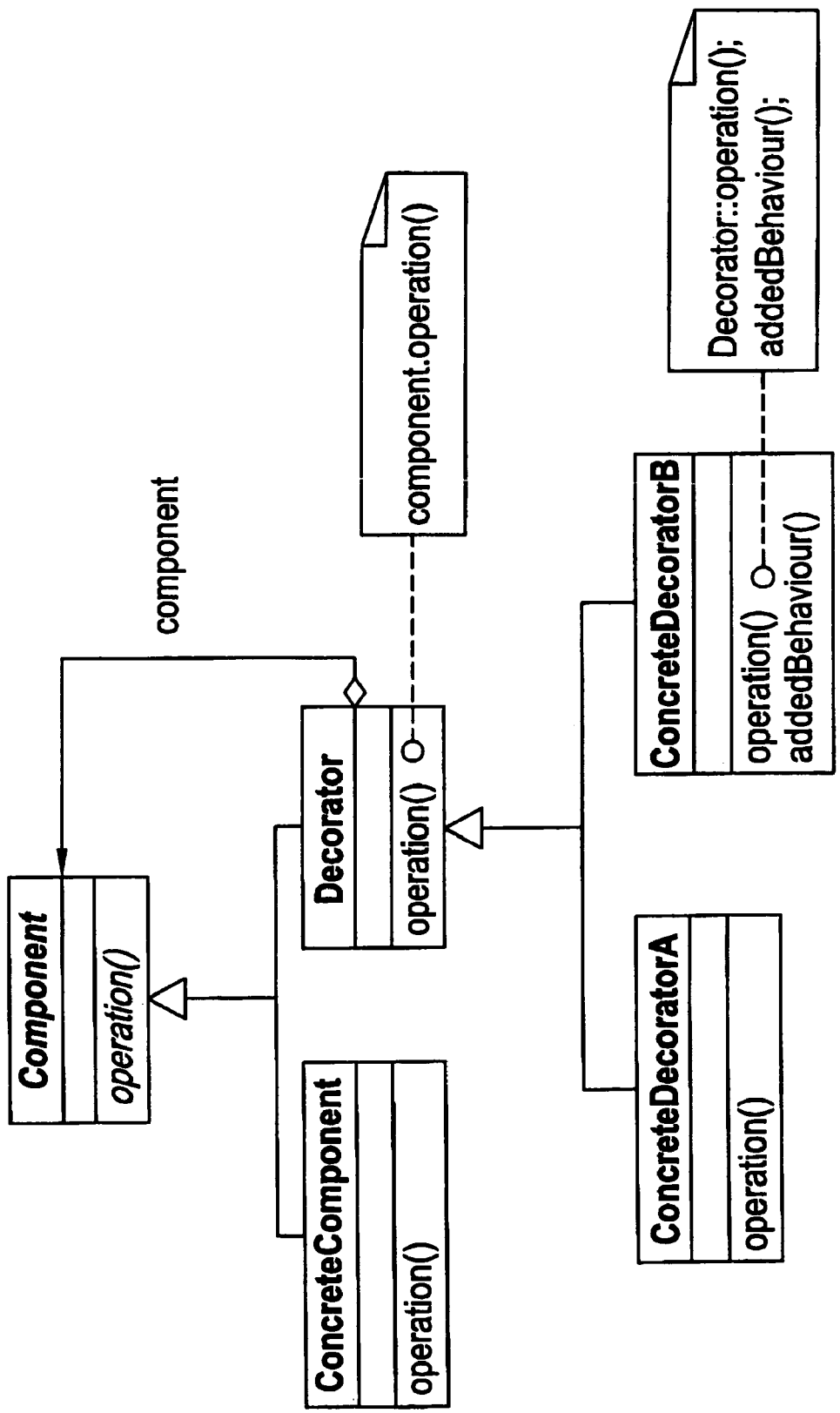
FIG. 17 is a class diagram illustrating an exemplary Decorator class structure.

We can now build a picture of what SPQR is doing within OTTER's inference system. FIG. 17 illustrates the Decorator class structure without the annotation of FIG. 16. FIG. 18 illustrates exemplary equations corresponding to the poml2otter output illustrated in FIG. 10.

It can be seen that the AbstractInterface rule is fulfilled for class File, method op1 by Equation 44. Furthermore, File and FilePile fulfill the requirements of the Objectifier pattern, assuming, as we will here assert, that the remainder of File's methods are likewise abstract.

$$\frac{\begin{array}{c} File : [op1 : \Box], \\ AbstractInterface(File.op1), \\ FilePile <: File, \\ mfile <_\phi file, \\ file : File \end{array}}{Objectifier(File, FilePile, MeasuredFile)} \quad (60)$$

Objectifier (File, FileFAT, MeasuredFile) and analogous instances of Objectifier for the other concrete subclasses of the File class, can be similarly derived.

Finding an instance of RedirectInFamily is a bit more complex and requires the use of our isotopes. Following the example in Section 3.13, however, it becomes straightforward to derive RedirectInFamily:

$$\begin{aligned}
&\text{FilePile} <: \text{File}, \\
&\text{fp} : \text{FilePile}, \\
&\text{f} : \text{File}, \\
&\text{fp.op1} <_{\mu_-} \text{fp.mfile.op2}, \\
&\text{fp.mfile} = \text{mf}, \\
&\text{mf.op2} <_{\mu_-} \text{mf.file.op2}, \\
&\text{mf.file} = \text{f}, \\
&\text{fp.op1} <_\phi \text{fp.mfile}, \\
&\underline{\text{mf.op2} <_\phi \text{mf.file}} \\
&\text{RedirectInFamily}(\text{FilePile}, \text{File}, \text{op1})
\end{aligned} \quad (61)$$

It can also be shown that one simply cannot derive the fact RedirectInFamily (FileFAT, File, op1). We now see that ObjectRecursion derives cleanly from Equations 60 and 61 and their analogues, in Equation 62.

$$\begin{aligned}
&\text{Objectifier}(\text{File}, \text{FilePile}, \text{MeasuredFile}), \\
&\text{Objectifier}(\text{File}, \text{FileFAT}, \text{MeasuredFile}), \\
&\text{mf} : \text{MeasureFile}, \\
&\text{mf} <_\mu \text{file.op1}, \\
&\text{file} : \text{File}, \\
&\text{RedirectInFamily}(\text{FilePile}, \text{File}, \text{op1}), \\
&\underline{!\text{RedirectInFamily}(\text{FileFAT}, \text{File}, \text{op1})} \\
&\quad \text{ObjectRecursion}(\text{File}, \text{FilePile}, \\
&\quad\quad \text{FileFAT}, \text{MeasuredFile})
\end{aligned} \quad (62)$$

ExtendMethod is a simple derivation as well:

$$\begin{aligned}
&\text{Objectifier}(\text{File}, \text{FilePile}, \text{MeasuredFile}), \\
&\text{Objectifier}(\text{File}, \text{FileFAT}, \text{MeasuredFile}), \\
&\text{mf} : \text{MeasureFile}, \\
&\text{mf} <_\mu \text{file.op1}, \\
&\text{file} : \text{File}, \\
&\text{RedirectInFamily}(\text{FilePile}, \text{File}, \text{op1}), \\
&\underline{!\text{RedirectInFamily}(\text{FileFAT}, \text{File}, \text{op1})} \\
&\quad \text{ObjectRecursion}(\text{File}, \text{FilePile}, \\
&\quad\quad \text{FileFAT}, \text{MeasuredFile})
\end{aligned} \quad (63)$$

Finally, we arrive at the uncovering of a full Decorator pattern:

$$\begin{aligned}
&\text{ObjectRecursion}(\text{File}, \text{FilePile}, \text{FileFAT}, \text{MeasuredFile}), \\
&\underline{\text{ExtendMethod}(\text{FilePile}, \text{FilePileFixed}, \text{op1})} \\
&\quad \text{Decorator}(\text{File}, \text{FilePile}, \text{FileFAT}, \\
&\quad\quad \text{FilePileFixed}, \text{op1})
\end{aligned} \quad (64)$$

7. Educational Uses of EDPs

The EDPs can provide a path for educators to guide students to learning OO design from first principles, demonstrating best practices for even the smallest of problems. Note that the core EDPs require only the concepts of classes, objects, methods (and method invocation), and data fields. Everything else is built off of these most basic object oriented constructs, which map directly to the core of UML class diagrams. The new student needs only to understand these extremely basic ideas to begin using the EDPs as a well formed approach to learning the larger and more complex design patterns. As an added benefit, the student will be exposed to concepts that may not be directly apparent in the language in which they are currently working. These concepts are language independent, however, and should be transportable throughout the nascent engineer's career.

This transmission of best practices is one of the core motivations behind design patterns, but even the simplest of the usual canon requires some non-trivial amount of design understanding to be truly useful to the implementer. By reducing the scope of the design pattern being studied, one can reduce the background necessary by the reader, and therefore make the reduced pattern more accessible to a wider audience, increasing the distribution of the information. This parallels the suggestions put forth by Goldberg in 1994 [16].

8. EDPs as Language Design Hints

It is expected that some will see the EDPs as truly primitive, but the development of programming languages has been a reflection of directly supporting features, concepts, and idioms that practitioners of the previous generation languages found to be useful. Cohesion and coupling analysis of procedural systems gave rise to many object oriented concepts, and each common OO language today has features that make concrete one or more EDPs. EDPs can therefore be seen as a path for incremental additions to future languages, providing a clue to which features programmers will find useful based precisely on what concepts they currently use, but must construct from simpler forms.

8.1. Delegation

A recent, and highly touted, example of such a language construct is the delegate feature found in C#[21]. This is an explicit support for delegating calls directly as a language feature. It is in many ways equivalent to the decades old Smalltalk and Objective-C's selectors, but has a more definite syntax which restricts its functionality, but enhances ease of use. It is, as one would expect, an example of the Delegation EDP realized as a specific language construct, and demonstrates how the EDPs may help guide future language designers. Patterns are explicitly those solutions that have been found to be useful, common, and necessary in many cases, and are therefore a natural set of behaviors and structures for which languages to provide support.

8.2. ExtendMethod

Most languages have some support for this EDP, through the use of either static dispatch, as in C++, or an explicit keyword, such as Java and Smalltalk's super. Others, such as BETA[18], offer an alternative approach, deferring portions of their implementation to their children through the inner construct. Explicitly stating 'extension' as a characteristic of a method, as with Java's concept of extends for inheritance, however, seems to be absent. This could prove to be useful to the implementers of a future generation of code analysis tools and compilers.

8.3. AbstractInterface

The Abstract Interface EDP is, admittedly, one of the simplest in the collection. Every OO language supports this in some form, whether it is an explicit programmer created construct, such as C++'s pure virtual methods, or an implicit dynamic behavior such as Smalltalk's exception throwing for an unimplemented method. It should be noted though that the above are either composite constructs (virtual foo( )=0; in C++) or a non construct runtime behavior (Smalltalk), and as such are learned through interaction with the relationships between language features. In each of the cases, the functionality is not directly apparent in the language description, nor is it necessarily apparent to the student learning OO programming, and more importantly, OO design. Future languages may benefit from a more explicit construct.

9. Malignant Patterns

One of the exciting aspects of this research is that it provides the foundation for finding not just established design patterns, but any combination of relationships between language entities and programming concepts we choose to define. One such application is looking for common poor solutions to common problems, where one can identify common mistakes made by programmers when attempting to follow design pattern guidelines. Also, one can describe situations where common solutions are found to exist, but known to be poor fits for many applications. These are both similar to what is often termed 'anti-patterns', but that phrasing has become so diluted by misuse as to have lost much of its original preciseness. Instead, these patterns are referred to herein as 'malignant patterns'. They do indeed solve the problem at hand, but are likely to cause more problems in the long run, particularly during maintenance, than they solved in the first place SPQR is as capable of finding these as it is the more common design patterns, since they are still only code constructs and relationships.

9.1. 'Bad Smells' as Refactoring Opportunity Discovery

Fowler [14] uses the term 'bad smells' to describe many such situations . . . the code looks okay from many perspectives, but there's just something not quite right about it to the trained eye. These are assumed to be cues for opportunities for refactoring, which is usually the case. Usually these 'bad smells' are quantifiable as relationships between concepts—precisely the type of constructs that SPQR is designed to extract. It is entirely possible to provide an engineering team with information not only on the conformance of a system with the design as expressed as design patterns, but also to provide them with indicators that there may be refactoring opportunities that they had not considered.

9.2. Semi-Automated Support for the Refactoring Process

Refactoring is not likely to ever be, in our opinion, a fully automatable process. At some point the human engineer must make decisions about the architecture in question, and guide the transformation of code from one design to another. Several key pieces, however, may benefit from the work described herein. Our isotope example in Section 3.13 indicates that it may be possible to support verification of Fowler's refactoring transforms through use of the rho-calculus, as well as various other approaches currently in use [14, 25, 22]. Ó Cinnéide's minitransformations likewise could be formally verified and applied to not only existing patterns, but perhaps to code that is not yet considered pattern ready, as key relationships are deduced from a formal analysis [23,24]. Furthermore, we believe that the fragments-based systems such as LePuS can now be integrated back into the larger domain of denotational semantics.

10. Aspect Oriented Programming

Related to fragments in many ways, Aspect Oriented Programming (AOP) provides a language support framework for working with conceptual fragments. SPQR can be used in this context as well, due to the flexibility of the reliance operators. As aspects are added or deleted from the codepath, SPQR can quickly and easily take into account new reliances while ensuring conformance with the original pattern intents AOP is, at its core, an establishment of a Notification design pattern injected into a language's runtime with high-level support within the language itself. Since the Notification design pattern is an established design pattern in the SPQR lexicon, this is directly supportable by SPQR. As AOP matures, the combination of SPQR and dedicated AOP environments will prove to be very powerful.

11. SPQR Refinements—Tools

SPQR is of course a work in progress. It was designed to be as flexible as possible to take advantage of new programming environments, target languages, and solver engines, but there are specific improvements that we have already identified as important refinements.

11.1. Iterative Searching

Currently SPQR treats the fact base of the source code as a monolithic system, and searches for design patterns of various complexities on equal terms. Since it is the case that the more complex patterns are composed of the more elemental ones, we can produce some optimization by adding facts about found patterns to the fact base. In this manner we reduce the re-derivation of many patterns, speeding up the discovery of the more complex patterns of interest.

11.2. Level of Detail Control

As a user-level analogue to the above iterative approach, SPQR needs to provide the user with control over the level of detail of patterns that are searched for, and expressed. A large system may include an immense number of EDPs, for example, and yet the practitioner is not likely to be interested in them as a primary comprehension cue. By default, reporting of EDPs should be suppressed, but available as an option for research purposes and more precise interaction with the system.

Figure 19:
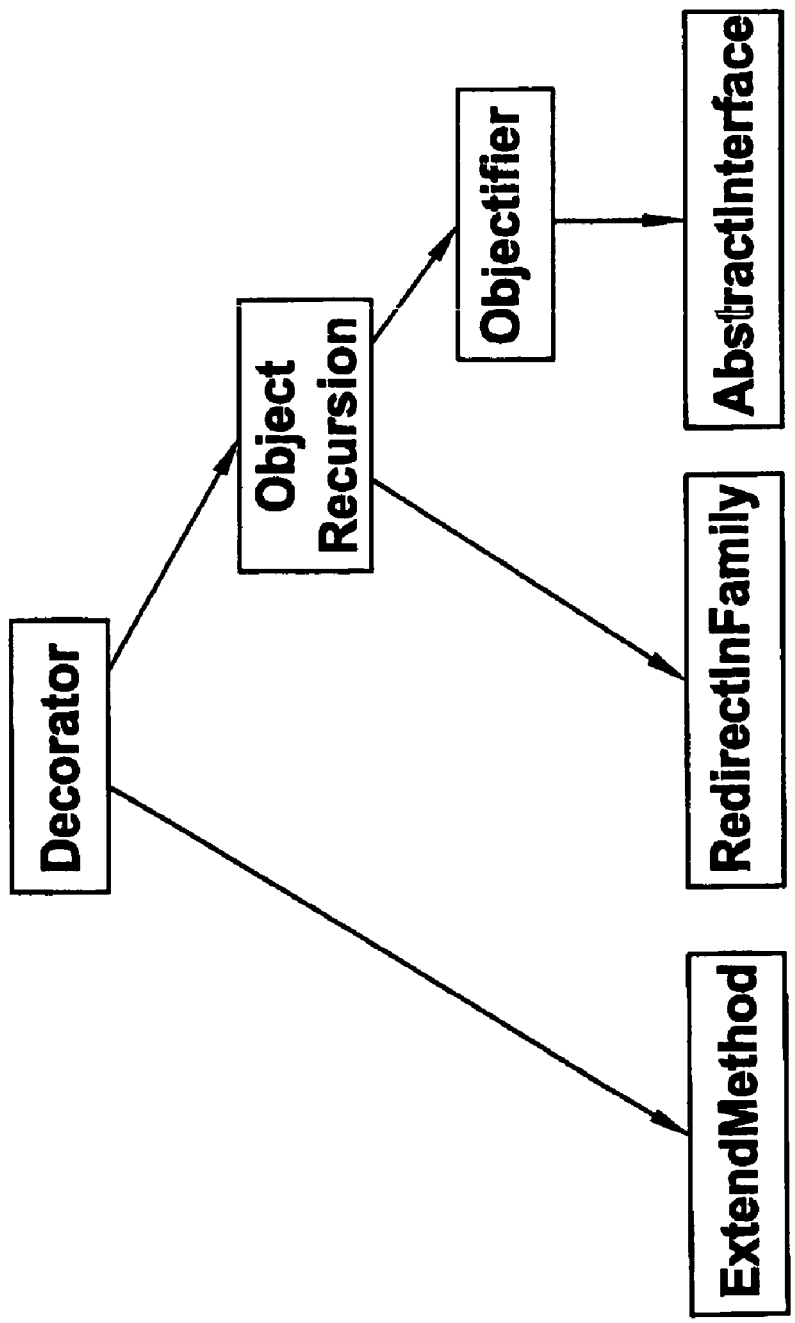
FIG. 19 is pattern dependency graph for the Decorator class.

One approach for fulfilling this need is to allow the user to select which sections of the pattern dependency graph they wish to have reported. The pattern dependency graph is a directed acyclic graph that indicates which design patterns are composited from others. The EDPs form the base of the graph, the lowest layer, while patterns such as Objectifier lie at the next level up the hierarchy, and so on. The example patterns from section 5 are shown in FIG. 19 as an example graph. An engineer may select a depth level slice ("patterns no lower than X, no higher than Y"), or only particular patterns ("only patterns in the Decorator subgraph"), or a combination ("only patterns in the Decorator subgraph, lower than Decorator, but higher than the EDPs").

11.3. Alternate Automated Inference Engines

OTTER is a highly generalized theorem prover, and while more than adequate for SPQR, may not be optimal. As ATPs and my familiarity with the field improve, other engines may provide a better fit with the needs of SPQR. One move that can be done immediately is to use the TPTP intermediate language for expressing the ATP form of the fact base. It would mean yet another step in the analysis process, but would open up a wide array of ATPs to investigate as SPQR options. The fundamental fact is that SPQR allows, today, for any inference engine to be incorporated as part of the toolchain.

11.4. Alternate Environments

Currently gcc 3.x is the target environment for SPQR. However, SPQR may function in other environments, such as .NET, Xcode, Eclipse, and more direct language sources such as the Squeak Smalltalk runtime, and the Java Virtual Machine, without departing from the scope of the subject matter described herein.

11.4.1. IDE Integration

The former would be treated much like gcc, but with the possibility of providing the results of SPQR unified within the environment offering some intriguing possibilities. For instance, Eclipse's extensible UI gives one the opportunity to integrate SPQR directly into the IDE, with a direct menu item or button click triggering SPQR, feeding it a simplified (and pre-selected) fact base on the source code under its control, and displaying the results in a textual or graphical format as another View on the system. Xcode and .NET have similar capabilities for plugin tools, and SPQR is well suited for this task.

11.4.2. Runtime Environment Snapshots

Interacting directly with the language runtimes leads to a wider array of languages that SPQR can handle. While SPQR is a static analysis engine and would seem to be unusable for analysis of dynamically bound and/or loaded languages, it should be noted that at any given moment in time the typing environment of a dynamic runtime environment is a static fact base. That set of facts about the system may change over time, but if we select the point at which we choose to initiate our analysis, such as post-loading of all expected classes, we can analyze a snapshot of the environment just as if it were described in source code. In fact, we can take a series of snapshots over time and view the changes that a design architecture makes during its lifetime, a fascinating and tantalizing research possibility. Sample-based profiling of a system's performance is now an established technique, we will do the same for a system's architectural design.

11.5. Alternate Data Sources

SPQR was designed to be language, framework, platform, and OS independent, and it meets this requirement. It is unimportant what language, library, framework, or system is to be analyzed, as long as it can be expressed as an abstract description of the relationships between code entities. (The rho calculus, as the formal basis for these relationships, ensures that all object-oriented languages that are expressible in sigma calculus can be so expressed.) Our example implementation of this abstraction is the Pattern/Object Modeling Language (POML), an XML Schema. Other abstractions could be possible, and SPQR could easily be adapted to use them. The concept of the POML as part of SPQR allows for a unified approach to describing source code relationships, independent of the source language, the operating environment, or the application domain. This is a critical piece to SPQR, by providing a single definition for object oriented design elements, and through which SPQR gains an unprecedented level of flexibility and applicability. We currently have a gcc based translator for producing POML from C++, but as shown in the previous section, any environment is possible, and here we claim that any sigma-calculus conformant language is possible.

11.6. Distributed Analysis

SPQR is inherently distributable in the manner in which it analyzes a system. Assume that we have a set of patterns, P, that we wish to search for in a codebase, C. We transform C into a set of rho-calculus facts, as per normal operation of SPQR, let's call it $\overline{C}$. Break P into n subsets, $P_1 \ldots P_n$. Send a search subset, $P_i$, along with $\overline{C}$, to another thread, process or machine capable of running SPQR and complete the process there. All n sets of search results are then compiled into a final report.

11.7. Expanding Pattern Libraries

Of course SPQR will continue to incorporate new design patterns as they are defined in the literature, and new combinatorials may come to light as research continues. We expect that the libraries will also start to include site, application, and domain specific patterns as SPQR is used in real world practice and useful constructs are identified through its use.

SPQR facilitates this by performing the exact task for which it was designed—finding patterns. By constructing the EDPs, we have provided a solid and pervasive base from which to compose almost any code construct one cares to produce. Instances of the EDPs can be found in anycode, and as such can be used to describe the codebase. In fact, this bootstrapping approach is precisely how we defined the design patterns in our current library, and it can be extended to any design patterns or code constructs one cares to describe. First, an engineer creates a 'canonical codebase', an example of the design pattern that is to be added to SPQR, in source code. This example is run through SPQR, which finds instances of all EDPs and intermediate patterns which comprise the example. The relationships between these found instances form the definition of the new code construct or pattern. This new definition will be added to the library, and used to refine current definitions of other constructs and patterns, or in the defining of new, future constructs. This training of the system requires no knowledge of the inner workings of SPQR, rho calculus, or the EDPs; it is quite automatic. The EDPs are the basis, however, and should be seen as fundamental to the process.

This is an important advancement of the state of the art in code analysis—while the Gang of Four design patterns reference was our initial inspiration, we have produced a tool and methodology that go far beyond that. Instead, we can, with the same system, incorporate any architecturally well formed design pattern currently known or yet to be discovered.

In addition, while SPQR was designed to discover instances of design patterns in source code, it has, in fact, solved a much more fundamental problem, finding generalized relationships within source code. As such, we foresee SPQR working on a much broader base of possible constructs to find within source code than just design patterns.

12. SPQR Refinements—Theory

The SPQR toolset will continue to evolve as outlined above, but the more theoretical aspects offer some research opportunities as well. Currently SPQR is a static analysis engine only—a highly flexible analysis engine, but purely static. SPQR will grow to incorporate more dynamic analysis features, preferably without requiring actual run-time analysis. One design goal for SPQR is to have it require only the source code for full analysis, and it would be desirable to maintain that goal for reasons of practicality as a toolset.

12.1. State Changes

A new reliance operator, State Change (indicated by $<_\sigma$) opens up a tremendous realm of analysis currently unavailable to static engines. This is an operator indicating a candidate state change, not an absolute one, but it still provides more analysis than we currently have. Simply put, $<_\sigma$ can be described as:

Assume that all fields of any object are private. (If this is not the case, it can be easily mocked up through a level of abstraction.) Then all changes of the state of an object will require calls on the internal field object's methods. (Since the field itself is an object.)

So if object $\mathcal{O}$ has field object o, then the only way $\mathcal{O}$ can change state is if $\mathcal{O}.o$ has a method called on it. Assume that 'h' is in $\mathcal{O}.o$'s dictionary of methods, such that is a way to change $\mathcal{O}.o$'s state.

Since $\mathcal{O}.o$ is private, then only some method in $\mathcal{O}$ can call $\mathcal{O}.o.h$. Call that method f, from $\mathcal{O}$s dictionary.

So if we have $\mathcal{O}.f <_\mu \mathcal{O}.o.h$, then we have a possible state change of $\mathcal{O}.o$ and by extension, $\mathcal{O}$. Therefore any object or method that relies on the state of $\mathcal{O}$ or $\mathcal{O}.o$ will rely on $\mathcal{O}.f$'s possible change to their state.

Assume that $\mathcal{O}.g$ relies on $\mathcal{O}.o$ as a field: $\mathcal{O}.g <_\phi \mathcal{O}.o$, then $\mathcal{O}.g$ relies on $\mathcal{O}.f$ for a state change: $\mathcal{O}.g <_\sigma \mathcal{O}.f$.

Since $\mathcal{O} <_\phi \mathcal{O}.o$ by definition, this extends naturally to outside the object, so we have one simple rule:

$$\frac{\theta.f <_\mu \theta.o.h, \theta.g <_\phi \theta.o}{\theta.g <_\sigma \theta.f} \quad (65)$$

or $$\frac{\theta.f <_\mu \theta.o.h, \theta <_\phi \theta.o}{\theta <_\sigma \theta.f} \quad (66)$$

This captures imperative side effects which no UML or type based system can.

12.2. Data Cohesion

Similar to the above State Change, where a field relies on a method, we can have a field rely on another field. This concept of data cohesion is well established in the literature, but this is the first time it has been unified with other object-based analyses as described herein. The relop form of $<_\kappa$, or a kappa form relop, is used to indicate a mnemonic for cohesion. Because of our transitivities, and because parameters and return values are treated equally in the rho calculus, we can cross method boundaries in a single approach that binds the object-oriented sigma-calculus and the procedural lambda-calculus. This gives us our fifth and final reliance operator form.

12.3. Temporal Logic

Temporal logic would allow SPQR to distinguish between the case where rule 1 occurs before rule 2 as distinct from when rule 2 occurs before rule 1, as in the two method calls shown in FIG. 20, both of which currently derive to the equivalent non-temporal ruleset S={method$<_\mu$obj.method1, method$<_\mu$obj.method2}. Currently the two situations are seen equivalently, and many dynamic run-time situations are beyond SPQR's analysis. Temporal logics would provide for refinement of the search space, confirming or excluding candidate patterns from the results. This would of course require a new inference engine, and it is now that the inclusion of TPTP begins to bear fruit, as it would allow for simple switching of ATPs as necessary.

12.4. Sigma-Calc Interpretation

Finally, the last piece of dynamicism, true run-time analysis, is in fact theoretically possible within SPQR without needing to run the binary of the target system. Sigma is a sigma-calculus interpreter created by Santiago M Pericas-Geertsen [26], and is an open-source research project at Boston University. The SPQR analysis produced to date, combined with the temporal logic extensions, will likely reduce the amount of code that would actually need to be run for final verification of a pattern candidate to a very small set. Since rho-calculus is a strict superset of sigma-calculus, and since SPQR can encode the source code as rho-calculus, we can target small sections of the original code for translation and interpretation. Sigma shows that this is not only possible, but practical. The results of this interpretation can be directly analyzed within SPQR for the run-time behaviors we wish to confirm. In this manner SPQR gains much greater analysis capabilities. Prior to SPQR, however, Sigma's practicality has been limited to examples of theory, as it is only able to provide reasonable performance on extremely small sets of code. By using SPQR to definitively pare down the code base to small sample selections of source code, we bring added value to Sigma, raising it from a purely theoretical tool to one of practical worth. This is simply an example implementation, however, and we are by no means tied to using Sigma as the interpreter engine.

13. Comprehension of Code

Finally, we revisit the original motivation for this research, to reduce the time and effort required for an engineer to comprehend a system's architecture well enough to guide the maintenance and modification thereof. It is believed that the approaches described herein, along with the full catalog of EDPs and rho calculus, can form a formal basis for some very powerful source code analysis tools such as Choices [30], or KT [6], that operate on a higher level of abstraction than just "class, object and method interactions" [30]. Discovery of patterns in an architecture should be become much more possible than it is today, and the discovery of unintended pattern uses should prove enlightening to engineers. In addition, the flexibility inherent in the rho-calculus will provide some interesting possibilities for the identification of new variations of existing patterns.

13.1. Training and Communication

SPQR will become a vital part of training new engineers on existing codebases, and EDPs are poised to become the lingua franca for describing design patterns and other architectural constructs. Using the two in tandem provides a powerful tool for corporate and academic education. The EDPs are too trivial in detail to be practical on their own without automated support, and SPQR is not effective without the common semantics of the EDPs. The combination of SPQR and the EDPs creates a unique training tool and communication platform.

13.2. Comprehension Metrics

Once we have the ability to quantify the pervasiveness of comprehensional units (design patterns or other constructs) within a source code base, it is natural to extend this to quantified metrics about that system. Such metrics will be beneficial not only to the engineers, but to the management of such systems as well SPQR offers, for the first time, the ability to quantify comprehensibility of a system in such a way that it does not require knowledge of the system in any respect to be able to use metrics about that system. Prior metrics have been limited to the engineering realm, as they necessarily required significant understanding of the system, environment, and domain to interpret. SPQR unifies the various architectural patterns and distills them into quantities of quality, eliminating the technical knowledge needed for many metrics.

Example metrics include coverage and concentration metrics to quantify comprehension and possible areas of interest in the code.

13.2.1. Comprehensibility Coverage

As a simple metric of code comprehensibility, we can measure the percentage of code elements that are used to directly and indirectly fulfill design pattern roles. For example, if a class A has five methods, one of which directly fulfills a design pattern role, and two of which are in support roles, then A has a 0.2 DirectPatternRole (Method) score, and a 0.4 IndirectPatternRole (Method) score. These two can be weighted heuristically to create an indication of the amount of code which is prominent in playing roles in design patterns. Since the patterns are a common language for discussion of architectural design, they are excellent indicators for the presence of comprehensibility cues. Quantifying the coverage of design patterns across the codebase gives a general guideline for the comprehensibility of the system, as expressed in design patterns. Engineers and management therefore have a common scaling for design comprehensibility, allowing justifications for code refactoring and redesign to be communicated effectively, and providing a basis for probabilistic estimations of maintenance costs for various designs.

13.2.2. Hotspot Detection

Once design pattern instances have been found, and the role fulfillment elements identified, those elements can begin to be weighted for cumulative effect. For instance, a method element can be given a weight of 1.0 as a primary role fulfiller for each unique role it fills. A lower weight, for example, 0.7, could be given for each occurrence of that method as a support role. 0.5 for a secondary support position, etc. High scoring methods would then be indicative of either a central calling point, and/or a necessary high-level abstraction. This convergence of practical implementation and high-level abstraction in a single metric is unique to SPQR.

14. Analysis of Procedural Code

Given that SPQR can provide a path from OO source code to the discovery, documentation, and comprehension of pattern use within the code, then it is theoretically possible to produce the same end result from procedural code using slice and interface analysis.

Argument:

Slice analysis is used to help in refactoring procedural code to OO code by finding common data to function bindings, and suggesting which groupings would be natural candidates for class descriptions. These pseudo-, or degenerate, objects aren't true OO objects, but have many of the same features especially when viewed from a formal sigma-calculus point of view.

So, it comes down to this: can these degenerate classes (or objects) be properly represented in sigma-calculus such that SPQR can be applied? It is believed that these classes can be represented in sigma calculus. Others are working on refining this segment of the analysis and their work is highly promising (Ott, Bieman, etc, etc.)

Now, given the above path from procedural to patterns, it is believed that the analysis can be taken several more steps, drilling down all the way to a binary representation. Consider that moving from a binary to assembly code is a more or less solved problem, a purely mechanical transformation. Further consider that conversion of assembler to procedural code is likewise a fairly solved problem. (Aliasing of data is still an issue, but the core problems are well understood.) The problem with such reverse engineered code is that it is completely incomprehensible to human engineers; the main semantic tags used to comprehend the system, the names of variables and functions, are missing.

This is where SQPR steps in—the analysis to identify pattern use is completely independent of the nomenclature used in the source code. Therefore, discovery of pattern use is just as capable on highly obfuscated code as it is on well named code.

Now, assuming we have the above binary to patterns path, several extremely interesting possibilities come to light:

Reverse engineering of legacy binaries

All too often source code to existing libraries or applications is lost.

The above analysis would allow some degree of comprehension of the larger architecture of the system. Combine this nascent architecture with the engineers' knowledge of the domain, and the question of what a particular pattern construct was used for should be answerable. Again, this is not a silver bullet, but an aid to comprehension.

Comparative design

Library designers designing for reuse of their library make assumptions about how the library will be used. By extracting the architecture of a fully compiled system that is a client of the library, the designer can easily see how the library was actually used. If the use conflicts with the intended use, or the assumptions of the library designer, the pattern of use can give the library designer clues as to how to better design the library to fit the needs of the client.

Comprehensible genetic programming

Genetic algorithms are extremely powerful ways of optimally solving particular problems, but the resultant solutions suffer from a couple of serious flaws: the source code that is created is generally incomprehensible to humans (largely due to little or no naming mnemonics to assist), which means the solutions are rarely if ever reusable, and perhaps more importantly, and possible insights as to the more general lessons learned are lost. The full binary through patterns analysis path could help alleviate this. An interesting side-project presents itself here as well—genetic manipulation of patterns themselves (using elemental patterns as the 'DNA'), allowing discovery of interesting variations.

15. Pattern Mining

The fact that SPQR is fully automated allows us to use it to brute-force problems that are currently beyond practical consideration. Once such application is mining for previously unidentified patterns amongst systems. (Unidentified in this sense means previously undescribed in the patterns literature, not just undiscovered within a specific system.)

Begin with the set of EDPs, E, and our rho-calculus rules for combining them. Mechanically generate all possible combinations, call this set $E'=E\times\rho$. Use this as the input search catalog for SPQR, and search on a codebase C. The subset $\hat{E}'$ of E' that was found in C is retained. Generate a new search catalog $E''=E'\times\rho$, and repeat the process on C. Continue generating such search sets and retain the found elements of those sets. When the found set has been reduced to one member, the union of all found sets ($\hat{E}' \cup \hat{E}'' \cup \hat{E}''' \cup \ldots$) comprises every combinatorial possibility of programmatic elements within the system. This will be a massive set. Remove those elements which are known, described patterns, (call this set P), again by using SPQR to search the set. The remaining elements are all constructs that are previously unknown to or undescribed in the patterns community. Call this results set $R=(\hat{E}' \cup \hat{E}'' \cup \hat{E}''' \cup \ldots)-P$.

If this process is performed on a large number of systems, then the result sets from each can be cross-referenced. The intersection of these sets, ($R_1 \cap R_2 \cap R_3 \cap \ldots$) will be a set of constructs who appear in several systems, yet are undescribed since the known patterns were eliminated from consideration. This is now a candidate set for manual inspection by an engineer as a place to start identifying new architectural patterns.

The sets generated by this approach will be immense . . . but since it's fully automatable, and since SPQR is inherently distributable (section 11.6), we can merely initiate and walk away until results are compiled.

16. Additional Features of the Subject Matter Described Herein

Our methods have been described in the context of the patterns described in the popular "Gang of Four" textbook, however the applicability of these methods are in no way limited to these patterns. The SPQR methods will work with all patterns defined in other text books and research papers, as well as for future patterns since we have an effective training method.

SPQR is "trained" by example. We write code that exhibits the pattern we wish it to find. The tools and methods analyze the structure of this sample code, and the results of analysis produce definitions of the new pattern structure in the formats required by the methods. There after, the new pattern definition is in the dictionary and can be found in subsequent code examinations by SPQR.

Our methods are independent of source language, operating system, computing platform, or software framework, or Integrated Development Environment. The tool chain is modular and for application to new source language, new frameworks, new platforms all that is needed is re-writing segments of the chain to deal with new input formats. The concepts are independent of these input formats.

Our methods are used for finding any general source code structure (such as the patterns we have indicated) that can be defined in the rho-calculus and other supporting formalisms described herein. This mean not only patterns, but what are commonly called "anti-patterns" or structures to be avoided. This allows our methods to be used in support of software construction that is intended to produce code that matches some sort of important structure, or to "avoid" some structures.

SPQR can be implemented as stand-alone tools in a chain, as described above, or a plug-ins and add-ons for integrated development environments such as, but not limited to, Eclipse, Xcode, Project builder, etc. Our methods can be realized as tools and plug-ins that process the source code in "batch mode", processing the files completely as they operate; the methods can also be implemented so that the analysis is done piecemeal, such as in a software "agent". This mean the methods can be applied constantly as development proceeds with the agent keeping constant checks on the developing code, applying the analysis continuously to determine if the developing code is adhering to the proper structures, or avoiding the proper structures.

17. EDP Catalog

The following pages give details of the Elemental Design Patterns (EDPs) corresponding to the most common object creation and method invocation forms. Those EDPs corresponding to object management, data cohesion, state change and field reliance are omitted.

CreateObject Object Creation

Also Known As
 Instantiation

Intent
 To ensure that newly allocated data structures conform to a set of assertions and pre-conditions before they are operated on by the rest of the system, and that can only be operated on in predefined ways.

Motivation
 An object is a single indivisible unit of data and applicable methods that are conceptually related. We wish to ensure that this unit is in a particular coherent and well defined state before we attempt to operate on the object, and we wish to ensure that only well-defined operations can be performed on the object. In procedural languages, we can emulate an object rather well using records (C structs), and groupings of functions (libraries, perhaps with namespace encapsulation). We cannot, however, ensure either of our conditions.

We cannot, for example guarantee that at the time of allocation of the record that the record's contents conform to any specific assertion we may choose to make. We can make certain that particular classes of static assertions will hold ("All records will have their third entry be set to '5'").

```
typedef          struct {
                    int a;
                    float b;
                    short c = 5;
                 } myStruct;
``` but others are beyond our grasp ("Every third record created on a Tuesday will have the first entry set to '1', otherwise '0'.")

We can get around this problem in imperative languages by creating an initializer function that is to be called on all new allocated data records before use.

```
void initializeMystruct( myStruct* ms ) {
    static mt modulo3 = 0;
    if (modulo3 = = 2) {
        modulo3 = 0;
        if (checkDay('tue')) {
            ms->a = 1;
        }
    } else {
        modulo3++;
        ms->a = 0;
    }
}
```

This will be an effective solution, but not an enforceable one. Enforcement relies on policy, documentation, and engineer discipline, none of which have proven to be ultimately accurate or reliable. Therefore, we are back to the original problem of not being able to guarantee that any given assertion holds true on the newly allocated data. A malicious, careless or lazy programmer could allocate the structure, and then fail to call the proper initialization procedure, leading to possible catastrophic consequences.

Object-based systems (and class-based systems) provide an alternative. When an object is allocated by a runtime, it is initialized in a well-formed way that is dependent on the language and environment. All object-oriented environments provide some analogous mechanism as a fundamental part of their implementation. This mechanism is the hook at which the implementor can create a function (usually called the initializer or constructor) that performs the appropriate setup on the object. In this way any specific assertion can be imposed on the data before it is available for use by the rest of the system.

More formally, we can say that by using the CreateObject pattern for some assertion A and some object o, A(o) is always true immediately following the creation of o.

Without the CreateObject pattern, we can only state that either A(o), or D(o), where D is the default state of allocated storage in our system. The former is preferred for reducing errors.

There is no way for a user of the object to bypass this mechanism, it is enforced by the language and runtime environment. The hypothetical malicious, careless or lazy programmer is thwarted, and a possible error is avoided. Since this type of error is generally extremely difficult to track down and identify, avoidance is preferred.

Similarly, we could emulate an object by the record and library approach of an imperative language and document that only certain operations from a pre-defined library may be used on that data structure, but there is no way to enforce such a policy. An object has a pre-defined set of methods that correspond to the functionality of that object, and only they may interact directly with the embedded data structure.

Applicability

Use CreateObject when:
You wish to provide a data representation and enforce that only certain operations can be performed on any particular instance.
You wish to provide allocated instances of a data representation and ensure that some set of pre-conditions are met before use.

Structure

Figure 21:
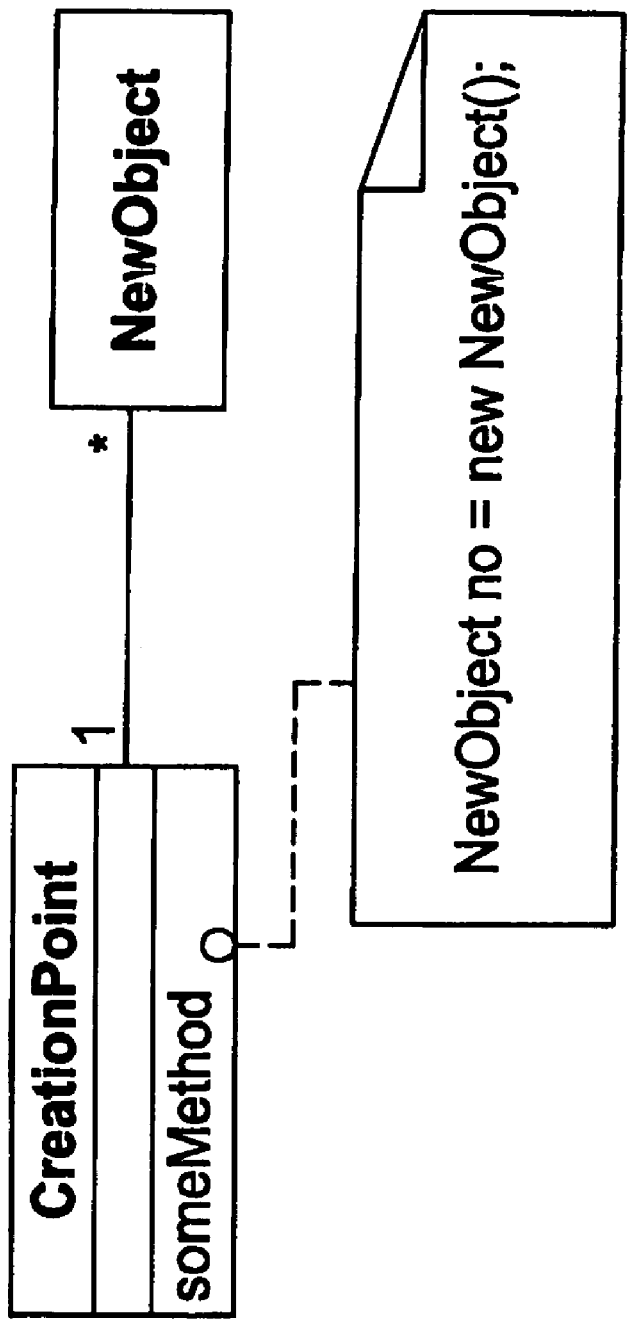
FIG. 21 is a class diagram illustrating an exemplary structure for the CreateObject EDP.

FIG. 21 is a class diagram illustrating an exemplary structure for the CreateObject EDP.

Participants

CreationPoint
The object that requests the creation of a new object of type NewObject
NewObject
The object type to be created Collaborations An instance of CreationPoint requests that a new instance of object type NewObject be created. The exact mechanism for this will vary from language to language, but it generally consists of making the request 'of' the object type itself. (Naturally, the request is actually given to the runtime environment, with the object type as an argument, but the syntax of most languages creates the appearance that the request is made directly to the object type.)

Consequences

Most object-oriented languages do not allow for the creation of data structures using any other method, but do not require the definition of a developer-supplied initialization routine. A default one is generally supplied that performs a minimum of setup.
Some languages, while object-oriented, allow the creation of non-object data structures, C++ and Objective-C are two examples, both derived from the imperative C language Python, Perl 6 and other languages have similar historical reasons for allowing such behavior.
Once an object is created, only the set of methods that were supplied by the developer of the original class are valid operations on that object. See the Inheritance pattern for an example of how to alter this state of affairs.
Objects have a time at the end of their existence when they are disposed of. This deallocation has an analogous function (the deallocator or destructor) that is called before the storage space of the data is finally released. This allows any post-conditions to be imposed on the data and resources of the object. While also a best practice to have a well-formed and definite deconstruction sequence for objects, it turns out that from a computational standpoint this is a matter of convenience only. If we had infinite resources at our disposal, objects could continue to exist, unused, for an indefinite amount of time. It is only because we have finite resources that destruction of objects is required essential in most systems. Construction of objects, however, injects them into the working environment so they can be used in computation, and is therefore a requirement, not a convenience. Conceptually, some object types may rely on the destruction of objects to enforce certain abstract notions (fixed elements of a set, etc), but this is a matter for the class designer.

Implementation

```
In C++:
class Bunny {
public:
        Bunny( int earLength );
};
int
main(int argc, char** argv) {
        Bunny b = new Bunny(1);
}
```

Abstract Interface Object Structural

Intent

To provide a common interface for operating on an object type family, but delaying definition of the actual operations to a later time.

Also Known As

Virtual Method, Polymorphism, Defer Implementation

Motivation

Often we will find that while we have a hierarchy of classes using the Inheritance pattern that conforms well to our conceptual design, occasionally we see that we run into a situation where we simply cannot provide a meaningful method implementation. We know conceptually what we want to do, we're just not entirely sure exactly how to go about doing it.

Applicability

Figure 22:
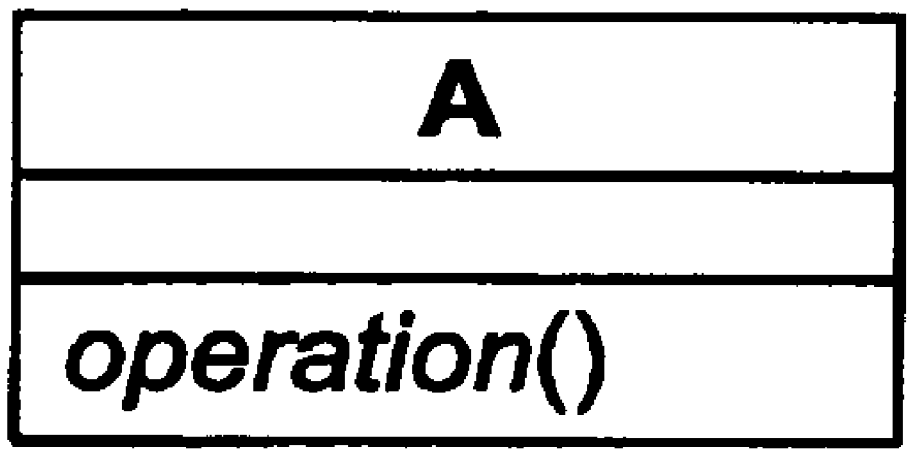
FIG. 22 is a class diagram illustrating an exemplary structure for the AbstractInterface EDP.

Use AbstractInterface when:
Implementation of a method can't be known until a later date
The interface for that method can be determined
You expect subclasses to handle the functionality of the method Structure FIG. 22 is a class diagram illustrating an exemplary structure for the AbstractInterface EDP.

Participants

A The class type that declares an interface for operation

Collaborations

A defines an interface for a method, that some unknown later subclass will implement.

Consequences
> The CreateObject pattern lets us instantiate objects, and the Retrieve pattern shows how to fill in the fields of that newly created object.
>
> AbstractInterface is unusual in that it indicates the absence of a method implementation; instead of showing us to fill in the method, it shows us how to defer the method definition until a later date. Note that this pattern does not actually provide the fill picture, including the later definition of the method. See the related FulfillMethod pattern for the rest of the solution.
>
> The method is declared, to define the proper interface for our conceptual needs, yet the method body is left undefined. This does not mean that we simply define an empty method, one that does nothing . . . the method has no definition at all. This is a critical point, and one that is often missed by new object-oriented programmers. How this is done will vary from language to language. For instance, in C++ the method is set 'equal to zero' as shown in the example code.

Implementation

```
In C++:
class AbstractOperations {
public:
virtual void operation( ) = 0;
};
class DefinedOperations : public AbstractOperations {
public:
void operation( );
};
void
DefinedOperations::operation( ) {
// Perform the appropriate work
}
```

Retrieve Object Structural

Intent
> To use an object from another non-local source in the local scope, thereby creating a relationship and tie between the local object and the remote one.

Motivation
> Objects are a solid mechanism for encapsulating common data and methods, and enforcing policy, as shown in CreateObject. Singular objects, however, are of extremely limited power. In fact, if there were only one object in a system, and nothing external to it, it could be considered a procedural program—all data and methods are local and fully exposed to one another. Non-object data types can be faked in any OO system that supports the use of function objects and method-less classes. It is therefore critical that a well formed methodology be put into place for transporting objects across object boundaries. There are two situations where this is applicable and they differ only slightly.
>
> First, there is the simplest case where an external object has an exposed field that is being accessed, and secondly, where an external object has a method which is called, and the return value of that method is being used in the internal scope.

Applicability
> Use Retrieve when:
> A remote object provides a value object that is required for local computation and is either:
> provided by a method call's return value or,
> provided by an exposed field object Structure
> FIG. 21 is a class diagram illustrating an exemplary structure for the Retrieve EDP.

Participants
> Source
> The object (or class) type that contains selected.
> Sink
> The object (or class) type that includes the item, target, to be given a new value.
> Retrieved
> The type of the value to be updated, and the value that is returned.
> target
> The field that is given a new value.
> selected The method or field that produces the new value. Collaborations
> This is a very simple relationship, consisting of two objects, and two methods. The distinguishing factors are the transferral of a return value into the local object space, and an update to a local field using that retrieved object.

Consequences
> Most object-oriented languages do not allow the updating of methods with new values (method bodies), instead only data fields can be updated in this manner. From a theoretical point of view, there is no appreciable difference between these two scenarios, and we allow for both, instead relying on the language semantics themselves to govern which cases are valid and which are not. By deferring our definition until we have a set of well-formed calculus facts, we avoid much of the complexity of handling the myriad of language quirks.
>
> Tying two objects and/or types like this is an everyday occurrence, but it is one that should not be done without thought.

Implementation

```
In C++:
class Source {
public:
    Retrieved giveMeAValue( );
};
class Sink {
    Retrieved target;
    Source srcobj;
public:
    void operation( ) { target = srcobj.giveMeAValue( ); }
};
```

Inheritance Type Relation

Intent
> To use all of another classes' interface, and all or some of its implementation.

Also Known As
> IsA

Motivation
> Often times an existing class will provide an excellent start for producing a new class type. The interface may be almost exactly what you're looking for, the existing methods may provide almost what you need for your new class, or at the very least, the existing class is conceptually close to what you wish to accomplish.

In such cases, it would be highly useful and efficient to reuse the existing class instead of rewriting everything from scratch. One way of doing so is by the use of Inheritance. Every object-oriented language supports this approach of code reuse, and it is usually a core primitive of that language.

At its most basic, this pattern offers a relationship between a superclass or base class, and a subclass or derived class. The superclass (let's call it Superclass) is an existing class in the system, one that provides at a minimum an interface of concepts for methods, and/or data structures. A second class can be defined as being derived from Superclass, let's call it Subclass. The Subclass class inherits the interface and implementations of all methods and fields of Superclass, and this provides a starting point for a programmer to begin work on Subclass.

Applicability
  Use Inheritance when:
    Two classes are related conceptually, providing the same services.
    One of those classes' implementation or inheritance is a superset of the other.
    or one class is mostly the same as the other.

Figure 23:
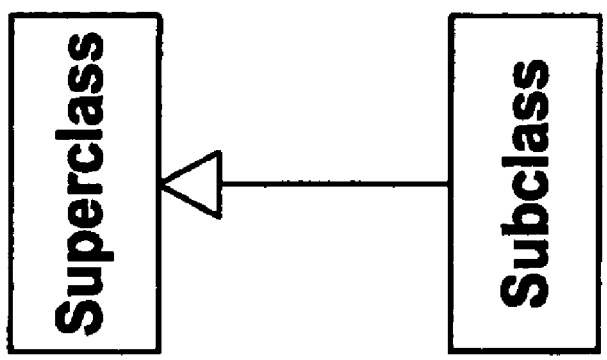
FIG. 23 is a class diagram illustrating an exemplary structure for the Inheritance EDP.

Structure
  FIG. 23 is a class diagram illustrating an exemplary structure for the Inheritance EDP.

Participants
  Superclass
    An existing class in a system that is used as a basis for producing a further class
  Subclass
    The secondary class that relies on the first for its basic interface and implementation Collaborations
  The Superclass creates a basic set of method interfaces and possibly accompanying method implementations. Subclass inherits all the interface elements of Superclass, and, by default, all of the implementations as well, which it may choose to override with new implementations.

Consequences
  Inheritance is a powerful mechanism, but has some interesting limitations and consequences. For one thing, a subclass may not remove a method or data field in most languages. (There a few exceptions, but these are rare, and beyond the scope of this pattern, as this gets to the heart of a subtlety of object-oriented theory.) A subclass is limited to overriding a method with a new implementation, or adding new methods or data fields.

It may seem that overriding is a waste of good code in the base class, and in many cases this is true. Look to the ExtendMethod pattern for a solution to this problem.

In some cases, one may not wish to inherit an entire existing class, but instead just small pieces of functionality may be desired. This may be due to a lack of confidence in the actual implementations of the method bodies (often when the original source code is unavailable), a reluctance to absorb a large class when only a small segment is needed, or other scenarios. In such situations, consider instead the Delegate pattern.

Implementation
  The mechanism for creating an inheritance relationship will vary from language to language, but is almost always readily apparent. Assume that we are modeling a rabbit farm, and wish to keep track of the health of the bunnies on hand. We make a class Bunny that contains the basic info for all rabbits, of any type. In addition, though, for lop-eared rabbits, we want to keep track of the ear length for breeding purposes. We can subclass a new class LopEaredBunny from Bunny, gaining all the necessary data and methods to model a rabbit, and we can then add additional information as we see fit:

```
In C++:
class Bunny {
public:
    Bunny( );
};
class LopEaredBunny : public Bunny {
public:
    LopEaredBunny ( );
}
```

Delegate Object Behavioral

Intent
  To parcel out, or delegate, a portion of the current work to another method in another object.

Also Known As
  Messaging, Method Invocation, Calls

Motivation
  In the course of working with objects, it invariably comes about that 'some other object' can provide a piece of functionality we want to have. Delegate embodies the most general form of a method call from one object to another, allowing one object to send a message to another, to perform some bit of work. The receiving object may or may not send back data as a result.

Applicability
  Use Delegate when:
    Another object can perform some work that your current method body wishes to have done.

Figure 24:
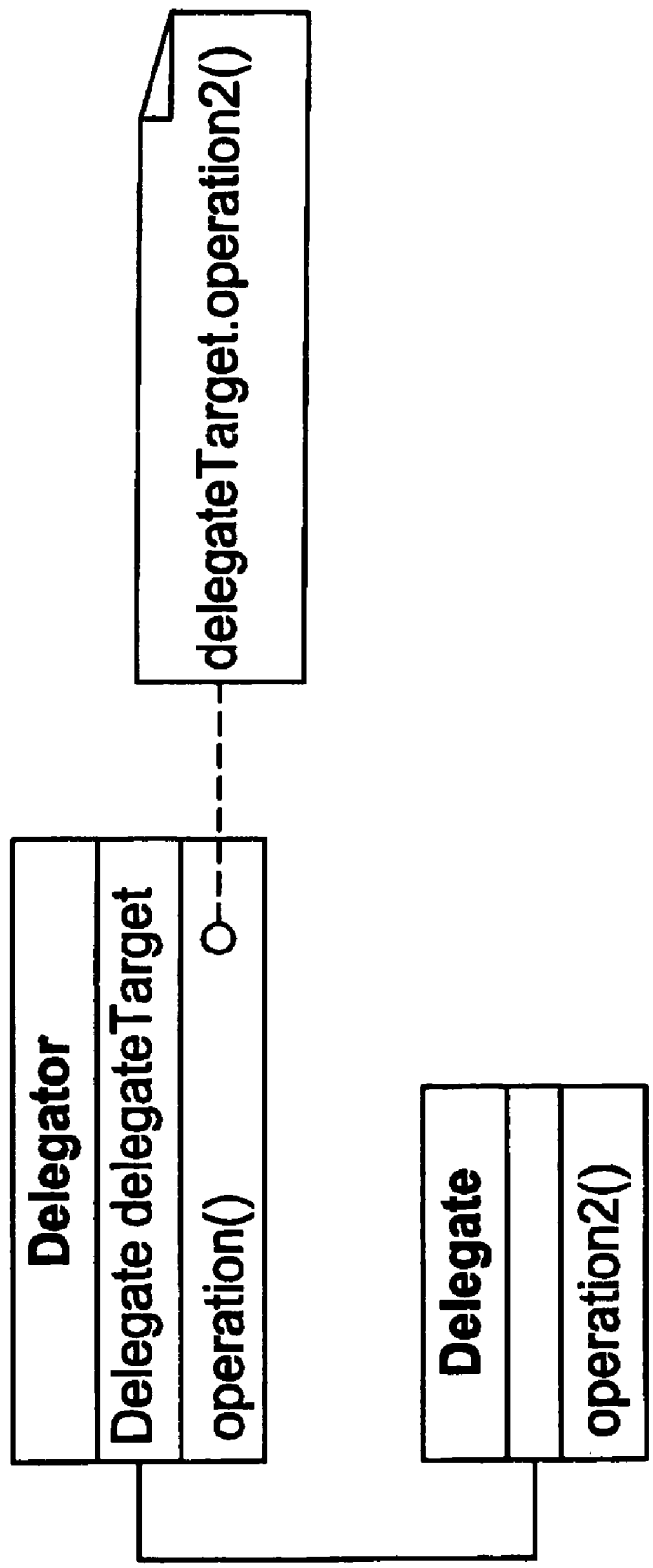
FIG. 24 is a class diagram illustrating an exemplary structure for the Delegate EDP.

Structure
  FIG. 24 is a class diagram illustrating an exemplary structure for the Delegate EDP.

Participants
  Delegator The object type sending the message to the Delegate
  operation
    The method within the Delegator that is currently being executed when the message is sent—the point of invocation of the operation2 method call
  Delegate
    The object type receiving the message, with an appropriate method to be invoked
  operation2
    The method being invoked from the call site Collaborations
  A simple binary relationship, one method calls another, just as in procedural systems, and with the same sorts of caveats and requirements. Since we are working in an object-oriented realm, however, we have a couple of additional needs. First, that the object being called upon to help with the current task must be visible at the point of invocation. Second, that the method being invoked must be visible external to the enclosing object.

Consequences

All operations between any two objects can be described as an instance of the Delegate pattern, but it is much more useful to be able to describe further attributes of the relationship. See the further Method Invocation EDPs for refinements of Delegate that will be more useful.

Implementation

The most generalized and basic style of method invocation in object-oriented programming, Delegate is how two objects communicate with each other, as the sender and receiver of messages, performing work and returning values.

```
In C++:
class Delegator {
public:
    Delegatee target;
    void operation( ) {target.operation2( );};
};
class Delegatee {
public:
    void operation2( );
}
```

Redirect Object Behavioral

Intent

To request that another object perform a tightly related subtask to the task at hand, perhaps performing the basic work.

Motivation

A small refinement to Delegate, Redirect takes into consideration that methods performing similar tasks are often named similarly. We can take advantage of this to provide more clarity as to the intent of this pattern over the more general form.

Applicability

Use Redirect when:

A task to be performed by a method can be broken down into subtasks.

One of those subtasks can be achieved by using another object.

That target object has a method that has a similar intent, expressed through its signature name after Kent Beck's Intention Revealing Selector pattern.

There is no distinct type relationship between the two objects.

Structure

Figure 25:
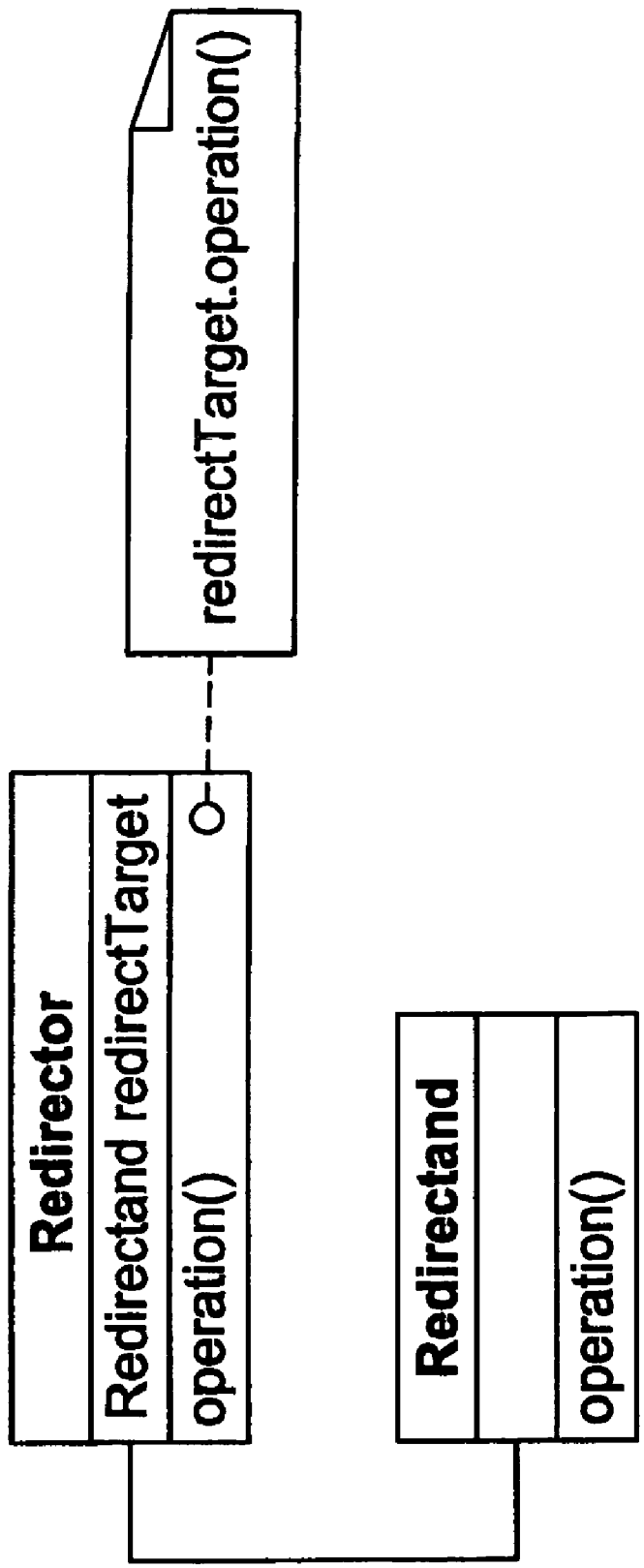
FIG. 25 is a class diagram illustrating an exemplary structure for the Redirect EDP.

FIG. 25 is a class diagram illustrating an exemplary structure for the Redirect EDP.

Participants

Redirector

The originating site of the method call, contains a method named operation which has a subtask to be parceled out to another object. This object, redirectTarget, is a field element of type Redirectand Redirector's operation calls redirectTarget.operation to perform a portion of its work.

Redirectand

The receiver of the message, which performs the subtask asked of it.

Collaborations

As with Delegate (and indeed all the Method Invocation EDPs), Retrieve is a binary relationship, between two objects and their enclosed methods.

Consequences

Almost identical to the Delegate pattern, the seemingly small equivalence of method names has some far-reaching effects, particularly when this pattern is combined with other EDPs and typing information to form complex interactions, as we will see in later patterns. By leveraging the fact that both methods have the same name, and that this is a common way of declaring the intent of a method, we can deduce that this is an appropriate way of indicating that our originating call site method is requesting the invoked method to do some portion of work that is tightly related to the core functionality of the original method.

Implementation

```
In C++:
class Foo {
public:
    operation( )
};
class Bar {
    Foo f;
public:
    operation ( ) { f.operation ( ); };
};
```

Conglomeration Object Behavioral

Intent

To bring together, or conglomerate, diverse operations and behaviors to complete a more complex task within a single object.

Also Known As

Decomposing Message

Motivation

Often times an object is asked to perform a task which is too large or unwieldy to be performed within a single method. It usually makes conceptual sense to break the task into smaller parts to be handled individually as discrete methods, and then built back into a whole result by the method responsible for the larger task. (Kent Beck refers to this as the Decomposing Message pattern.) It may also happen that related subtasks can be unified into single methods, resulting in reuse of code inside a single object.

Applicability

Use Conglomeration when:

A large task can be broken into smaller subtasks

That task can, or must, be performed within a single object

Several subtasks may be unified into a single method body

Structure

Figure 26:
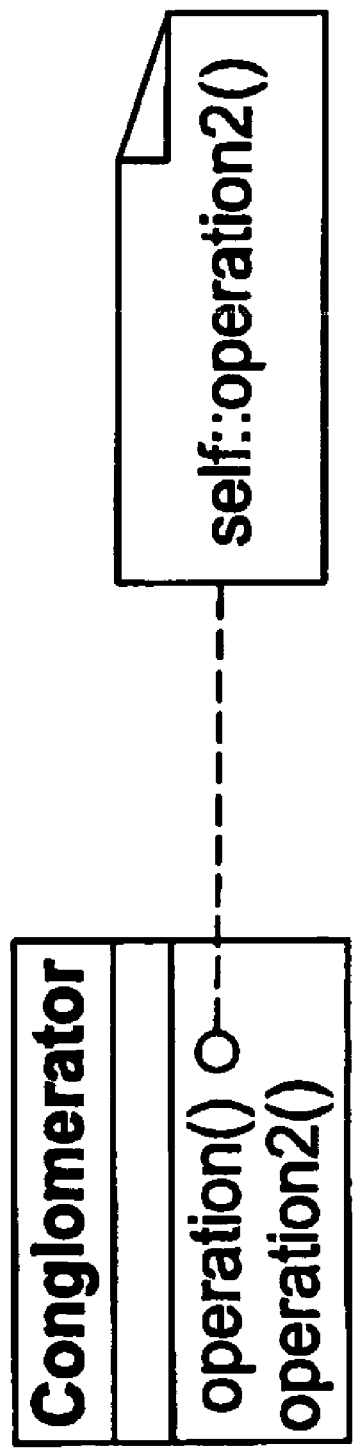
FIG. 26 is a class diagram illustrating an exemplary structure for the Conglomerate EDP.

FIG. 26 is a class diagram illustrating an exemplary structure for the Conglomeration EDP.

Participants
    Conglomerator
        Enclosing object type
        operation
            Master controlling method that is parcelling out subtasks
        operation2
            Subservient method performing a particular subtask
Collaborations
    A specialization of Delegate, the object is calling a method of itself.
Consequences
    As with Delegate, this pattern ties two methods into a reliance relationship, with operation relying on the behaviour and implementation of operation2. In this case, however, there may be immediate side effects to shared data within the confines of the object that they share.
Implementation

```
In C++:
class Conglomerate {
public:
    void operation( ) { operation2( ); };
    void operation2( );
}
```

Recursion Object Behavioral

Intent
    To accomplish a larger task by performing many smaller similar tasks, using the same object state.
Motivation
    Sometimes we run across a problem that, after analysis, can be broken down into smaller subtasks that are identical to the original task, except at a smaller scale. Sorting an array of items using the Merge Sort algorithm is one such example. Merge Sort takes an array and divides it into two halves, sorting each individually, then merging the two sorted arrays into a unified whole. Of course, each half sorted is done so by calling Merge Sort again, so they are again halved, and so on. Eventually arrays of a single item are reached, at which point the merging begins.
    The process by which a method calls itself is known as recursion, and is ubiquitous in general programming. In object-oriented programming, the same principle applies, except that we have the added requirement that the object must be calling on itself, through an implicit or explicit use of self. (See Redirect for an example of calling another object, and RedirectedRecursion for calling another object of the same type.)
    Recursion is, generally speaking, a way of folding a large amount of computation into a small conceptual space. Say we want to sort an array, and we decide that the easiest way to sort a large array is to split it into two roughly equal sized arrays, and then merge the two sub-arrays. The merging will be easy—if the head of array A is less than the head of array B, then the head of A is copied to the new, larger array, otherwise, copy the head of B. Remove the copied item from the appropriate array, and repeat until both arrays are merged.
    Now, since this Merge Sort scheme relies on the subarrays being properly sorted, we correctly surmise that we can perform the sort algorithm on the two subarrays, splitting, sorting, then merging each in turn. Again, we are faced with the same sorting problem, so we continue in the same manner until we reach the smallest indivisible array, namely a single item. At that point, merging of sorted subarrays at each step can begin.
    Assume we have an Array class that has the usual methods of add and delete. If we knew that the length of the beginning array was 4 items, then we could hardcode the entire sorting in pseudo-code like so:

```
Array
sort_merge(Array a) {
    a11 = a[0];
    a12 = a[1];
    a21 = a[2];
    a22 = a[3];
    // Sort first half
    if (a11 < a12) {
        a1.add(a11);
        a1.add(a12);
    } else {
        a1.add(a12);
        a1.add(a11);
    }
    // Sort second half
    if (a21 < a22) {
        a2.add(a21);
        a2.add(a22);
    } else {
        a2.add(a22);
        a2.add(a21);
    }
    // Merge
    if (a1[0] < a2[0]) {
        res.add(a1[0]);
        a1.delete(0);
    } else {
        res.add(a2[0]);
        a2.delete(0);
    }
    if (a1[0] < a2[0]) {
        res.add(a1[0]);
        a1.delete(0);
    } else {
        res.add(a2[0]).
        a2.delete(0);
    }
    if (a1.length == 0) {
        res.add(a2[0]);
        res.add(a2[1]);
    }
    if (a2.length == 0) {
        res.add(a1[0]);
        res.add(a1[1]);
    }
    if (a1.length == 1 && a2.length == 1) {
        res.add(a1[0]);
        res.add(a2[0]);
    }
}
```

While highly efficient (more on this later), this has a drawback . . . it is limited to only working for arrays of length 4. A much more general version of this is one using looping. Here, we illustrate a for loop implementation (assuming for simplicity that the length of the array is a power of 2):

```
sort_array(Array a) {
    // Slice a into subarrays
    subarray[0][0] = a
    for (i = 1 to log_2(a.length( ))) {
        for (j = 0 to 2^i) {
```

```
            prevarray = subarray[i-1][floor(j/2)]
            subarray[i][j] = prevarray.slice(
                (j mod 2) * (prevarray.length( ) / 2),
                ((j mod 2) + 1) * (prevarray.length( ) / 2))
        }
    }
    // Sort subarrays and merge
    for (i = log_2(a.length( )) to 0) {
        for (j = 1 to 0) {
            subarray[i][j]
        }
    }
    return subarray[0][0]
}
```

This succeeds in making our algorithm much more flexible, but at a cost of making it almost unreadable due to the overhead mechanisms. Note that we are looping inward to the base case (length of array is a single unit), storing state at every step, then looping outward using the state previously stored. This process of enter, store, use store, and unroll is precisely what a function call accomplishes. We can use this fact to vastly simplify our implementation using Recursion:

```
Array
sort_array(Array a, int beg, int end) {
    if(a.length( ) > 1) {
        return merge(sort_array(a, beg, end-beg/2),
            sort_array(a, (end-beg/2) + 1, end));
    } else {
        return a
    }
}
```

```
Array
merge(Array a, Array b) {
    Array res;
    while (b.length( ) > 1 || a.length( ) > 1) {
        // If a or b is empty, then a[0] or b[0] returns a min value
        if (a[0] < b[0]) {
            res.add(a[0]);
            a.delete(0);
        } else {
            res.add(b[0]);
            b.delete(0);
        }
    }
    return res;
}
```

This is a much cleaner conceptual version that performs the same task as our looping variation. We are letting the runtime of the language handle the overhead for us.

There are times, however, when that overhead handling may be determined to be excessive for our needs, such as in a high-performance embedded system. In such cases, optimizing away the recursion into loops, or further into linear code, is a possibility. These instances are extreme however, and tend to be highly specialized. In most cases the benefits of Recursion (conceptual cleanliness, simple code) greatly outweigh the small loss of speed.

The above example is based on the recursion of a method, but that is strictly for simplification of the problem. In an object-oriented system, there are no free methods, therefore any method that is truly recursive is bound to a particular object, not just a specific type.

Applicability
    Use Recursion when:
    A task can be divided into highly similar subtasks
    The subtasks must be, or are preferred to be, performed by the same object, usually due to a necessity of access to common stored state.
    A small loss of efficiency is overwhelmed by the gain in simplicity.

Figure 27:
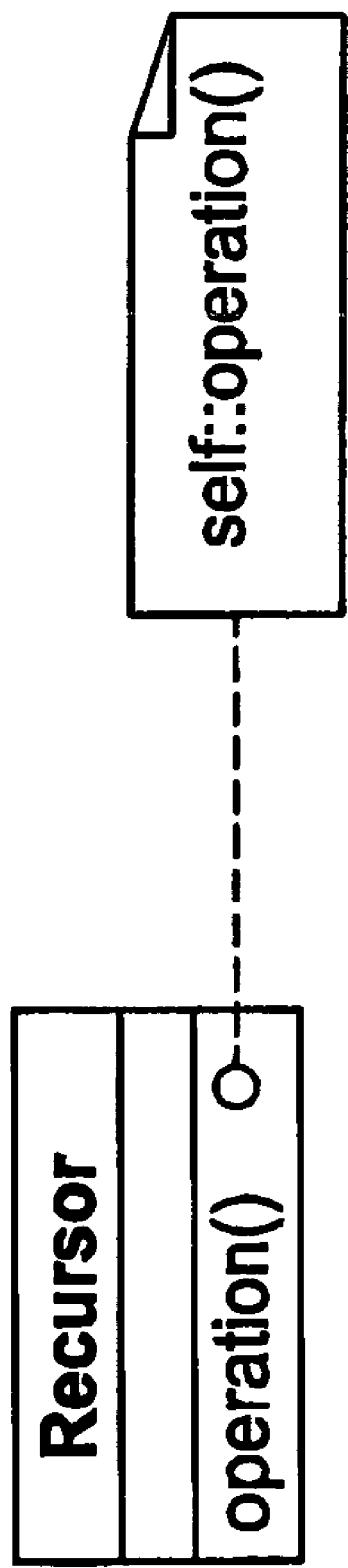
FIG. 27 is a class diagram illustrating an exemplary structure for the Recursion EDP.

Structure
    FIG. 27 is a class diagram illustrating an exemplary structure for the recursion EDP.

Participants
    Recursor
        The only participant, Recursor has a method that calls back on itself, within the same instantiation.

Collaborations
    Recursor's method operation collaborates with itself, requesting smaller and smaller tasks to be performed at each step, until a base case is reached, at which point results are gathered into a final result.

Consequences
    The reliance of Recursion on a properly formed base case for termination of the recursion stack is the weakest point of this pattern. It is nearly impossible in most modern systems to wantonly consume all available resources . . . but recursion can do it easily by having a malformed base case that is never satisfied.

Implementation
    See above code examples.

RevertMethod Object Behavioral

Intent
    Bypass the current class' implementation of a method, and instead use the superclass' implementation, reverting to an 'earlier' method body.

Figure 28:
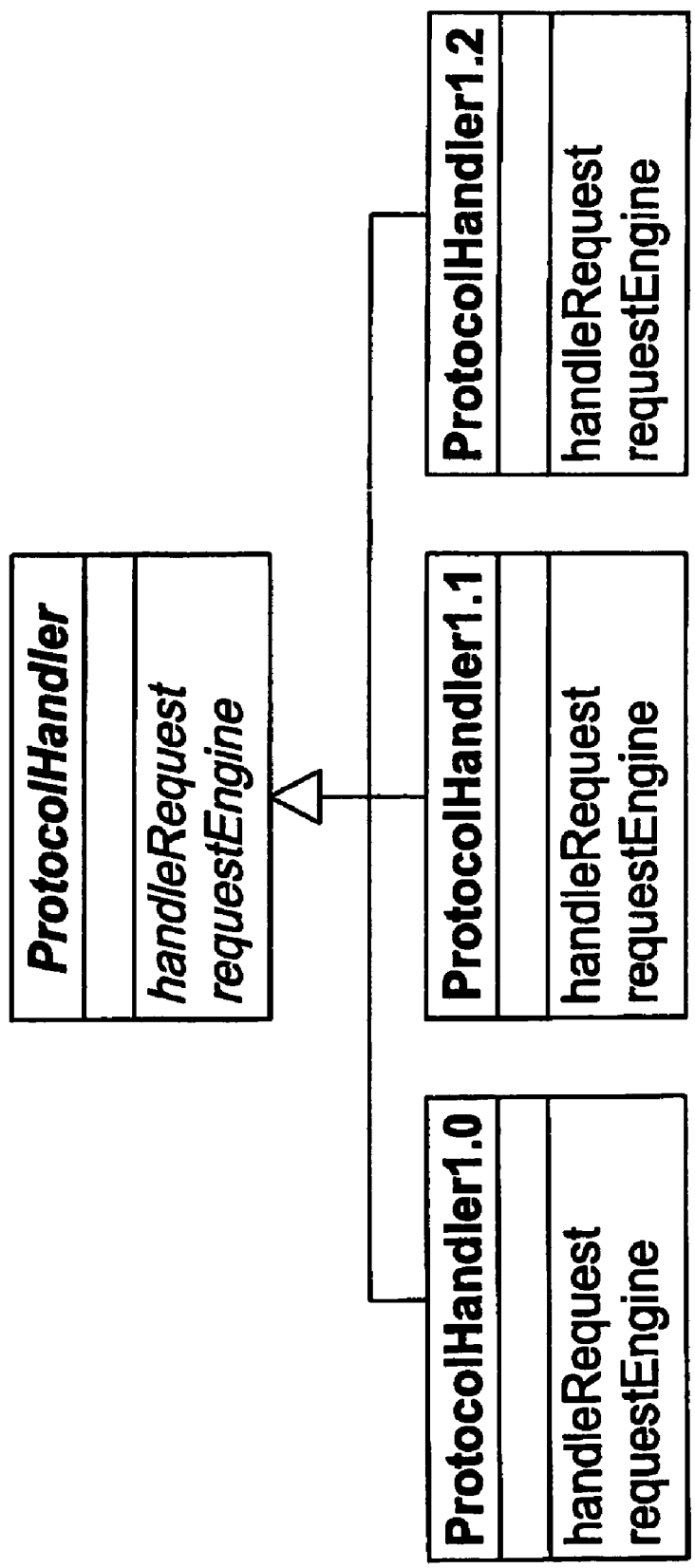
FIG. 28 is a class diagram illustrating a base class and subclasses that implement different versions of a protocol.
Figure 29:
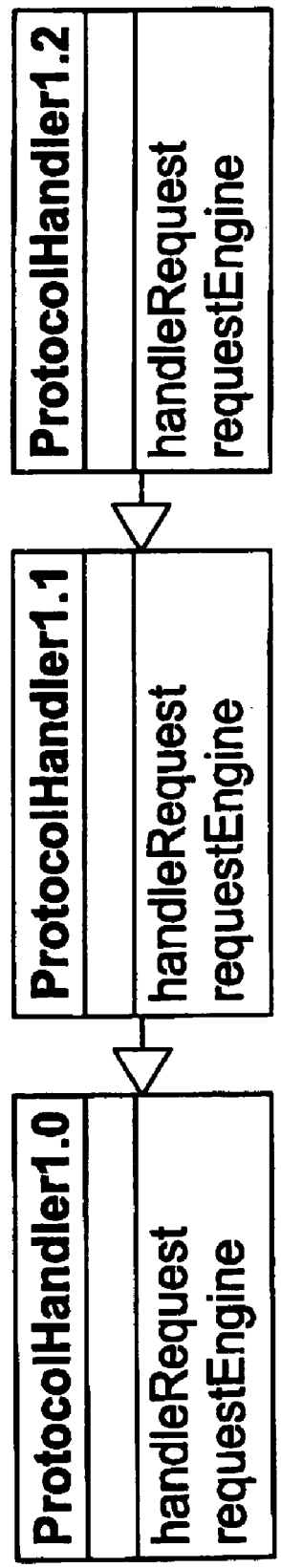
FIG. 29 is a class diagram illustrating a base protocol handler class that instantiates subclasses to handle different versions of a protocol.

Motivation
    There are times when polymorphism works against us. One such instance would be when providing multiple versions of classes for simultaneous use within a system. Imagine a library of classes for an internet data transfer protocol. A base library is shipped as 1.0. With the 1.1 library, changes to the underlying protocol are made, and an application using the 1.1 protocol must be able to fall back to the 1.0 protocol when it detects that the application at the other end of the connection is only 1.0 enabled.
    Now, one approach would be to use polymorphism directly, and have a base class that abstractly provides the protocol's methods, as in FIG. 28, and create the proper class item on protocol detection. Unfortunately, this doesn't give us a lot of dynamic flexibility . . . what if the protocol needs to adapt on the fly, so that the two ends can handle graceful degradation of the connection, for instance. You could instantiate objects of each protocol type, and swap back and forth as needed, but there may be protocol state issues that would be troublesome.
    So instead we may elect to have the base protocol class subclassed by a 1.1 version class, and just instantiate that instead. We now have only a single class to deal with, but we still need to be able to revert to the previous version. In FIG. 29 we show an extended variant of this approach, with several versions.

In this case we can instantiate an object of just the last class in the chain, ProtocolHandler1.2, and conditional statements in the code will pass the protocol handling back up the chain to the appropriate version if needed. Note that we can make a simple test for whether or not the current object's version is appropriate for the protocol, and if not, pass it simply to super, and let the test be re-enacted there, and so on. This vastly simplifies further maintenance of code that supports this protocol, since only the instance(s) of the ProtocolHandler need to be changed to the latest version anytime a new update to the library comes out, and all the graceful degradation is handled automatically. (Or, a specific version can be hardcoded for various reasons—it is up to the application developer.)

Applicability
   Use RevertMethod when:
   A class wishes to a prior implementation of a method that it has overridden.

Figure 30:
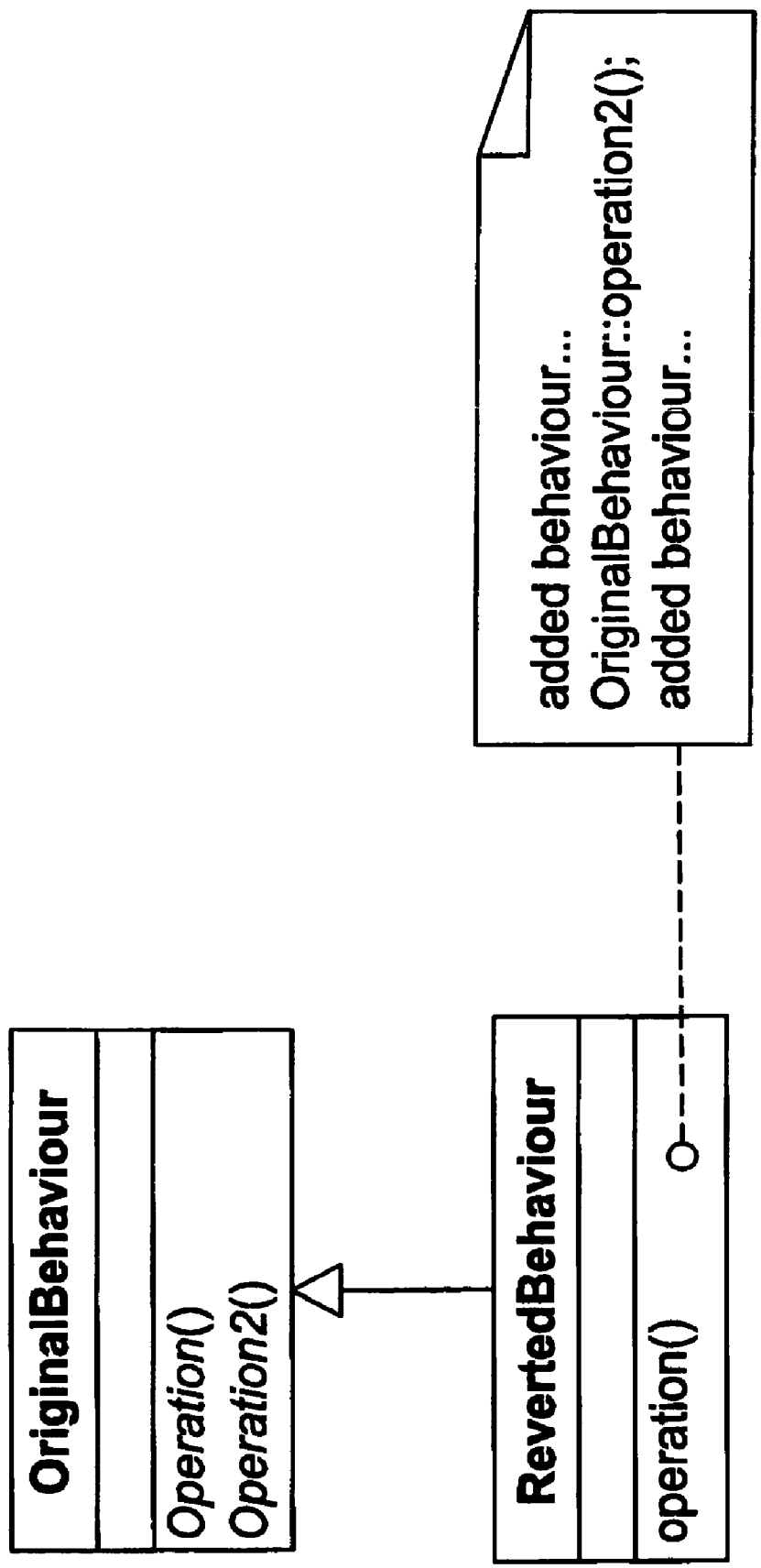
FIG. 30 is a class diagram illustrating an exemplary structure for the RevertMethod EDP.

Structure
   FIG. 30 is a class diagram illustrating an exemplary structure for the RevertMethod EDP.

Participants
   OriginalBehaviour
      A base class, defining two methods, operation and operation2.
   RevertedBehavior
      A subclass of OriginalBehaviour, with operation and operation2 overridden. operation calls the OriginalBehaviour implementation of operation2 (when one would normally expect it to call its own implementation of that method.)

Collaborations
   In most cases when a subclass overrides a parent class' method, it is to replace the functionality, but the two method definitions can work together to allow an extension of the behaviour. RevertedBehaviour relies on OriginalBehaviour for a core implementation.

Consequences
   There is an odd disconnect conceptually between the overriding of a base class' method, and the utilization of that same method that can be confusing to some students. Overriding a method does not erase the old method, it merely hides it from public view for objects of the subclass. The object still has knowledge of its parent's methods, and can invoke them internally without exposing this to the external world.

Implementation

```
In C++:
class OriginalBehaviour {
public:
    void operation( ) { operation2( ); };
protected:
    void operation2( );
};
class RevertedBehavior: public OriginalBehaviour {
public:
    void operation( ) {
        if (oldBehaviorNeeded) {
```

-continued

```
            OriginalBehaviour::operation2( );
        } else {
            operation2( );
        }
                };
private:
    void operation2( );
}
```

Extend Method ObjectBehavioral

Intent
   Add to, not replace, behavior in a method of a superclass while reusing existing code.

Also Known As
   Extending Super

Motivation
   There are many times when the behavior of a method needs to be altered or extended, for reasons such as fixing a bug in the original method when the source code is unavailable, adding new functionality without changing the original method, etc.
   One of the most common ways of doing this is, of course, to cut and paste the old code into the new method, but this presents a host of problems, including consistency of methods, and results in a potential maintenance morass. It is much better to adhere to the Single Point Principle and instead reuse the existing code, tweaking the results as needed.
   It is possible, of course, to create a reference to a delegate object with the original behavior, and then call into it when needed. This is the approach taken in the Redirect EDP.
   In other cases, it is necessary or desired to subclass directly off of the original class. In such cases, we have two options for extending the original method. One is to cut and paste the old code into the new subclass' method, but this is not only undesirable from a maintenance standpoint, but also may not be possible, as in cases where the original source code is unavailable.
   The second is Extend Method EDP. In this case, we use Inheritance EDP to provide the mechanism for reuse. We then override the original method, but make a call back to the superclass' implementation of the method. This provides us with simple maintenance, reuse, and encapsulation of the altered behavior.

Applicability
   Use Extend Method when:
   Existing behavior of a method needs to be extended but not replaced.
   Reuse of code is preferred or necessitated by lack of source code.
   Polymorphic behavior is required.

Figure 31:
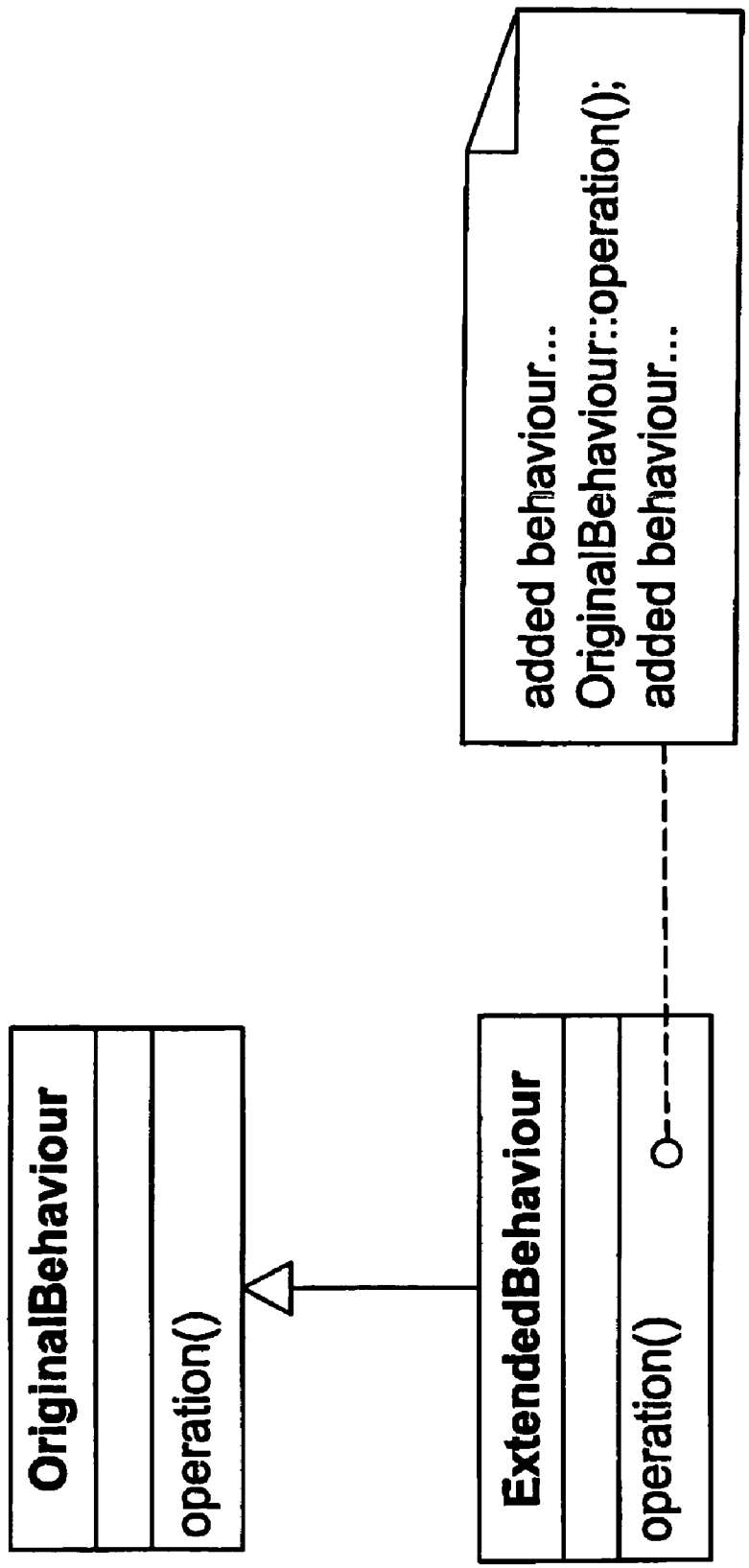
FIG. 31 is a class diagram illustrating an exemplary structure for the ExtendMethod EDP.

Structure
   FIG. 31 is a class diagram illustrating an exemplary structure for the ExtendMethod EDP.

Participants
   OriginalBehaviour
      Defines interface contains a method with desired core functionality.
   Extended Behaviour Uses interface of OriginalBehaviour, re-implements method as call to base class code with added code and/or behavior.

Collaborations

In most cases when a subclass overrides a parent class' method, it is to replace the functionality, but the two method definitions can work together to allow an extension of the behaviour. ExtendedBehaviour relies on OriginalBehaviour for both interface and core implementation.

Consequences

There is an odd disconnect conceptually between the overriding of a base class' method, and the utilization of that same method that can be confusing to some students. Overriding a method does not erase the old method, it merely hides it from public view for objects of the subclass. The object still has knowledge of its parent's methods, and can invoke them internally without exposing this to the external world. Code reuse is optimized, but the method Operation in OriginalBehaviour becomes somewhat fragile—its behaviour is now relied upon by ExtendedBehaviour::Operation to be invariant over time. Behaviour is extended polymorphically and transparently to clients of OriginalBehaviour.

Implementation

```
In C++:
class OriginalBehaviour {
public:
    virtual void operation( );
};
class ExtendedBehaviour : public OriginalBehaviour {
public:
    void operation( );
};
void
OriginalBehaviour::operation( ) {
    // do core behavior
}
void
ExtendedBehaviour::operation( ) {
    this->OriginalBehaviour::operation( );
    // do extended behavior
}
```

This pattern should translate very easily to most any object-oriented language that supports inheritance and invocation of a superclass' version of a method.

Delegated Conglomeration Object Behavioural

Intent

A Conglomeration pattern is appropriate, but we need to work with a distinct instance of our object type, resulting in a need for the Delegate pattern to be used.

Motivation

Many times we have objects of the same type working in concert to perform tasks. User interfaces are frequently coded as a collection of like objects collaborating to produce a larger functionality.

Applicability

Figure 32:
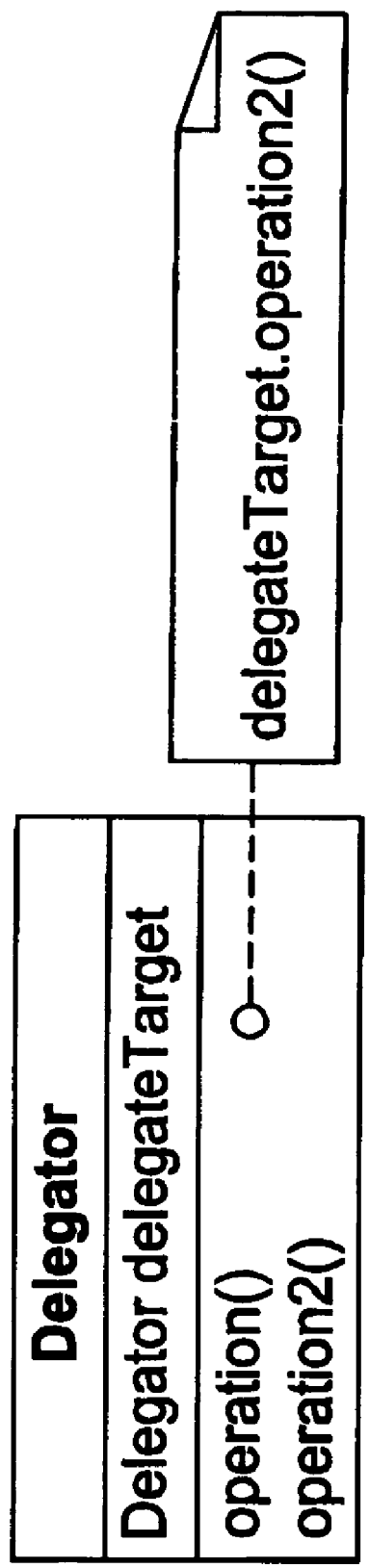
FIG. 32 is a class diagram illustrating an exemplary structure for the DelegatedConglomeration EDP.

Use DelegatedConglomeration when:

A task can be broken into subtasks that are properly handled by the same object type Many objects of the same type work in concert to complete a task A single object is unable to complete the task alone Structure FIG. 32 is a class diagram illustrating an exemplary structure for the DelegatedConglomeration EDP.

Participants

Delegator

The object type that contains references to other instances of its own type delegateTarget The enclosed instance that is called upon to perform a task operation The calling point within the first object operation2

The subtask to be completed

Collaborations

Consequences

Implementation

```
In C++:
class Delegator {
    Delegator delegateTarget;
public:
    void operation( ) { delegateTarget.operation2( ); };
    void operation2( );
}
```

Redirected Recursion Object Behavioural

Intent

To perform a recursive method, but one that requires interacting with multiple objects of the same type.

Motivation

Frequently we will wish to perform an action that is recursive in nature, but it requires multiple objects working in concert to complete the task. Imagine a line of paratroopers getting ready for a jump. Space it tight, so instead of the commander indicating to each trooper to jump at the door, he stands at the back of the line, and when time has come, taps the last trooper on the shoulder. He knows to tap the shoulder of the trooper in front of him, and when that soldier has jumped, jump himself. This can continue on down a line of arbitrary length, from 2 to 200 troopers. All they have to do is when they feel a tap on their shoulder, tap the next person in line, wait, shuffle forward as space is available, and when they see the soldier in front of them go, jump next. The commander issues one order, instead of one to each soldier. A sample coding of this might look like:

```
Paratrooper::jump( ) {
    nextTrooper->jump( );
    while (! nextTrooper->hasJumped( ) ) {
        shuffleForward( );
    }
    leap( );
}
```

The current paratrooper cannot jump until the trooper in front has completed their task, and so on, and so on.

Figure 33:
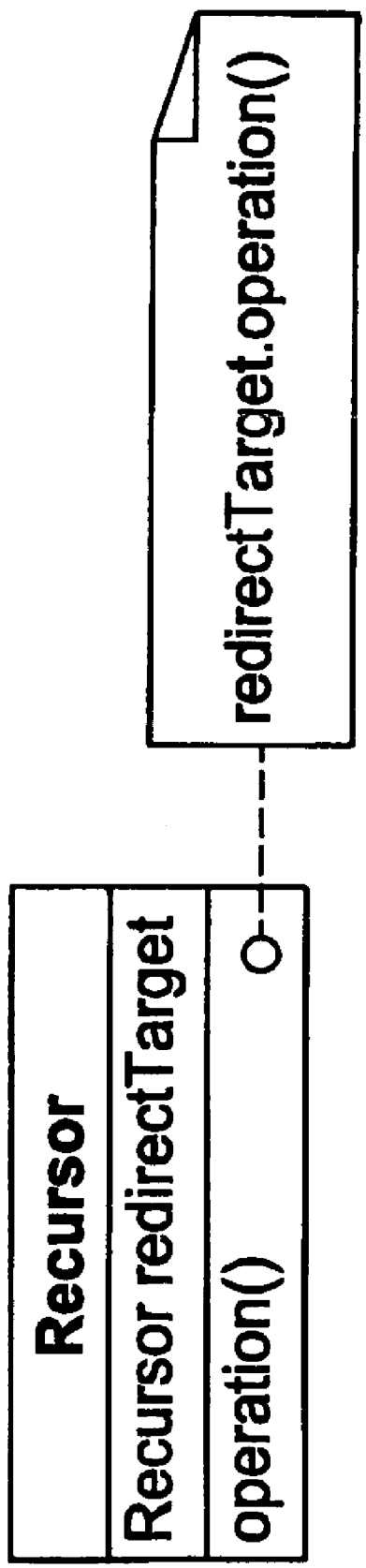
FIG. 33 is a class diagram illustrating an exemplary structure for the RedirectedRecursion EDP.

Applicability
   Use RedirectedRecursion when:
      Recursion is a clean way of breaking up the task into subparts
      Multiple objects of the same type must interact to complete the task Structure
   FIG. 33 is a class diagram illustrating an exemplary structure for the RedirectedRecursion EDP.

Participants
   Recursor
      An object type that holds a reference to another instance of its own type
   redirectTarget
      The enclosed instance
   operation
      A method within Recursor that is recursive on itself . . . but through redirectTarget Collaborations Consequences Implementation

```
In C++:
class Recursor {
    Recursor redirectTarget;
public:
    void operation( ) { redirectTarget.operation( ); };
}
```

DelegateInFamily Object Behavioural

Intent
   Related classes are often defined as such to perform tasks collectively. In such cases, multiple objects of related types can interact in generalized ways to delegate tasks to one another.

Motivation
   User interfaces are a familiar type of system in which to find DelegateInFamily and related patterns (DelegateInFamily, RedirectInFamily, RedirectInLimitedFamily). This pattern allows one to parcel out tasks within a family of classes (often called a class cluster) when the interface, and method name, are known, but the precise object type (and therefore method body) may not be. It is a form of polymorphic delegation, where the calling object is one of the polymorphic types.
   Consider a windowing system that includes slider bars and rotary dials as input controls, and text fields and bar graphs as display widgets. A input control is tied to a particular display widget, and sends it updates of values when the control is adjusted by the user. The input controls don't need to know precisely what kind of display widget is at the other end, they just need to know that they must call the updateValue method, with the appropriate value as a parameter. Since input controls also display a value implicitly, it is possible to programmatically change their adjustment accordingly, so they too need an updateValue method. By our Inheritance pattern, it looks as if the input controls and display widgets are of the same family, and in fact we want to make sure that they can all interact, so we create a class hierarchy accordingly:

```
class UIWidget {
    void updateValue( int newValue );
};
class InputControl : UIWidget{
    UIWidget* target;
    void userHasSetNewValue( ) { . . . target->updateValue(myNewValue); . . . }
};
class SliderBar : InputControl {
    void updateValue( int newValue );
    // Moves the slider bar accordingly
    void acceptUserClick( ) { . . . userHasSetNewValue( ); . . . };
};
class RotaryKnob : InputControl {
    void updateValue( int newValue );
    // Rotates the knob image accordingly
    void acceptUserClick( ) { . . . userHasSetNewValue( ); . . . };
};
class DisplayWidget : UIWidget {
    GraphicsContext gc;
};
class TextField : DisplayWidget {
    void updateValue( int newValue ) { gc.renderAsText( newValue ); };
};
class BarGraph : DisplayWidget {
    void updateValue ( int newValue ) { gc.drawBarLengthOf( newValue ); };
};
```

In the above example, the InputControl and UIWidget classes are the ones fulfilling roles in a DelegateInFamily pattern.
   The SliderBar and RotaryKnob objects don't have to know anything about where their value is going, and in fact, they could be tied to each other, with each adjusting the other in sync. (You could even have two objects of the same InputControl subclass tied together, such as two SliderBar instances.) We have separated the concerns of who is sending what data, and who is receiving it. All that is of concern is that the data is being sent to a properly receiving client polymorphically, and that the current calling object is of that polymorphic family. This allows for a single unified interface for many classes that can work in tandem to perform many tasks.

Figure 34:
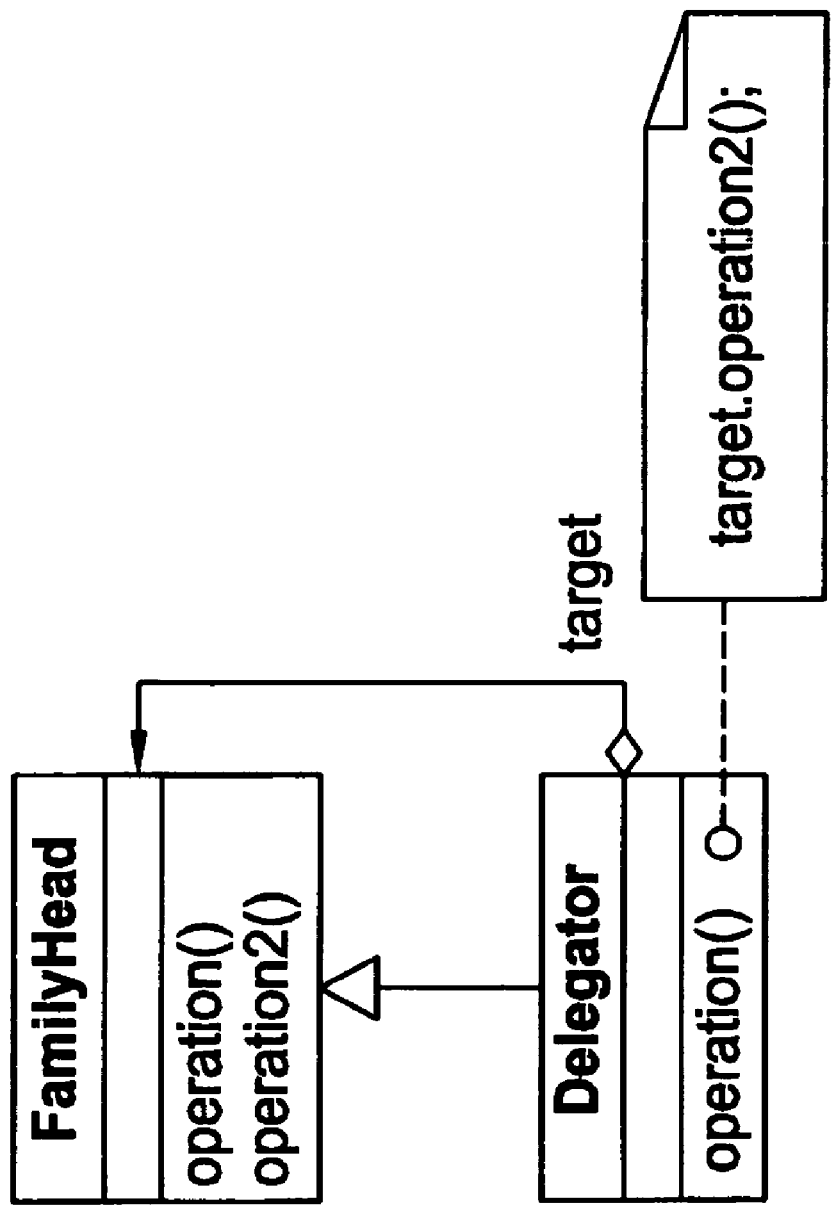
FIG. 34 is a class diagram illustrating an exemplary structure for the DelegateInFamily EDP.

Applicability
   Use DelegateInFamily when:
      Delegation is appropriate, with not necessarily related subtasks to be performed
      Polymorphism is required to properly handle the message request
      The calling object is of a type in the polymorphic hierarchy Structure
   FIG. 34 is a class diagram illustrating an exemplary structure for the DelegateInFamily EDP.

Participants
   FamilyHead
      The base class for a polymorphic class cluster
   Delegator
      A subclass of FamilyHead
   target
      A polymorphic instance of FamilyHead that is contained by Delegator
   operation
      The calling site
   operation2
      The called subtask Collaborations Consequences Implementation
The target can be defined in either the base class, or the subclass, it just needs to be accessible from with the subclass.

In C++:
```
class FamilyHead {
    void operation( );
    void operation2( );
};
class Delegator : public FamilyHead {
    FamilyHead target; void operation( ) { target->operation2( ); };
};
```

RedirectInFamily ObjectBehavioral

Intent
Redirect some portion of a methods implementation to a possible cluster of classes, of which the current class is a member.

Motivation
Frequently a hierarchical object structure of related objects will be built at runtime, and behavior needs to be distributed among levels.

Applicability
Use RedirectInFamily when:
An aggregate structure of related objects is expected to be composed at compile or runtime.
Behavior should be decomposed to the various member objects.
The structure of the aggregate objects is not known ahead of time.
Polymorphic behavior is expected, but not enforced.

Figure 35:
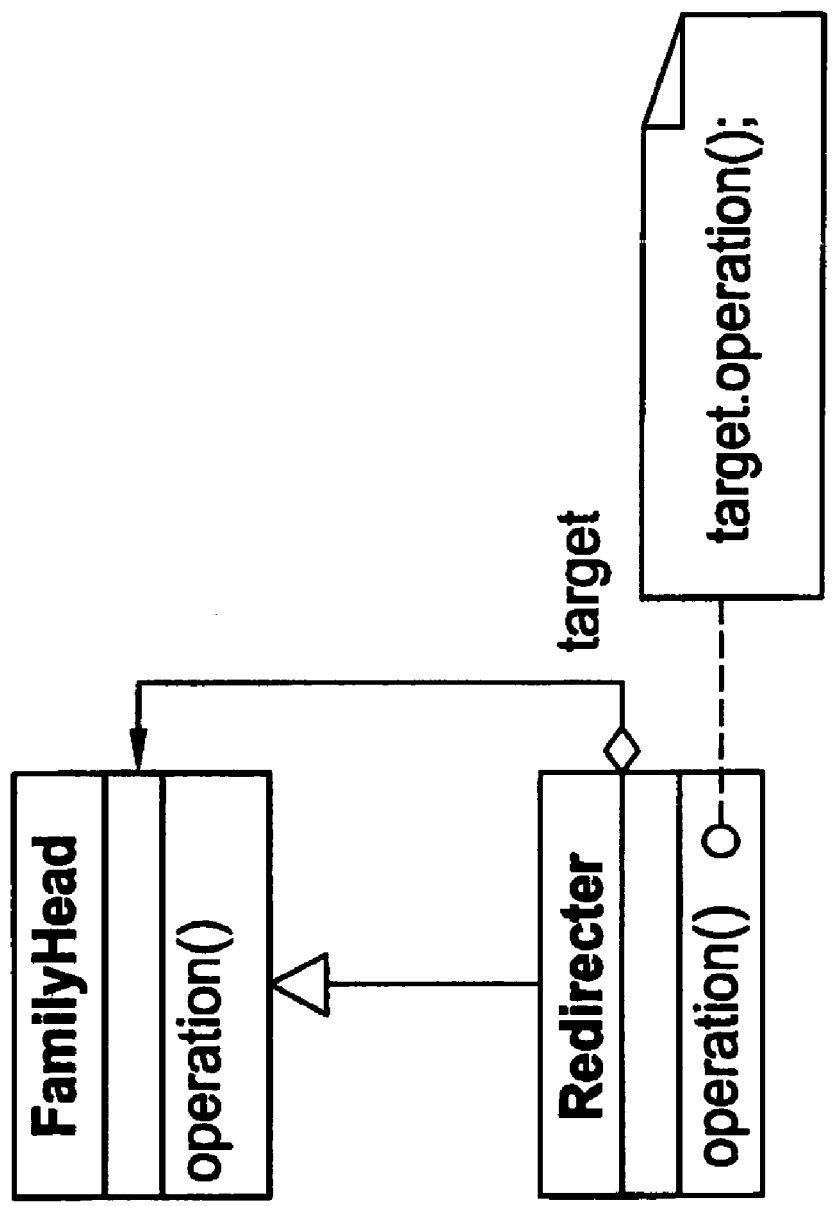
FIG. 35 is a class diagram illustrating an exemplary structure for the RedirectInFamily EDP.

Structure
FIG. 35 is a class diagram illustrating an exemplary structure for the RedirectInFamily EDP.

Participants
FamilyHead
Defines interface, contains a method to be possibly overridden.
Redirecter
Uses interface of FamilyHead redirects internal behavior back to an instance of FamilyHead to gain polymorphic behavior over an amorphous object structure Collaborations
Redirecter relies on the class FamilyHead for an interface, and an instance of same for an object recursive implementation.

Consequences
Redirecter is reliant on FamilyHead for portions of its functionality.

Implementation

In C++:
```
class FamilyHead {
public:
    virtual void operation( );
};
```

-continued
```
class Redirecter : public FamilyHead {
public:
    void operation( );
    FamilyHead* target;
};
void
Redirecter::operation( ) {
    // preconditional behavior
    target->operation( );
    // postconditional behavior
}
```

DelegatedInLimitedFamily Object Behavioural

Intent
When DelegateInFamily is too generalized, and it is necessary to pre-select a sub-tree of the class hierarchy for polymorphism.

Motivation
Static typing is a way of pre-selecting types from a well defined pool, and forming more concrete notions of an object's type at runtime. Polymorphism is a technique for abstracting out typing information until runtime. Sometimes we need a balance of the two. This pattern and the related RedirectInLimitedFamily both weigh these opposing forces but for slightly different outcomes.
This pattern is concerned with Delegation, the more generalized form of computational subtasking.

Figure 36:
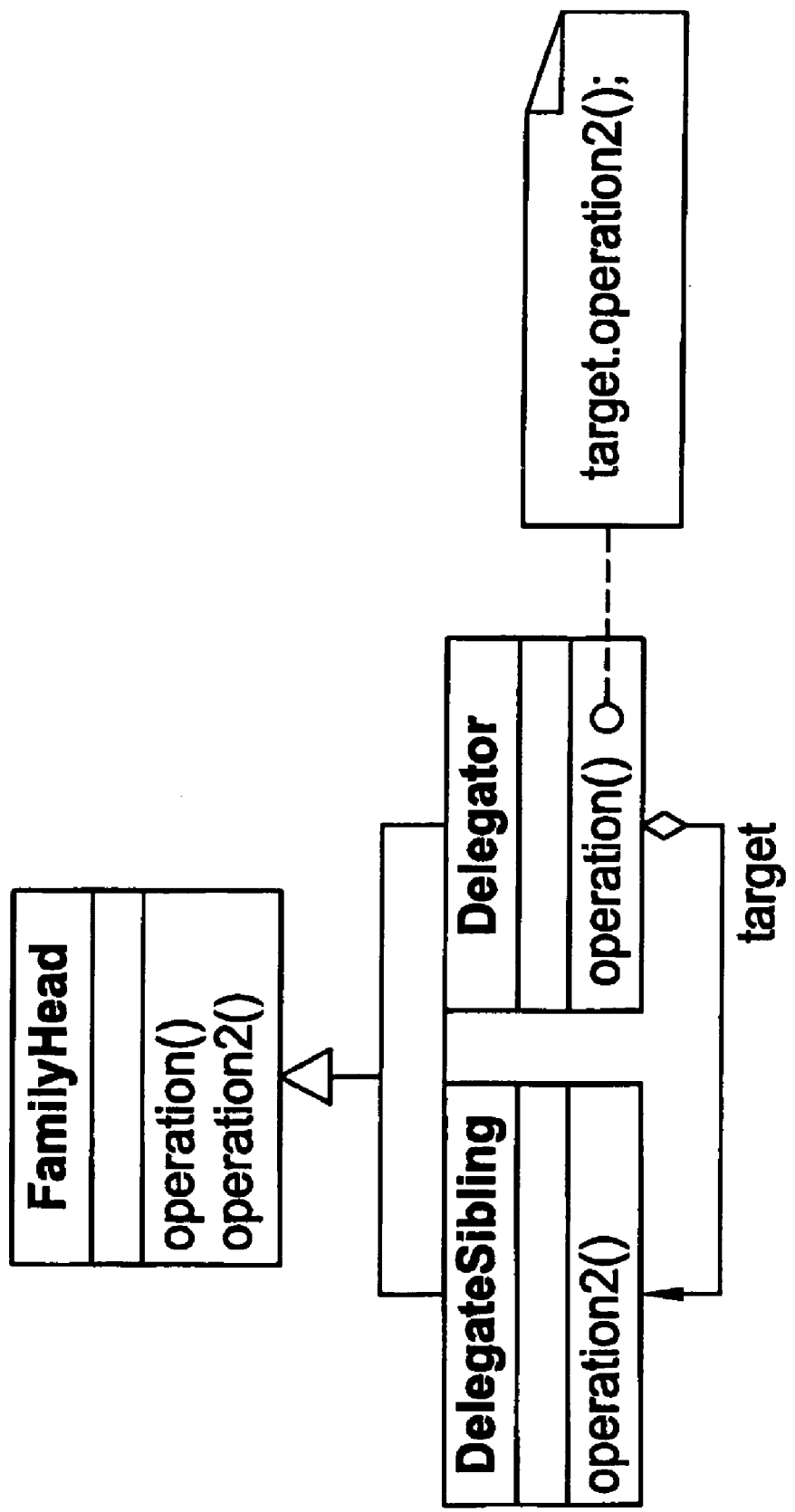
FIG. 36 is a class diagram illustrating an exemplary structure for the DelegateInLimitedFamily EDP.

Applicability
Use DelegateInLimitedFamily when:
DelegateInFamily is the appropriate general pattern . . .
. . . but greater control over the possible types of objects is required Structure
FIG. 36 is a class diagram illustrating an exemplary structure for the DelegateInLimitedFamily EDP.

Participants
FamilyHead
The base class for a polymorphic class cluster
Delegator
A subclass of FamilyHead
DelegateSibling
Another subclass of FamilyHead
target
A polymorphic instance of DelegateSibling that is contained by Delegator
operation
The calling site
operation2
The called subtask Collaborations Consequences Implementation In C++:
```
class FamilyHead {
    void operation( );
    void operation2( );
};
```

```
class DelegateSibling : public FamilyHead {
    void operation2( );
};
class Delegator : public FamilyHead {
    DelegateSibling* target;
    void operation( ) { target->operation2( ); };
};
```

RedirectInLimitedFamily Object Behavioural

Intent
    When RedirectInFamily is too generalized, and it is necessary to pre-select a sub-tree of the class hierarchy for polymorphism.

Motivation
    Static typing is a way of pre-selecting types from a well defined pool, and forming more concrete notions of an object's type at runtime. Polymorphism is a technique for abstracting out typing information until runtime. Sometimes we need a balance of the two. This pattern and the related DelegateInLimitedFamily both weigh these opposing forces but for slightly different outcomes.
    This pattern is, obviously, concerned with redirection, having some advance knowledge of the intimacies of the task at hand to be able to determine that similarly named methods will be calling each other in a chain of subtasking.

Figure 37:
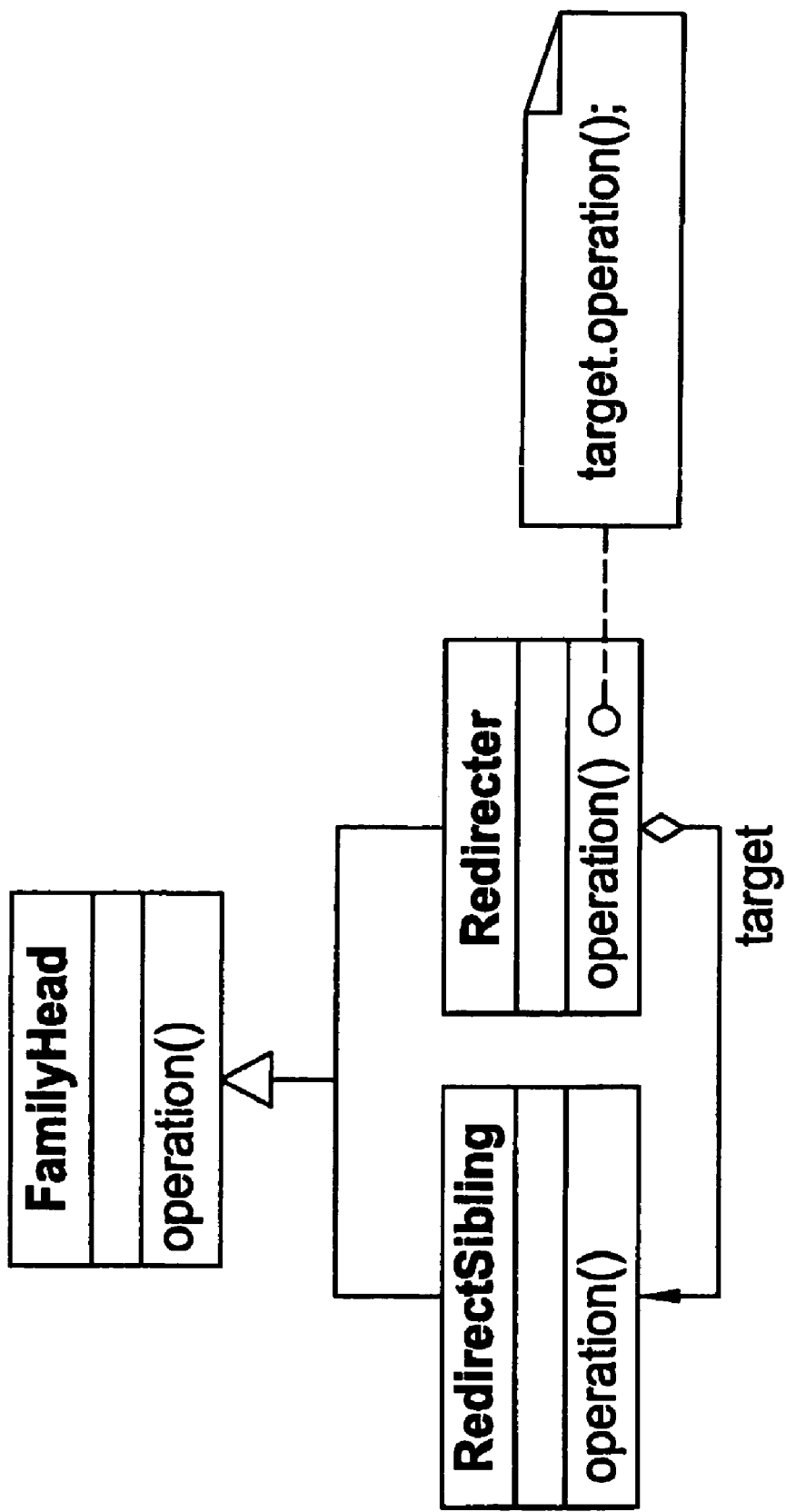
FIG. 37 is a class diagram illustrating an exemplary structure for the RedirectInLimitedFamily EDP.

Applicability
    Use RedirectInLimitedFamily when:
    RedirectInFamily is the appropriate general pattern . . .
    . . . but greater control over the possible types of objects is required Structure
    FIG. 37 is a class diagram illustrating an exemplary structure for the RedirectInLimitedFamily EDP.

Participants
    FamilyHead
    Defines interface, contains a method to be possibly overridden, is the base class for both Redirecter and RedirectSibling
    Redirecter
    Uses interface of FamilyHead, redirects internal behaviour back to an instance of RedirectSibling to gain polymorphic behaviour over an amorphous but limited in scope object structure.
    RedirectSibling
    The head of a new class tree for polymorphic behaviour Collaborations Consequences Implementation

```
In C++:
class FamilyHead {
public:
    virtual void operation( );
};
class RedirecterSibling : public FamilyHead {
    void operation( );
};
class Redirecter : public FamilyHead {
public:
    void operation( );
    RedirecterSibling* target;
};
void
Redirecter::operation( ) {
    // preconditional behaviour
    target->operation( );
    // postconditional behaviour
}
```

REFERENCES

[1] Martin Abadi and Luca Cardelli. *A Theory of Objects*. Springer-Verlag New York, Inc., 1996.

[2] Christopher W. Alexander. *Notes on the Synthesis of Form*. Oxford Univ Press, 1964. Fifteenth printing, 1999.

[3] Apple The NewtonScript programming language. Apple Computer, Inc., 1993

[4] Kent Beck. Smalltalk Best Practice Patterns. Prentice Hall, 1997.

[5] Jan Bosch. Design patterns as language constructs. Journal of Object Oriented Programming, 1(2): 18-52, May 1998.

[6] Kyle Brown. Design reverse-engineering and automated design pattern detection in smalltalk. Master's thesis, North Carolina State University, 2000.

[7] Frank Buschmann, Regine Meunier, Hans Rohnert, Peter Sommerlad, and Michael Stal. *Pattern-Oriented Systems Architecture: A System of Patterns*. John Wiley & Sons, 1996.

[8] Craig Chambers. The cecil language: Specification and rationale. Technical Report TR-93-03-05, University of Washington, 1993.

[9] James Coplien. C++ idioms. In *Proceedings of the Third European Conference on Pattern Languages of Programming and Computing*, July 1998.

[10] Serge Demeyer, Stéphane Ducasse, and Oscar Nierstrsz. Finding refactoring via change metrics. In *Proceedings of the conference on Object-oriented programming, systems, languages, and applications*, pages 166-177. ACM Press, November 2000.

[11] Amnon H Eden. *Precise Specification of Design Patterns and Tool Support in their Application*. PhD thesis, Tel Aviv University, Tel Aviv, Israel, 2000.

[12] Alexander Egyed. Automated abstraction of class diagrams. *ACM 2Yansactions on Software Engineering and Methodology*, 11(4): 449-491, October 2002.

[13] G Florijn, M. Meijers, and P. van Winsen. Tool support for object-oriented patterns. In M. Askit and S. Matsuoka, editors, *Proc. of the 11th European Conf. on Object Oriented Programming*—ECOOP'97. Springer-Verlag, Berlin 1997.

[14] Martin Fowler. *Refactoring: Improving the Design of Existing Code*. Addison-Wesley, 1999.

[15] Erich Gamma, Richard Helm, Ralph Johnson, and John Vlissides. *Design Patterns*. Addison Wesley 1995.

[16] Adele Goldberg. What should we teach? In *Addendum to the proceedings of the 10th annual conference on Object-oriented programming systems, languages, and applications (Addendum)*, pages 30-37. ACM Press, 1995.

[17] Bent Bruun Kristensen. Complex associations: abstractions in object-oriented modeling. In *Proc of the ninth* annual conference on Object-oriented programming systems, language, and applications, pages 272-286. ACM Press, 1994.
[18] O. L Madsen, B. Møller-Pederson, and K. Nygaard. *Object-oriented Programming in the BETA language*. Addison-Wesley, 1993.
[19] W. McCune. Otter 2.0 (theorem prover). In M. E. Stickel, editor, *Proc. of the 10th Intl Conf. on Automated Deduction*, pages 663-664, July 1990.
[20] Scott Meyers. *Effective C++*. Addison-Wesley, 1992.
[21] Microsoft Corporation, editor. *Microsoft Visual C#.NET Language Reference*. Microsoft Press, 2002.
[22] Ivan Moore. Automatic inheritance hierarchy restructuring and method refactoring. In *Proc. of the eleventh annual conference on Object-oriented programming systems, languages, and applications*, pages 235-250. ACM Press, 1996.
[23] Mel Ó Cinnéide. *Automated Application of Design Patterns: A Refactoring Approach*. Ph.D. dissertation, University of Dublin, Trinity College, 2001.
[24] Mel Ó Cinnéide and Paddy Nixon. Program restructuring to introduce design patterns. In *Proceedings of the Workshop on Experiences in Object-Oriented Re-Engineering, European Conference on Object-Oriented Programming*, Brussels, July 1998.
[25] William F. Opdyke and Ralph E Johnson. Creating abstract superclasses by refactoring. In *Proc. of the Conf. on 1993 ACM Computer Science*, page 66, 1993. Feb. 16-18,1993.
[26] Santiago M. Pericas-Geertsen. *Sigma Project: http://types.bu.edu/ool-mini-seminar/sigma.html*. Boston University, 2001.
[27] Wolfgang Pree. *Design Patterns for Object-Oriented Software Development*. Addison-Wesley, 1994.
[28] Steven P. Reiss. Working with patterns and code. In *Proc. of the 33rd Hawaii Intl Conf on System Sciences*, January 2000.
[29] Dirk Riehle. Composite design patterns. In *Proceedings of the 1997 ACM SIGPLAN conference on Object-oriented programming systems, languages and applications*, pages 218-228. ACM Press, 1997.
[30] Mohlalefi Sefika, Aamod Sane, and Roy H Campbell. Architecture-oriented visualization. In *Proc of the eleventh annual conference on Object-oriented programming systems, languages, and applications*, pages 389-405. ACM Press, 1996.
[31] Forrest Shull, Walcelio L. Melo, and Victor R. Basili. An inductive method for discovering design patterns from object-oriented software systems. Technical Report CS-TR-3597, University of Maryland, 1996.
[32] Jason McC. Smith and David Stotts. Elemental design patterns: A formal semantics for composition of oo software architecture. In *Proc. of 27th Annual IEEE/NASA Software Engineering Workshop*, pages 183-190, December 2002.
[33] Jason McC. Smith and David Stotts. Elemental design patterns: A link between architecture and object semantics. Technical Report TR-02-011, Univ. of North Carolina, 2002.
[34] Jason McC. Smith and David Stotts. SPQR: Flexible automated design pattern extraction from source code. In *18th IEEE Intl Conf on Automated Software Engineering*, October 2003.
[35] Bobby Woolf. The abstract class pattern. In Neil Harrison, Brian Foote, and Hans Rohnert, editors, *Pattern Languages of Program Design* 4. Addison-Wesley, 1998.
[36] Bobby Woolf. The object recursion pattern. In Neil Harrison, Brian Foote, and Hans Rohnert, editors, *Pattern Languages of Program Design* 4. Addison-Wesley, 1998.
[37] Walter Zimmer. Relationships between design patterns. In James O. Coplien and Douglas C. Schmidt, editors, *Pattern Languages of Program Design*, pages 345-364. Addison-Wesley, 1995.

Each of the publications referenced herein is hereby incorporated by reference herein in its entirety.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for detecting constructs in computer program source code in a manner that is independent of underlying source code variations used to implement the source code constructs, the method comprising:
   (a) converting a first computer source code file into a fact set in a mathematical notation that supports direct expression of semantic reliances between elements of source code and is suitable for inputting into an automated inference engine;
   (b) accessing a catalog including elemental design patterns and constructs composed of elemental design patterns for identifying predetermined source code constructs, wherein the elemental design patterns and the constructs in the catalog are independent of source code semantic tags;
   (c) accessing a set of rules in the mathematical notation usable by the automated inference engine to identify relationships between source code constructs; and
   (d) inputting the fact set, the catalog, and the rules to the automated inference engine and identifying constructs present in the first computer program source code file.

2. The method of claim 1 wherein converting the first computer source code file includes applying a parser to the first computer program source code file, generating an abstract syntax tree, and converting the abstract syntax tree into the mathematical notation.

3. The method of claim 1 wherein identifying constructs in the first computer program source code file includes identifying design patterns present in the first computer program source code file.

4. The method of claim 1 wherein identifying constructs in the first computer source code file includes identifying malignant patterns present in the computer source code file.

5. The method of claim 1 wherein the elemental design patterns are composable into larger source code constructs.

6. The method of claim 5 wherein the elemental design patterns are not decomposable into smaller source code relational constructs.

7. The method of claim 1 wherein the elemental design patterns are independent of source code programming language.

8. The method of claim 1 comprising using the constructs present in the first computer source code file for educational purposes to instruct students on computer program constructs.

9. The method of claim 1 comprising using the identified constructs to identify refactoring opportunities in the first computer program source code file.

10. The method of claim 1 wherein identifying patterns present in the first computer program source code file includes applying the automated inference engine to different versions of the first computer program source code file, identifying patterns as new aspects are added or deleted from the first computer program source code file, and using the patterns identified for the different versions to determine whether original program intent has been preserved.

11. The method of claim 1 wherein identifying constructs present in the first computer program source code file includes applying iterative searching to identify first patterns present in the first computer program source code file and using the first patterns to identify second patterns present in the first computer program source code file that include the first patterns.

12. The method of claim 1 wherein identifying constructs present in the first computer program source code file includes allowing a user to define levels of pattern dependency to be identified in the first computer program source code file.

13. The method of claim 1 comprising adding design patterns to the catalog composed from the constructs identified in step (d).

14. The method of claim 1 wherein the mathematical notation includes a reliance operator for indicating relationships between computational entities.

15. The method of claim 1 wherein the mathematical notation includes temporal logic that identifies relative time between rules.

16. The method of claim 1 comprising identifying source code constructs based on run time snap shots of executable code.

17. The method of claim 1 wherein identifying source code constructs includes assigning likelihoods that source code constructs correspond to elements in the catalog.

18. The method of claim 1 wherein identifying constructs in the first computer program source code file includes identifying constructs in a procedural source code file.

19. The method of claim 1 wherein identifying constructs in the first computer program source code file includes identifying constructs in an object-oriented source code file.

20. The method of claim 1 wherein identifying constructs in the first computer program source code file includes identifying constructs in an aspect oriented source code file.

21. The method of claim 1 wherein step (d) includes:
(a) identifying a portion of the converted source code file to be one of first and second source code constructs;
(b) executing the converted portion using an interpreter to determine run time behavior of the portion; and
(c) using the run-time behavior to distinguish between the first and second constructs.

22. The method of claim 1 wherein steps (a)-(d) are implemented using a computer program product comprising computer-executable instructions embodied in a computer-readable medium.

23. The method of claim 1 comprising applying steps (a)-(d) to a second computer program source code file and comparing the constructs identified for the first and second source code files.

24. The method of claim 1 comprising identifying metrics associated with the source code based on the identified constructs.

25. The method of claim 1 comprising:
(a) identifying all possible combinations of the elemental design patterns;
(b) searching the first computer program source code file to identify the combinations present in the first computer program source code file;
(c) identifying all possible combinations of the identified combinations and repeating step (f);

(d) repeating steps (f) and (g) until no new combinations are found;
(e) repeating steps (e)-(h) for a second source code file; and
(f) comparing the search results for the first and second source code files to identify new source code constructs common to the first and second source code files.

26. The method of claim 1 wherein the automated inference engine comprises an automated theorem prover.

27. The method of claim 1 wherein the automated inference engine comprises an deductive database.

28. A method for detecting constructs in computer program source code in a manner that is independent of underlying source code variations used to implement the source code constructs, the method comprising:
(a) converting a first computer source code file into a fact set in a mathematical notation suitable for inputting into an automated inference engine, wherein converting the first computer source code file into a fact set in a mathematical notation includes converting the first computer source code file into a rho calculus notation, wherein the rho calculus notation comprises an extension of sigma calculus notation to include transitivity;
(b) accessing a catalog including elemental design patterns and constructs composed of elemental design patterns for identifying predetermined source code constructs, wherein the elemental design patterns and the constructs in the catalog are independent of source code semantic tags;
(c) accessing a set of rules in the mathematical notation usable by the automated inference engine to identify relationships between source code constructs; and
(d) inputting the fact set, the catalog, and the rules to the automated inference engine and identifying constructs present in the first computer program source code file.

29. A method for detecting constructs in computer program source code in a manner that is independent of underlying source code variations used to implement the source code constructs, the method comprising:
(a) converting a first computer source code file into a fact set in a mathematical notation suitable for inputting into an automated inference engine;
(b) accessing a catalog including elemental design patterns and constructs composed of elemental design patterns for identifying predetermined source code constructs, wherein the elemental design patterns and the constructs in the catalog are independent of source code semantic tags;
(c) accessing a set of rules in the mathematical notation usable by the automated inference engine to identify relationships between source code constructs, wherein accessing a set of rules usable by the automated inference engine includes accessing rules in a rho calculus notation, wherein the rho calculus notation comprises an extension of sigma calculus notation to include transitivity; and
(d) inputting the fact set, the catalog, and the rules to the automated inference engine and identifying constructs present in the first computer program source code file.

30. A system for identifying computer source code constructs comprising computer-executable instructions embodied in a computer-readable storage media, the computer-readable storage media comprising:
(a) a source-code-to-fact-set converter for converting computer program source code into a fact set in a mathematical notation that supports direct expression of semantic reliances between elements of source code and is suitable for inputting into an automated inference engine;

(b) an elemental design pattern (EDP) catalog including at least one elemental design pattern to be compared to the fact set;
(c) a rule set including at least one rule for defining relationships between source code constructs; and
(d) an automated inference engine for receiving as input the fact set, the EDP catalog, and the rule set, and for producing output indicative of patterns in the computer program source code.

31. The system of claim 30 wherein the source-code-to-fact-set converter includes a first converter for converting the computer program source code into a tree format.

32. The system of claim 30 wherein the tree format includes a gcc parse tree format and wherein the first converter comprises a gcc compiler.

33. The system of claim 30 wherein the source-code-to-fact-set converter includes a second converter for converting the tree-formatted source code into a pattern object XML (POML) format, and a third converter for converting the POML-formatted source code into the fact set.

34. The system of claim 30 wherein the automated inference engine comprises an automated theorem prover.

35. The system of claim 30 wherein the automated inference engine comprises a deductive database.

36. The system of claim 30 comprising means for allowing a user to specify patterns in the EDP catalog to be used by the automated inference engine in identifying patterns in the computer program source code.

37. The system of claim 36 wherein the means for allowing includes a pattern dependency graph, wherein the user selects patterns to be searched from the pattern dependency graph.

38. The system of claim 30 wherein the rule set includes at least one rule for defining object state changes.

39. The system of claim 30 wherein the rule set includes at least one rule for identifying temporal relationships between method calls.

40. A computer program product comprising computer executable instructions embodied in a computer readable storage medium for performing steps comprising:
(a) converting computer program source code into a fact set in a mathematical notation that supports direct expression of semantic reliances between elements of source code and is suitable for inputting into an automated inference engine;
(b) providing an elemental design pattern catalog including at least one elemental design pattern for identifying a construct in the source code;
(c) providing a rule set defining relationships between elemental design patterns identified as present in the computer program source code; and
(d) comparing the fact set to the elemental design pattern catalog and applying the rules in the rule set to identify constructs present in the computer program source code, wherein comparing the fact set to the elemental design pattern catalog and applying the rules includes inputting the fact set, the elemental design pattern catalog, and the rules into an automated inference engine and identifying the construct present in the computer program source code.

41. The computer program product of claim 40 wherein converting the computer program source code into a fact set includes using a compiler to convert the source code into a parse tree.

42. The computer program product of claim 40 wherein providing an elemental design pattern catalog includes providing a catalog having elemental design patterns that are independent of underlying source code language.

43. The computer program product of claim 40 wherein providing a rule set includes providing a rule set that defines operational relationships between source code constructs.

44. The computer program product of claim 40 wherein step (d) is performed by an automated inference engine.

45. The computer program product of claim 44 wherein the automated inference engine comprises an automated theorem prover.

46. The computer program product of claim 44 wherein the automated inference engine comprises a deductive database.

* * * * *

UNITED STATES PATENT AND TRADEMARK OFFICE
CERTIFICATE OF CORRECTION

PATENT NO. : 7,627,861 B2 Page 1 of 1
APPLICATION NO. : 11/003841
DATED : December 1, 2009
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this

Second Day of November, 2010

David J. Kappos
*Director of the United States Patent and Trademark Office*